United States Patent
Minami et al.

(10) Patent No.: US 6,295,063 B1
(45) Date of Patent: Sep. 25, 2001

(54) APPARATUS FOR PRODUCING EXPLODED VIEW AND ANIMATION OF ASSEMBLING, AND METHOD THEREOF

(75) Inventors: Shunsuke Minami, Brookline, MA (US); Tomotoshi Ishida, Hitachinaka (JP); Yoshiaki Shinotsuka, Hitachi (JP); Kunio Kumamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/825,245

(22) Filed: Mar. 27, 1997

Related U.S. Application Data

(63) Continuation of application No. 08/395,993, filed on Feb. 28, 1995.

(30) Foreign Application Priority Data

Feb. 28, 1994 (JP) .................................................. 6-29267
Jun. 10, 1994 (JP) ................................................. 6-242901

(51) Int. Cl.$^7$ .................................................. G06T 17/00
(52) U.S. Cl. ........................... 345/419; 345/473; 345/964
(58) Field of Search .................................. 345/419, 420, 345/427, 433, 436, 474, 473, 964

(56) References Cited

U.S. PATENT DOCUMENTS

| 5,159,512 | 10/1992 | Evans et al. | 395/133 X |
| 5,430,837 | 7/1995 | Matsuo | 395/155 |

OTHER PUBLICATIONS

Kusiak "Concurrent Engineering Automation Tools and Techniques" pp. 177–205, 1993.*

Foley et al. "Computer Graphics Principles and Practice" pp. 188, 376–381, 521, 1990.*

* cited by examiner

*Primary Examiner*—Almis R. Jankus
(74) *Attorney, Agent, or Firm*—Antonelli, Terry, Stout & Kraus, LLP

(57) ABSTRACT

An apparatus for producing an exploded view has an input unit, a geometrical data memory for storing geometrical data of parts composing an assembly, a memory for storing assembling process data composed of part to be attached data and attaching direction data a calculating unit for generating the assembly for a display unit based on the geometrical data, and means for determining arranged positions of the parts composing said assembly in a disassembled state based on assembling process data and the geometrical data, thereby an exploded view being displayed in the display unit corresponding to the arranged positions is determined. An apparatus for producing animation of assembling comprises a geometrical data memory for storing geometries of parts composing an assembly, an attaching procedure data memory for storing attaching procedures composed of attaching orders, part to be attached data and attaching direction data, a jointing data memory for storing jointing data composed of part to be attached data and jointing method data, a table for special jointing operation memory for storing a table for special jointing operation composed of jointing method data and operation data special for the jointing method data, and operating data producing means for producing operating data for part to be attached as an input parameter to an animation display function using the geometrical data in the geometrical data memory, the attaching procedure data in the attaching procedure data memory, the jointing data in the jointing data memory, and the table for special jointing operation in the table for special jointing operation memory.

25 Claims, 77 Drawing Sheets

| | 801 | 802 | 803 |
|---|---|---|---|
| | STEP OF PROCEDURE | PART TO BE ATTACHED | ATTACHING DIRECTION |
| 804 | 1 | 701 | — |
| 805 | 2 | 702 | 706 |
| 806 | 3 | 703 | 706 |
| 807 | 4 | 704 | 707 |
| 808 | 5 | 705 | 707 |

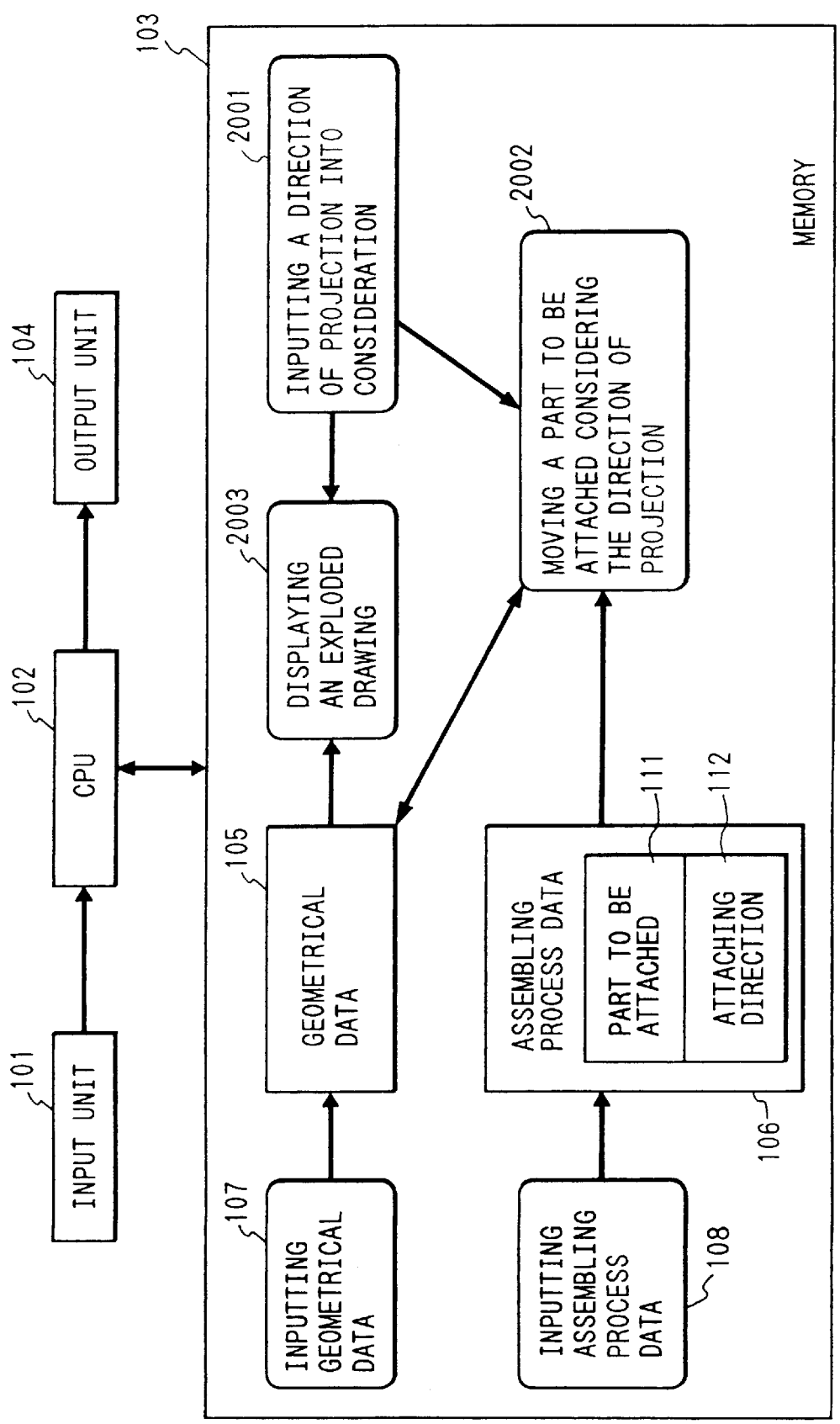

| STEP OF PROCEDURE | PART TO BE ATTACHED | ATTACHING DIRECTION |
|---|---|---|
| 1 | 3601 | ---- |
| 2 | 3602 | (0, -1) |
| 3 | 3603 | (-1, 0) |
| 4 | 3604 | (0, -1) |

| STEP OF PROCEDURE | PART TO BE ATTACHED | ATTACHING DIRECTION |
|---|---|---|
| 1 | 3601 | ---- |
| 2 | 3602 | (0, -1) — 3901 |
| 3 | 3603 | (0, -1) |
| 4 | 3604 | (0, -1) |

| STEP OF PROCEDURE | PART TO BE ATTACHED | ATTACHING DIRECTION |
|---|---|---|
| 1 | 3601 | ---- |
| 2 | 3603 | (0, −1) ~ 4101 |
| 3 | 3602 | (0, −1) ~ 4102 |
| 4 | 3604 | (0, −1) |

FIG. 48
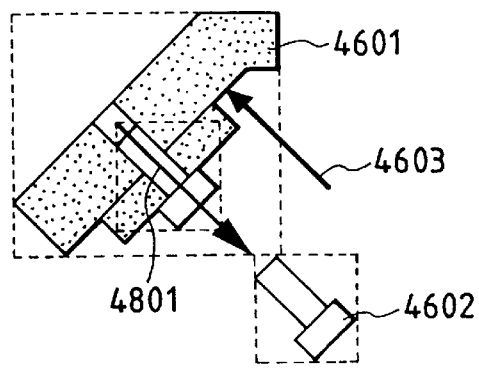
FIG. 49
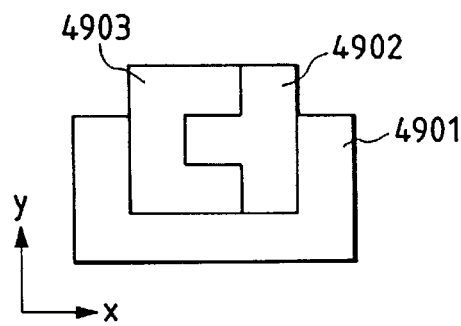
FIG. 50
| ORDER OF STEP | PART TO BE ATTACHED | ATTACHING DIRECTION | LEVEL OF PART |
|---|---|---|---|
| 1 | 4901 | | 1 |
| 2 | 4903 | | 2 |
| 3 | 4902 | -X | 2 |
| 4 | 4902 + 4903 | -Y | 1 |

FIG. 51
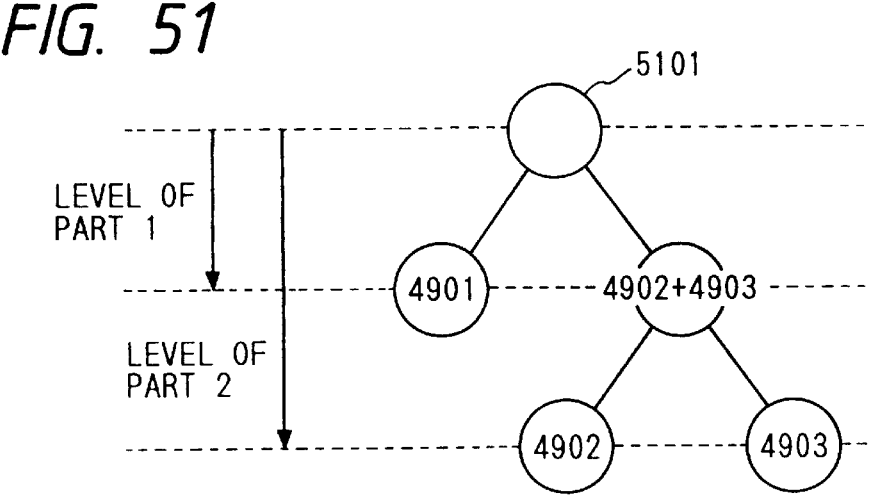
FIG. 53
| | INDEX | NUMBER OF PART | PART NAME LIST | |
|---|---|---|---|---|
| 5301 | 1 | 2 | A, B | |
| 2 | 2 | 1 | C | 5305 |
| | 3 | | | 5304 |
| | 4 | | | |
| | ⋮ | | | |
FIG. 54
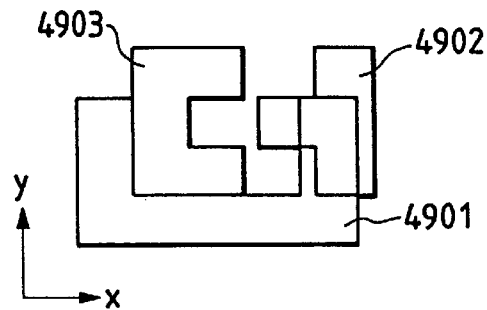

| ORDER OF STEP | PART TO BE ATTACHED | ATTACHING DIRECTION | SUB-ASSEMBLY FLAG |
|---|---|---|---|
| 1 | 4901 |  | 0 |
| 2 | 4904 | -Y | 1 |

| ORDER OF STEP | PART TO BE ATTACHED | ATTACHING DIRECTION | SUB-ASSEMBLY FLAG |
|---|---|---|---|
| 1 | 4903 |  | 0 |
| 2 | 4902 | -X | 0 |

| ORDER OF STEP | PART TO BE ATTACHED | ATTACHING DIRECTION |
|---|---|---|
| 1 | 5901 | -Y |
| 2 | 5902 | -Y |
| 3 | 5903 | -Y |
| 4 | 5904 | -Y |

| ORDER OF STEP | PART TO BE ATTACHED | ATTACHING DIRECTION |
|---|---|---|
| 1 | 5901 | -Y |
| 2 | 5902 | -Y |
| 3 | 5904 | -Y |
| 4 | 5903 | -Y |

| ORDER OF STEP | PART TO BE ATTACHED | ATTACHING DIRECTION |
|---|---|---|
| 1 | 5901 | -Y |
| 2 | 5903 | -Y |
| 3 | 5904 | -Y |
| 4 | 5902 | -Y |

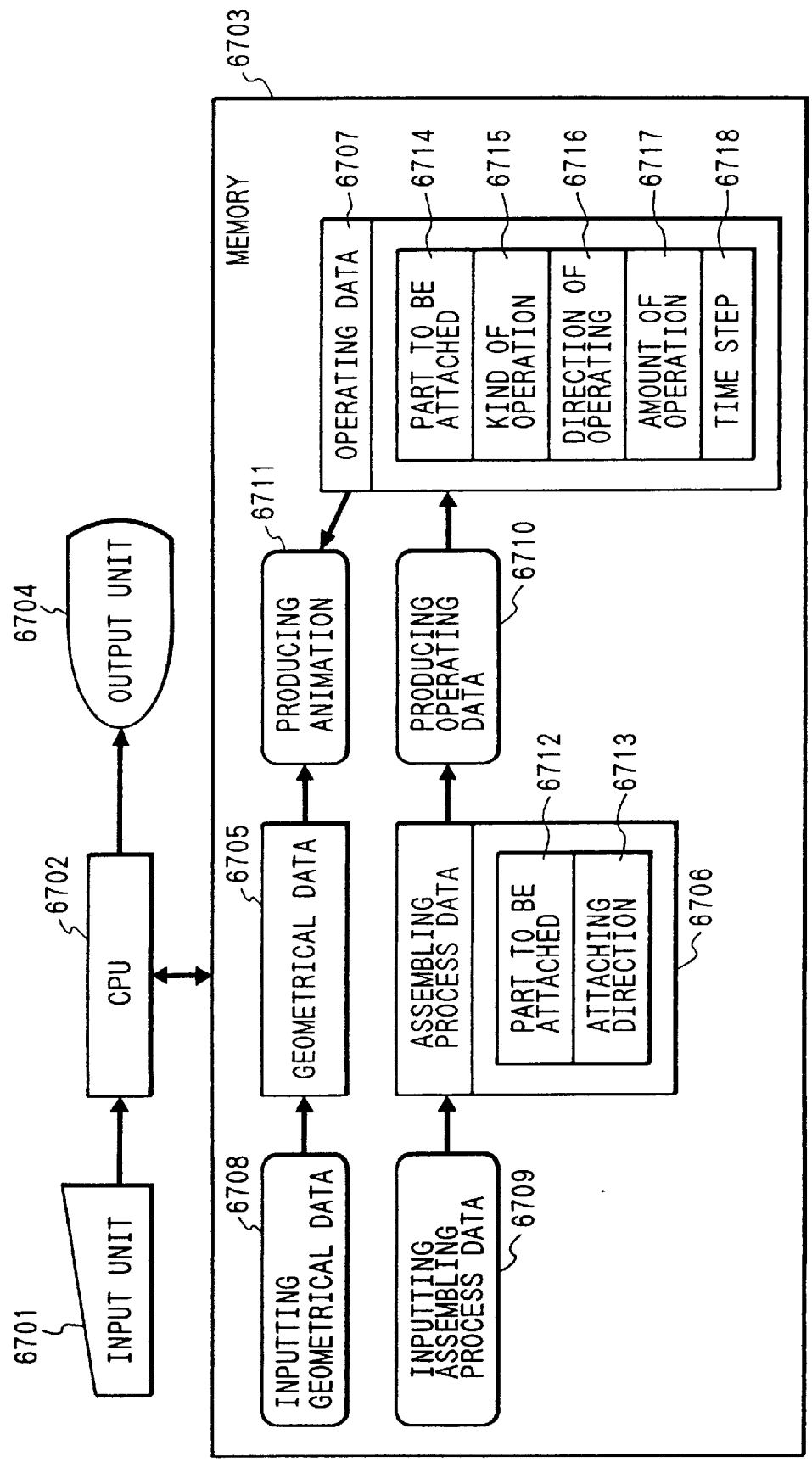

| STEP OF PROCEDURE 7301 | PART TO BE ATTACHED 7302 | ATTACHING DIRECTION 7303 | |
|---|---|---|---|
| | | KIND 7304 | DIRECTION VECTOR 7305 |
| 7306 — 1 | 7201 | — | — |
| 7307 — 2 | 7202 | MOVING | 7206 |
| 7308 — 3 | 7203 | MOVING | 7206 |
| 7309 — 4 | 7204 | MOVING | 7207 |
| 7310 — 5 | 7205 | MOVING | 7208 |

| PART TO BE ATTACHED 7401 | KIND OF OPERATION 7402 | DIRECTION OF OPERATION 7403 | AMOUNT OF OPERATION 7404 | TIME STEP 7405 |
|---|---|---|---|---|
| 7406 — 7202 | STRAIGHT MOVING | -7206 | Dconst | 0.0, Tconst |
| 7407 — 7203 | STRAIGHT MOVING | -7206 | Dconst | 0.0, Tconst |
| 7408 — 7204 | STRAIGHT MOVING | -7207 | Dconst | 0.0, Tconst |
| 7409 — 7205 | STRAIGHT MOVING | -7208 | Dconst | 0.0, Tconst |

| PART TO BE ATTACHED 7401 | KIND OF OPERATION 7402 | DIRECTION OF OPERATION 7403 | AMOUNT OF OPERATION 7404 | TIME STEP 7405 |
|---|---|---|---|---|
| 7901 — 7202 | STRAIGHT MOVING | 7206 | Dconst | ST1=Tconst<br>ET1=Tconst+Tint |
| 7902 — 7203 | STRAIGHT MOVING | 7206 | Dconst | ST2=Tconst+Tint<br>ET2=Tconst+2*Tint |
| 7903 — 7204 | STRAIGHT MOVING | 7207 | Dconst | ST3=Tconst+2*Tint<br>ET3=Tconst+3*Tint |
| 7904 — 7205 | STRAIGHT MOVING | 7208 | Dconst | ST4=Tconst+3*Tint<br>ET4=Tconst+4*Tint |

| METHOD OF JOINTING 8501 | SPECIAL OPERATION 8502 |
|---|---|
| SCREW | REVOLUTION |
| WELDING | FREEZING |
| SOLDERING | FREEZING |
| ⋮ | ⋮ |

FIG. 89

| STEP OF PROCEDURE | PART TO BE ATTACHED | ATTACHING DIRECTION | |
|---|---|---|---|
| | | KIND | DIRECTION VECTOR |
| 1 | 8801 | — | — |
| 2 | 8802 | MOVING | 8803 |

FIG. 90

| PART TO BE ATTACHED | PART ACCEPTING PART TO BE ATTACHED | METHOD OF JOINTING | PARAMETER |
|---|---|---|---|
| 8802 | 8801 | SCREW | POINT OF CENTER (10.0, 20.0, 30.0) AXIS OF CENTER (0.0, 0.0, 1.0) LENGTH OF SCREW (20.0) |

FIG. 91

| PART TO BE ATTACHED | KIND OF OPERATION | DIRECTION OF OPERATION | AMOUNT OF OPERATION | TIME STEP |
|---|---|---|---|---|
| 9101 — 8802 | STRAIGHT MOVING | 8803 | Dconst | ST1=Tconst  ET1=Tconst+Tint |
| 9102 — 8802 | REVOLUTION | Dv | Drot | ST2=ST1  ET2=ET1 |

| METHOD OF JOINTING 9501 | SPEED RATIO 9502 |
|---|---|
| SNAP | 1.0 |
| SCREW | 1.5 |
| WELDING | 0.2 |
| SOLDERING | 0.2 |

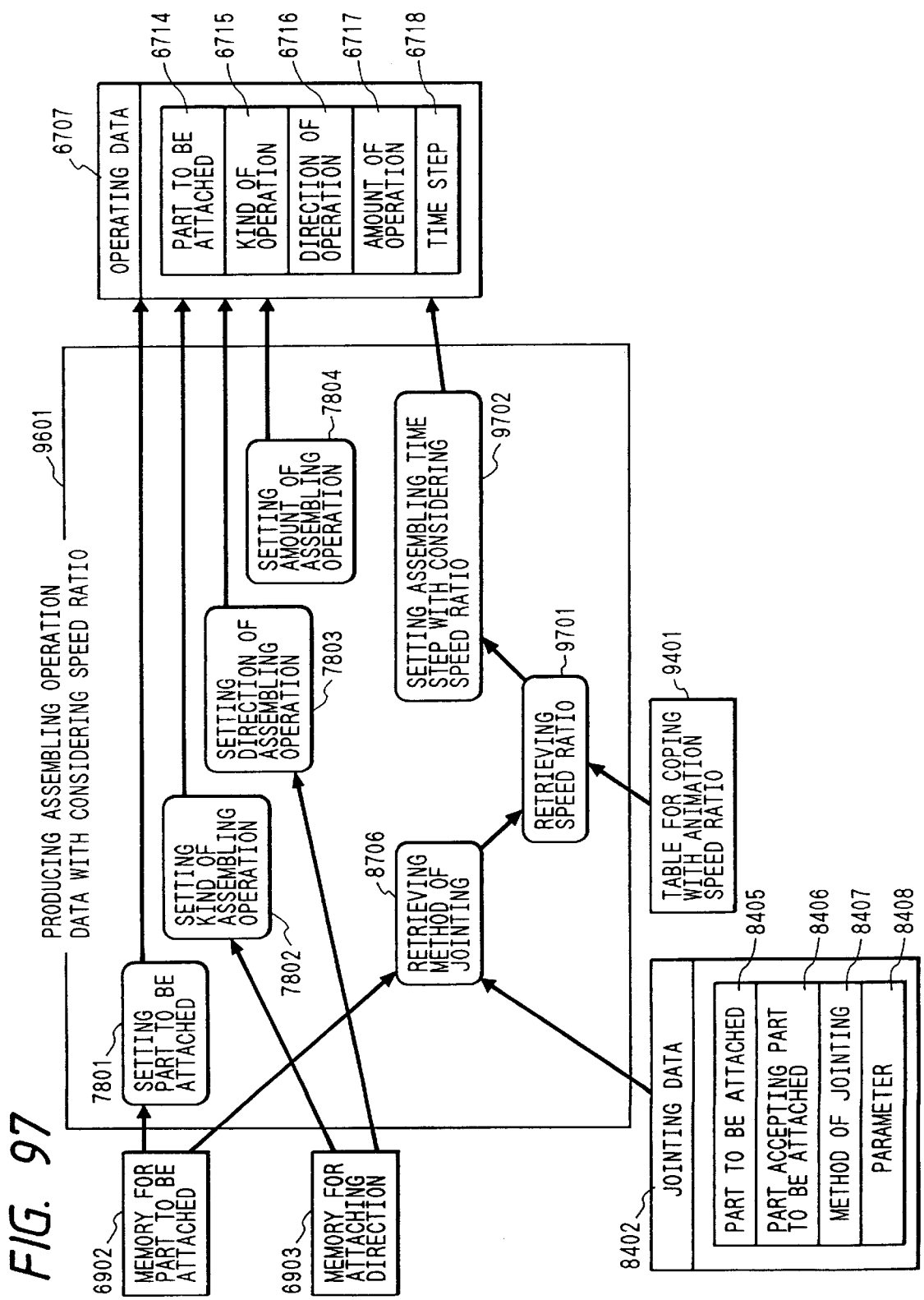

FIG. 99

| STEP OF PROCEDURE | PART TO BE ATTACHED | ATTACHING DIRECTION | |
|---|---|---|---|
| | | KIND | DIRECTION VECTOR |
| 9901 — 1 | 9801 | — | — |
| 9902 — 2 | 9802 | MOVING | 9804 |
| 9903 — 3 | 9803 | MOVING | 9804 |

FIG. 100

| PART TO BE ATTACHED | PART ACCEPTING PART TO BE ATTACHED | METHOD OF JOINTING | PARAMETER |
|---|---|---|---|
| 9802 | 9801 | SNAP | — — — — — |
| 9803 | 9801 | SCREW | — — — — — |

FIG. 101

| PART TO BE ATTACHED | KIND OF OPERATION | DIRECTION OF OPERATION | AMOUNT OF OPERATION | TIME STEP |
|---|---|---|---|---|
| 10101 — 9802 | STRAIGHT MOVING | 9804 | Dconst | ST1=Tconst<br>ET1=Tconst+1.0*Tint |
| 10102 — 9803 | STRAIGHT MOVING | 9804 | Dconst | ST2=ET1<br>ET2=ST2+1.5*Tint |

| METHOD OF JOINTING 10601 | OPERATION SOUND 10602 |
|---|---|
| SNAP | NONE |
| SCREW | "SQUEAK" |
| WELDING | "SWISH" |
| SOLDERING | "FRIZZLE" |
| ⋮ | ⋮ |

FIG. 109
| PART TO BE ATTACHED | KIND OF OPERATION | DIRECTION OF OPERATION | AMOUNT OF OPERATION | TIME STEP | OPERATION SOUND |
|---|---|---|---|---|---|
| 10901 ~ 9802 | STRAIGHT MOVING | 9804 | Dconst | ST1 ET1 | NONE |
| 10902 ~ 9803 | STRAIGHT MOVING | 9804 | Dconst | ST2 ET2 | "FREZZLE" |
FIG. 111
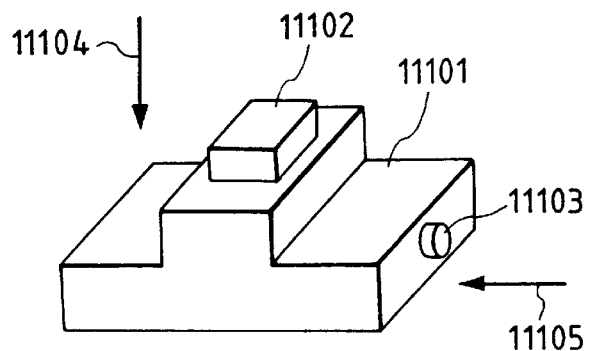
FIG. 112
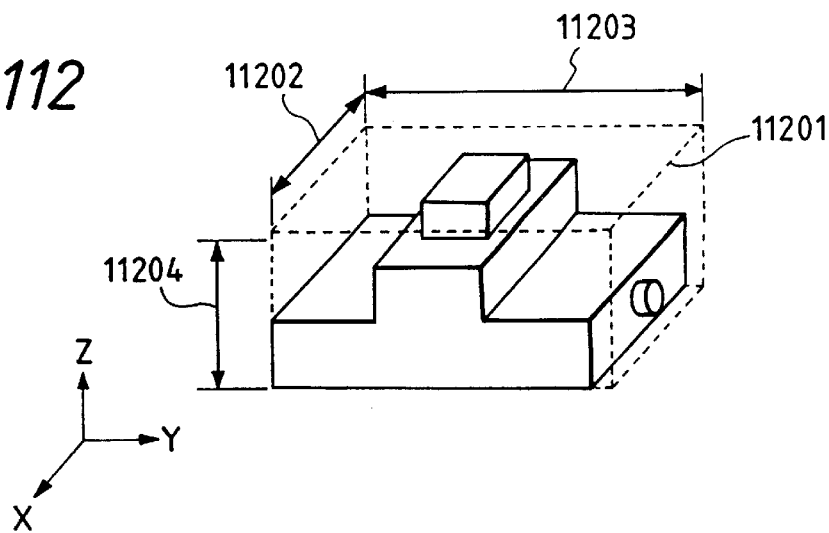

FIG. 118
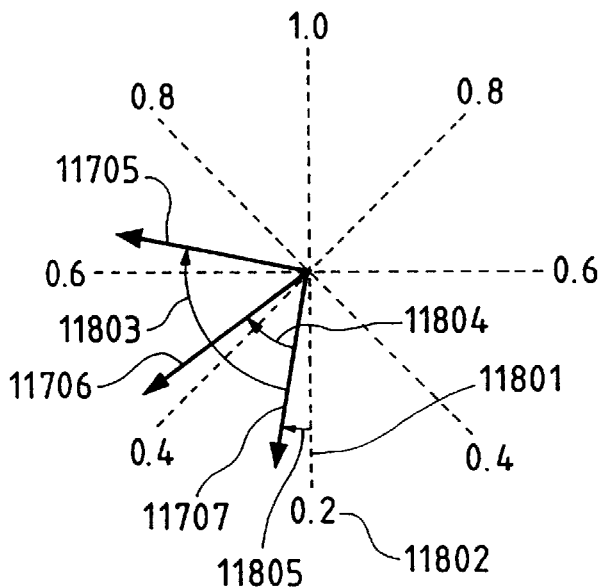
FIG. 119
| 11901 KIND OF WORK | 11902 WORK PARAMETER |
|---|---|
| ARC WELDING | LENGTH OF WELDING (50cm) |
| SPOT WELDING | FORCE OF PRESS-INSERTING (50N) |
| SOLDERING | NUMBER OF SOLDERING POINTS (5 PORTIONS) |
FIG. 120
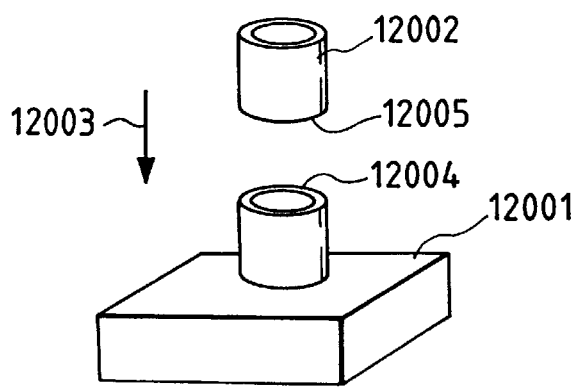

| PART TO BE ATTACHED | KIND OF OPERATION | DIRECTION OF OPERATION | AMOUNT OF OPERATION | TIME STEP | DISPLAY FLAG 12405 |
|---|---|---|---|---|---|
| 12401~9802 | STRAIGHT MOVING | -9804 | Dconst | ST1 ET1 | "NON-DISPLAY" |
| 12402~9803 | STRAIGHT MOVING | -9804 | Dconst | ST2 ET2 | "NON-DISPLAY" |
| 12403~9802 | STRAIGHT MOVING | 9804 | Dconst | ST3 ET3 | "DISPLAY" |
| 12404~9803 | STRAIGHT MOVING | 9804 | Dconst | ST4 ET4 | "DISPLAY" |

| PART TO BE ATTACHED | KIND OF OPERATION | DIRECTION OF OPERATION | AMOUNT OF OPERATION | TIME STEP | DISPLAY COLOR ~12904 |
|---|---|---|---|---|---|
| 12901~9802 | STRAIGHT MOVING | -9804 | Dconst | ST1 ET1 | "RED" |
| 12902~9802 | STRAIGHT MOVING | -9804 | Dconst | ST2 ET2 | "BLUE" |
| 12903~9802 | STRAIGHT MOVING | — | — | ST3 ET3 | "GREEN" |

FIG. 131
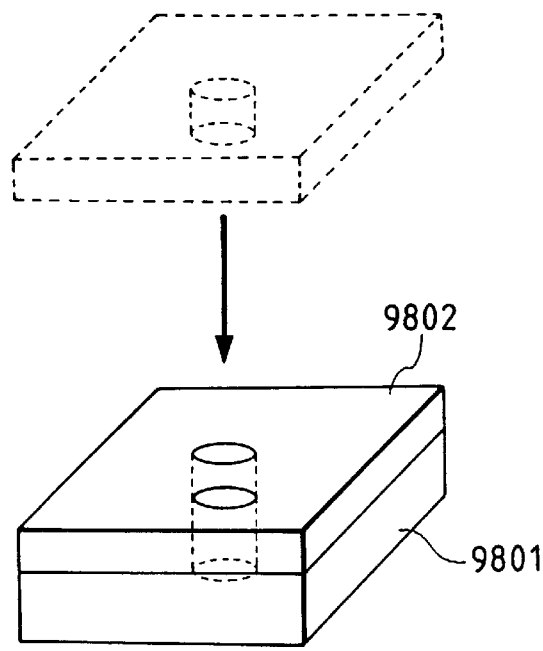
FIG. 133
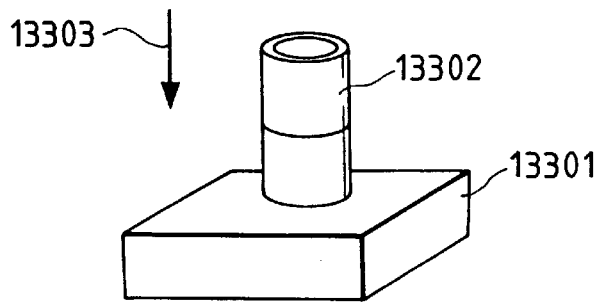
FIG. 134
| STEP OF PROCEDURE | PART TO BE ATTACHED | ATTACHING DIRECTION | |
|---|---|---|---|
| | | KIND | DIRECTION VECTOR |
| 13401 — 1 | 13301 | — | — |
| 13402 — 2 | 13302 | MOVING | 13303 |

| PART TO BE ATTACHED | PART ACCEPTING PART TO BE ATTACHED | METHOD OF JOINTING | PARAMETER |
|---|---|---|---|
| 13302 | 13301 | WELDING | |

| PART TO BE ATTACHED | KIND OF OPERATION | DIRECTION OF OPERATION | AMOUNT OF OPERATION | TIME STEP | MESSAGE |
|---|---|---|---|---|---|
| 13302 | STRAIGHT MOVING | 13303 | Dconst | ST1 ET1 | "UNDER WELDING WORK" |

13601

APPARATUS FOR PRODUCING EXPLODED VIEW AND ANIMATION OF ASSEMBLING, AND METHOD THEREOF

This application is a Continuation of application Ser. No. 08/395,993, filed Feb. 28, 1995.

BACKGROUND OF THE INVENTION

The present invention relates to a method and an apparatus for producing an exploded view, the exploded view being produced for the purpose of showing the structure of an assembly composed of plural parts, an assembling procedure in a manufacturing process, or a procedure for maintenance and inspection or repairing of the structure, for example.

The present invention relates to a method and apparatus for producing an animation showing assembling of parts by which a structure of an assembly composed of plural parts, or an assembling procedure in a manufacturing process, is confirmed on a screen of a central processing unit.

An exploded view is a drawing in which parts composing an assembly are disassembled from an assembled state into pieces and arranged in an assembling order in the reverse direction of attachment. Such an exploded view is used for the purpose of showing the structure of an assembly composed of plural parts, an assembling procedure in a manufacturing process, or a procedure for maintenance and inspection or repairing of the structure, for example.

In the past, an exploded view has been produced by hand procedure manual showing assembling procedure and the like.

And in recent years, a CAD system is used in design of products. An operator has made an exploded view by producing an assembly drawing of a product produced using a three-dimensional CAD system and by moving parts with moving command in taking the assembling procedure into consideration based on the data produced with the three-dimensional CAD system.

In the conventional technology, it has taken a very long time to make an exploded view since it is produced by hand. Although by utilizing geometrical data of assembly produced with a three-dimensional CAD system eliminates needs to draw at least geometrical pictures of parts, it takes a long time for an operator to move parts one by one by instructing moving directions and moving amounts.

Further, in a stage of studying an assembling procedure in the preparation state of manufacturing, it is necessary to confirm whether the assembling procedure is correct or not. However, since a try and error method is required in determining an assembling procedure, there is a problem in that it takes a large manpower to do making the exploded view over by hand in every procedure change.

In a conventional method of process procedure for producing an animation of assembling, an assembled model as a geometry of a product in an assembled state is produced using a three-dimensional CAD system, and geometrical data is input in an animation display system. Then, operating data inputting operation process is executed to set operating data as input parameters for animation display function.

After setting the operating data to each of parts composing the product, animation producing process is executed to display the sembling process of the product by animation.

In the above operating data inputting process, a subject part for operating data is firstly specified. Next, the kind, the direction and the amount of operation are set. Assuming that a part is moved, for example, straight in the positive direction of z-axis by the distance of "500", it is necessary to set as "straight moving", (0.0, 0.0, 1.0), "500.0".

Lastly, the time step of operation is set. The time step is to indicate the time range of moving of the part, and in order to make confirmation of attaching order of parts, an operator needs to set the time step so that the time range is not overlapped with a time range of another part with taking the attaching order of each part into consideration.

In a conventional apparatus for producing animation of assembling, a program for inputting geometrical data takes out geometrical information of an assembly from an input unit and stores it to a geometrical data area. A program for inputting operating data inputs operating data as input parameters for animation display function for each part composing the assembly from the input unit.

A program for producing animation produces animation data from the geometrical data and the operating data and outputs it to the output unit. As described above, in the conventional method, it is necessary to set the operation data to all the parts composing the assembly with taking the attaching order into consideration.

The conventional technique is described in, for example, Japanese Patent Application Laid-Open No.61-147375 (1986), Japanese Patent Application Laid-Open No.5-324779 (1993), Japanese Patent Application Laid-Open No.4-37960 (1992).

In the conventional technology for producing animation, there is a disadvantage in that operation of an operator becomes complicated since the operating data has to be set each unit of parts. Further, there is a disadvantage in that when number of parts in a product is large, it takes very long time to set operating data to the parts with taking the assembling order of the product into consideration.

Furthermore, there is a disadvantage in that it is difficult for the operator to understand the detailed contents and the degree of difficulty of the assembling work using a simple animation in which all the parts to be attached are moved in a constant speed or are expressed with the same attribute.

SUMMARY OF THE INVENTION

An object of the present invention is to provide an apparatus and a method for easily producing an exploded view capable of confirming an assembling procedure in ease.

The object of the present invention can be attained by providing an apparatus for producing an exploded view having an input unit, a geometrical data memory for storing geometrical data of parts composing an assembly and a calculating unit for displaying the assembly to a display unit based on said geometrical data, which comprises means for determining arranged positions of the parts composing said assembly in a disassembled state based on assembling process data and said geometrical data, an exploded view being displayed in said display unit corresponding to said arranged positions determined.

More particularly, said assembling process data is composed of assembling orders and assembling directions, and said arranging position determining means calculates the scalar products of the vertex coordinates of the part and the assembling vector and obtaining the minimum value of the scalar products, calculating the scalar products of said read-out vertex coordinates of the part and said read-out assembling direction vector and obtaining the maximum value of the scalar products, obtaining the difference between the minimum value of scalar product and the maximum value of scalar product and determining distances between the parts composing said assembly in a disassembled state on an exploded view based on the obtained difference, and displaying an exploded view in said display unit corresponding to said distances determined.

According to the present invention, the arranging position determining means calculates the scalar products of the vertex coordinates of the part and the assembling vector and obtaining the minimum value of the scalar products, calculating the scalar products of said read-out vertex coordinates of the part and said read-out assembling direction vector and obtaining the maximum value of the scalar products, obtaining the difference between the minimum value of scalar product and the maximum value of scalar product and determining distances between the parts composing said assembly in a disassembled state on an exploded view based on the obtained difference, and displaying an exploded view in said display unit corresponding to said distances determined.

Therefore, an exploded view can be automatically produced, the manpower to producing an exploded view can be decreased by eliminating the operator's conventional work to move parts by instructing a moving direction and a moving amount one by one.

Another object of the present invention is to provide an apparatus and a method to easily produce an animation of assembling by which the detailed contents and the degree of difficulty of the assembling procedure and the assembling work can be easily confirmed.

The object of the present invention can be attained by reading out necessary geometrical data from geometrical data of parts composing an assembly; reading out part to be attached data and attaching direction data from attaching procedure data composed of attaching orders, part to be attached data and attaching direction data; obtaining a corresponding jointing method to the part to be attached read out in the above step from jointing data composed of part to be attached data and jointing method data, obtaining a corresponding special operation to the jointing method obtained in the above step from a table for special-jointing-operation composed of jointing methods and operation data special for said jointing methods; and producing operating data for part to be attached as an input parameter to an animation display function from the attaching direction and the special operation with referring to the geometrical data of the part to be attached.

The object of the present invention can be attained by reading out necessary geometrical data from geometrical data of parts composing an assembly; reading out part to be attached data and attaching direction data from attaching procedure data composed of attaching orders, part to be attached data and attaching direction data; obtaining a corresponding jointing method to the part to be attached read out in the above step from jointing data composed of part to be attached data and jointing method data; obtaining a corresponding animation speed ratio to the jointing method obtained in the above step from a table for animation-speed composed of jointing methods and operating speed ratio data special for said jointing methods; and producing operating data for part to be attached as an input parameter to an animation display function from the attaching direction and the animation speed ratio with referring to the geometrical data of the part to be attached.

The object of the present invention can be attained by reading out necessary geometrical data from geometrical data of parts composing an assembly; reading out part to be attached data and attaching direction data from attaching procedure data composed of attaching orders, part to be attached data and attaching direction data; obtaining a corresponding jointing method to the part to be attached read out in the above step from jointing data composed of part to be attached data and jointing method data; obtaining a corresponding sound data to the jointing method obtained in the above step from a table for jointing sound composed of jointing methods and sound data special for said jointing methods; and producing operating data for part to be attached as an input parameter to an animation display function from the attaching direction and the sound data with referring to the geometrical data of the part to be attached.

The operating data of parts to be attached for producing an animation is produced by making linkage among the geometrical data of parts to be attached, the attaching direction data and the jointing method for jointing between parts.

Thereby, there is provided the operating data for animation in which a part to be attached in an assembled state is detached from the assembly and is again attached into the assembling state. By applying this operation to all the parts composing the assembly according to the assembling procedure, the operating data for all parts can be obtained and consequently the animation of assembling which shows the attaching order of the assembly with moving pictures is easily produced.

BRIEF DESCRIPTION OF THE DRAWINGS

FIG. 20 is a block diagram showing the structure of an embodiment of an apparatus for producing exploded view according to the present invention.

FIG. 48 is a view showing a state after completion of determining the arrangement position.

FIG. 49 is a view showing a geometrical data of an assembly with assembling of a sub-assembly.

FIG. 50 is a diagram showing the data structure of an assembling process data with assembling of a sub-assembly.

FIG. 51 is a diagram expressing an assembly by a tree structure.

FIG. 53 is a diagram showing the data structure of a stack for part accepting part to be attached.

FIG. 54 is a view showing a intermediate state during producing an exploded view.

FIG. 67 is a functional structural diagram showing an embodiment of an apparatus for producing animation of assembling according to the present invention.

FIG. 89 is a diagram showing an embodiment of assembling procedure data.

FIG. 90 is a diagram showing an embodiment of jointing data.

FIG. 91 is a diagram showing operation data of assembling operation produced by an embodiment according to the present invention.

FIG. 97 is a functional structural diagram showing an apparatus executing assembling operation data producing process.

FIG. 99 is a diagram showing an embodiment of assembling procedure data.

FIG. 100 is a diagram showing an embodiment of jointing data.

FIG. 101 is a diagram showing operation data of assembling operation produced by an embodiment according to the present invention.

FIG. 109 is a diagram showing operation data of assembling operation produced by an embodiment according to the present invention.

FIG. 111 is a view showing an example of assembly.

FIG. 112 is a view showing an embodiment of a bounding box containing the geometry of the whole parts of an assembly.

FIG. 118 is a view explaining the operation principle of assembling operation data producing process.

FIG. 119 is a diagram showing an embodiment of working data.

FIG. 120 is a view showing an example of an assembly detached by detaching operation.

FIG. 121(A) shows functions calculating an animation time for an embodiment of assembling operation data producing means.

FIG. 121(B) is a view showing an animation display based on produced assembling operation data.

FIG. 122 is a structural diagram showing an apparatus realizing an embodiment according to the present invention.

FIG. 123 is a functional structural diagram showing an apparatus executing assembling operation data producing process.

FIG. 124 is a diagram showing operation data of assembling operation produced by an embodiment according to the present invention.

FIG. 125 is a view showing an animation display based on the operation data produced by an embodiment according to the present invention.

FIG. 126 is a view showing an animation display based on the operation data produced by an embodiment according to the present invention.

FIG. 127 is a view showing an animation display based on the operation data produced by an embodiment according to the present invention.

FIG. 128 is a functional structural diagram showing an apparatus executing assembling operation data producing process.

FIG. 129 is a diagram showing operation data of assembling operation produced by an embodiment according to the present invention.

FIG. 130 is a view showing an animation display based on the operation data produced by an embodiment according to the present invention.

FIG. 131 is a view showing an animation display based on the operation data produced by an embodiment according to the present invention.

Figure 132:
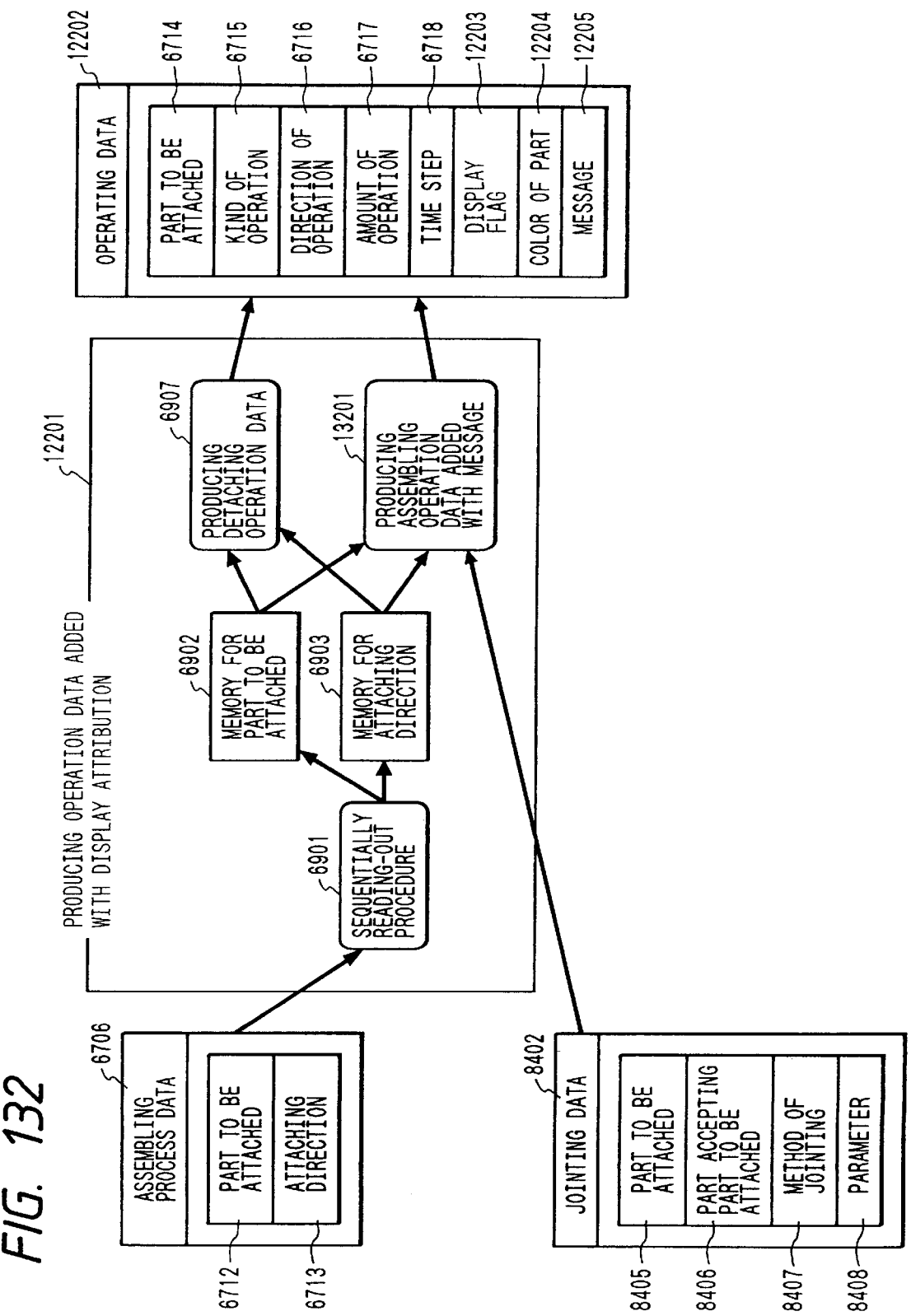

FIG. 132 is a functional structural diagram showing an apparatus executing assembling operation data producing process.

FIG. 133 is a view showing an example of assembly.

FIG. 134 is a diagram showing an embodiment of assembling procedure data.

Figures 135, 136, 137:
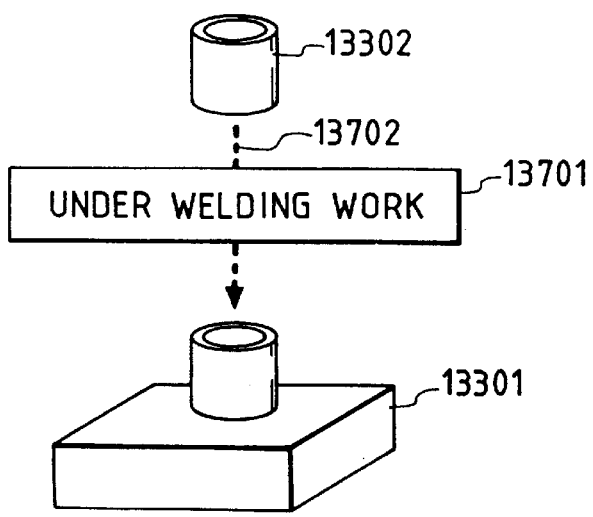

FIG. 135 is a diagram showing an embodiment of jointing data.

FIG. 136 is a diagram showing operation data of assembling operation produced by an embodiment according to the present invention.

FIG. 137 is a view showing an animation display based on the operation data of assembling operation produced by an embodiment according to the present invention.

DESCRIPTION OF THE INVENTION

Figure 1:
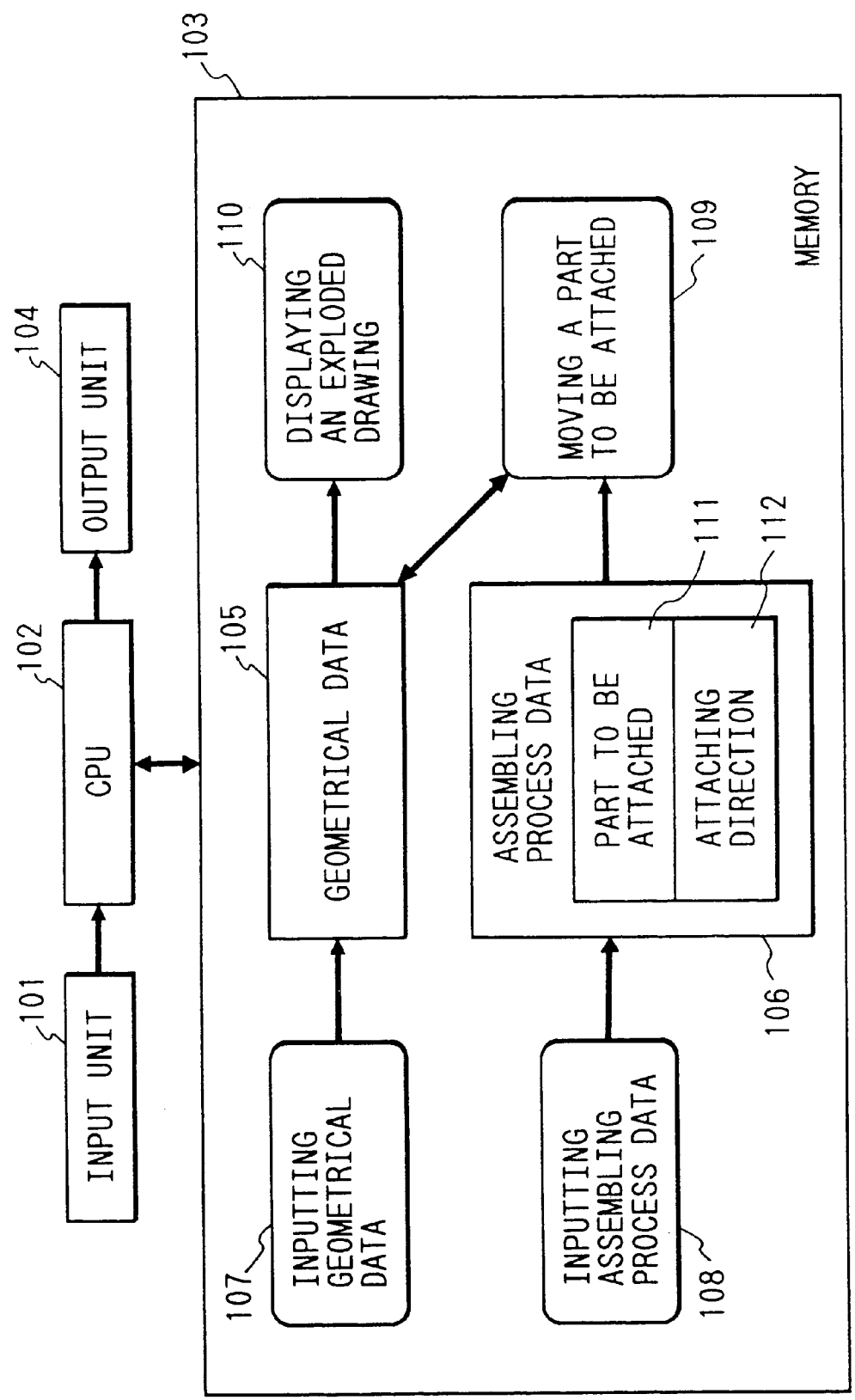
FIG. 1 is a block diagram showing the construction of an embodiment of an apparatus for producing exploded view according to the present invention.

FIG. 1 shows the structure of an embodiment of an apparatus for producing an exploded view according to the present invention, an input unit 101 is composed of a machine taking instructions from an operator such as key-boards and a mouse and a machine receiving data from another computer such as a communication apparatus and a floppy disk drive.

A central processing unit (CPU) 102 is constructed with a CPU which calculates data in a memory 103 according to a program stored in the memory 103, and exchanges data between the input unit 101 and an output unit 104. The memory 103 is constructed with random access memories, magnetic disks and so on, and stores programs and data. The output unit 104 is constructed with a display unit such as a CRT, machines to transfer data to another computer such as a communication apparatus and a floppy disk drive.

The memory 103 stores geometrical data 105, assembling process data 106, a program 107 for inputting geometrical data, a program 108 for inputting assembling process data, a program 109 for moving part to be attached, and a program 110 for displaying exploded view.

The shapes of the components are stored in the geometrical data 105 every component each. The geometrical data 105 area stores geometrical information of an assembly. The assembling process data 106 area stores parts to be attached 111 and attaching directions in assembling order. The assembling process data might have been generated automatically from the geometrical data 105 by a program.

The program 107 for inputting geometrical data fetches geometrical information of an assembly from the input unit 101 and stores it in the geometrical data 105 area. The program for inputting assembling procedure fetches parts to be attached and attaching directions from the input unit 101 in assembling order and stores them in the assembling process data 106 area.

The program 109 for moving part to be attached calculates the position of a part to be attached on an exploded view using the geometrical data of the part to be attached 111, the geometrical data of a part having been attached and an attaching direction 112, changes the part positions of the parts to be attached in the geometrical data 105. The program 110 for displaying exploded view puts out the geometrical data 105 to the output unit 104.

Inputting of the geometrical data 105 and the assembling process data 106 is performed by an operator with using a mouse and a key-board, or through a net-work or a floppy disk in a case of data prepared by another computer.

Figure 43:
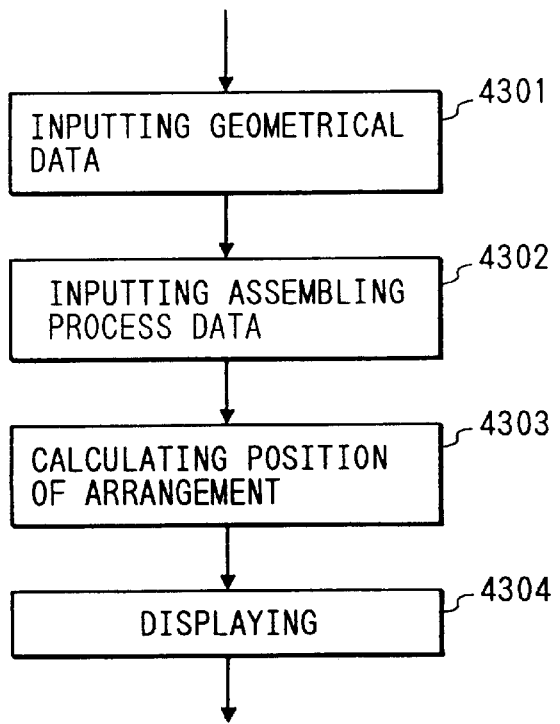
FIG. 43 is a process flow chart of an embodiment of a method of producing an exploded view according to the present invention.

FIG. 43 shows an embodiment of a method for producing an exploded view according to the present invention. In process 4301, geometrical data of parts relating to an object to be assembled and arrangement positions of parts in the state of the completion of assembling are fetched. In process 4302, the assembling process data composed of data on assembling orders of parts and assembling directions is fetched.

In process 4303, a position of the each part composing the assembly in a disassembled state is calculated using the geometry of the part, the arrangement position, the assembling order and the assembling direction. In process 4304, the geometries of the parts are indicated based on the arranging positions obtained in process 4303.

Figure 2:
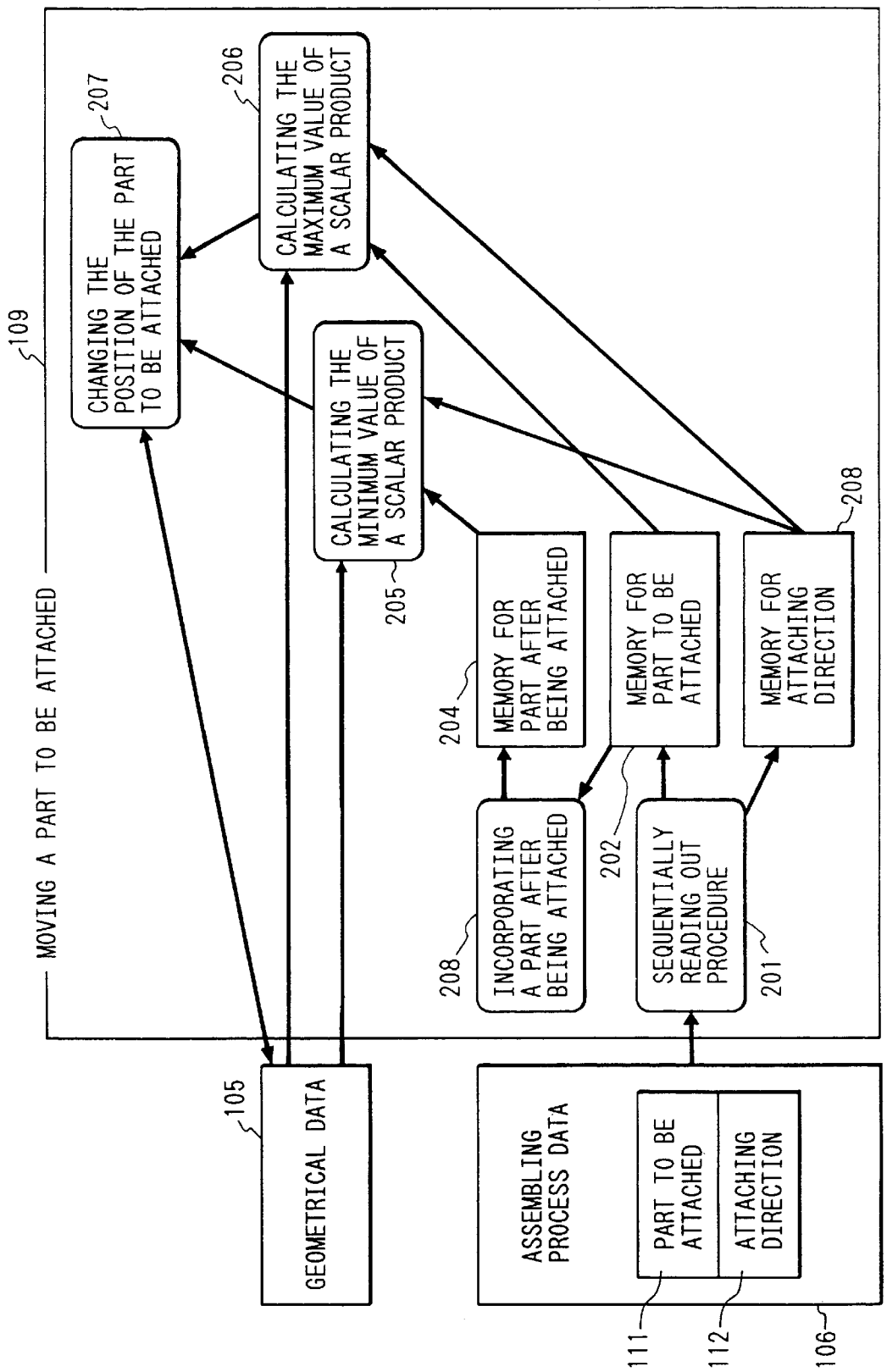
FIG. 2 is a block diagram showing the detailed structure of the part for moving part to be attached in FIG. 1.

FIG. 2 shows the detailed construction of an embodiment of a program 109 for moving part to be attached. A program 201 for sequentially reading-out procedure reads out assembling procedures in the assembling process data 106 area one by one, and stores it into a memory 202 for part to be attached and a memory 208 for attaching direction. The attaching direction 112 indicates the direction when a part to be attached is attached to a part having been attached, and is a unit vector. Let the vector be $V_a$.

The memory 204 for part having been attached stores a list of parts having been attached in the steps of procedure before a certain step of assembling procedure. The program 205 for calculating the minimum value of scalar product reads out the list of parts having been attached form the memory 204 for part having been attached, calculates the scalar products of the vertex coordinates of the parts and the attaching direction, and calculates the minimum value among them. Let the minimum value be $D_{min}$.

The program 206 for calculating the maximum value of scalar product reads out a part to be attached from the memory 202 for part to be attached, and extracts the vertex coordinates of the part from the geometrical data 105, and calculates the scalar product of the coordinates and the attaching direction to obtain the maximum value among them.

Let the maximum value be $D_{max}$. The program 207 for changing position of part to be attached obtains a vector V for moving the part to be attached using the following equation (1). Therein, the value $D_{const}$ is a gap of certain value determined in advance.

$$V=(D_{min}-D_{max}-D_{const}) \times V_a \qquad (1)$$

Then, the position $M_0$ of the part to be attached is fetched from the geometrical data, and multiplied by the moving matrix $M_v$ obtained from the moving vector V to obtain the value M which is written in the geometrical data as a new position of the part. This calculation is performed with the following equation (2).

$$M=M_v \times M_0 \qquad (2)$$

The program 208 for adding part having been attached adds the part to be attached which is changed its position into the memory 204 for part having been attached.

Description will be made below on the principle of production of exploded view with the program 109 for moving part to be attached, referring to a detailed example.

Figure 3:
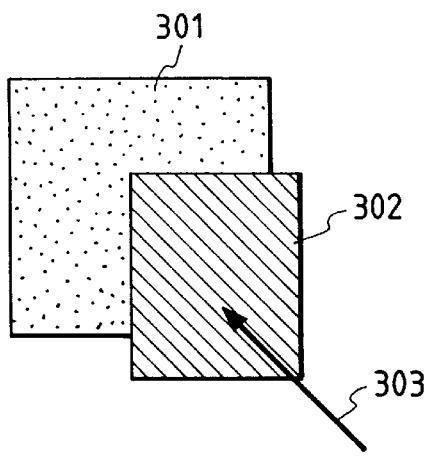
FIG. 3 is a view showing an assembled state of an assembly.

FIG. 3 shows an assembled state of two parts 301 and 302. Let the part 301 be a part having been attached, and the part 302 be a part to be attached. A vector 303 indicates the attaching direction of the part 302. By the program 205 for calculating the minimum value of scalar product, the minimum value of scalar product of the vertex coordinates of the part having been attached 301 and the attaching direction 303 is obtained.

Figure 4:
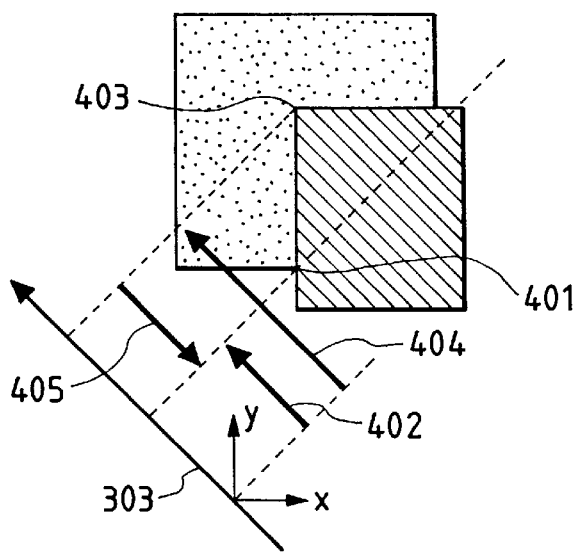
FIG. 4 is a view explaining the operational principle of the part for moving part to be attached in FIG. 2.

In the case of FIG. 3, the scalar product of the vertex coordinate 401 and the attaching direction becomes the minimum as shown in FIG. 4, and the value is a magnitude indicated by the arrow 402. That is, the geometry of the part having been attached 301 exists in a domain larger than the minimum value of scalar product 402 when the attaching direction 303 is thought as a number line.

On the other hand, by the program 206 for calculating the maximum value of scalar product, the maximum value of scalar product of the vertex coordinates of the part to be attached 302 and the attaching direction 303 is obtained.

In the case of FIG. 3, the scalar product of the vertex coordinate 403 and the attaching direction becomes the maximum as shown in FIG. 4, and the value is a magnitude indicated by the arrow 404. That is, the geometry of the part to be attached 302 exists in a domain smaller than the maximum value of scalar product 404 when the attaching direction 303 is thought as a number line.

Therefore, subtracting the maximum value 404 from the minimum value 402 makes a value indicated by the arrow 405. As the part to be attached is moved in the attached direction by the distance indicated by the arrow 405, the existing domains of the part having been attached 301 and the part to be attached 302 do not overlap with each other on the number line of the attaching direction 303.

Figure 5:
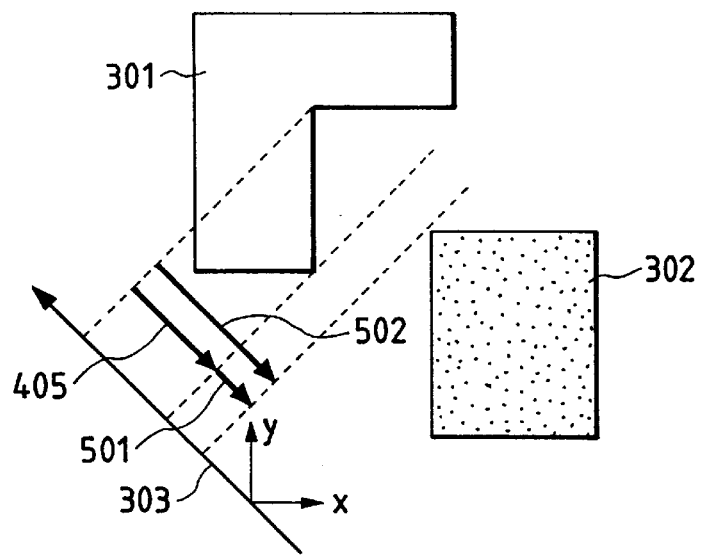
FIG. 5 is a view explaining the operational principle of the part for moving part to be attached in FIG. 2.

Since the domains, however, contact to each other in this state, a pre-set constant value 501 is subtracted from the value 405. Then the moving amount becomes the distance indicated by the arrow 502 as shown in FIG. 5. As the part to be attached 302 is moved in parallel to the attaching direction 303 by the moving amount 502, it is possible to obtain an exploded view in which the part having been attached 301 and the part to be attached 302 are separated from each other.

Figure 6:
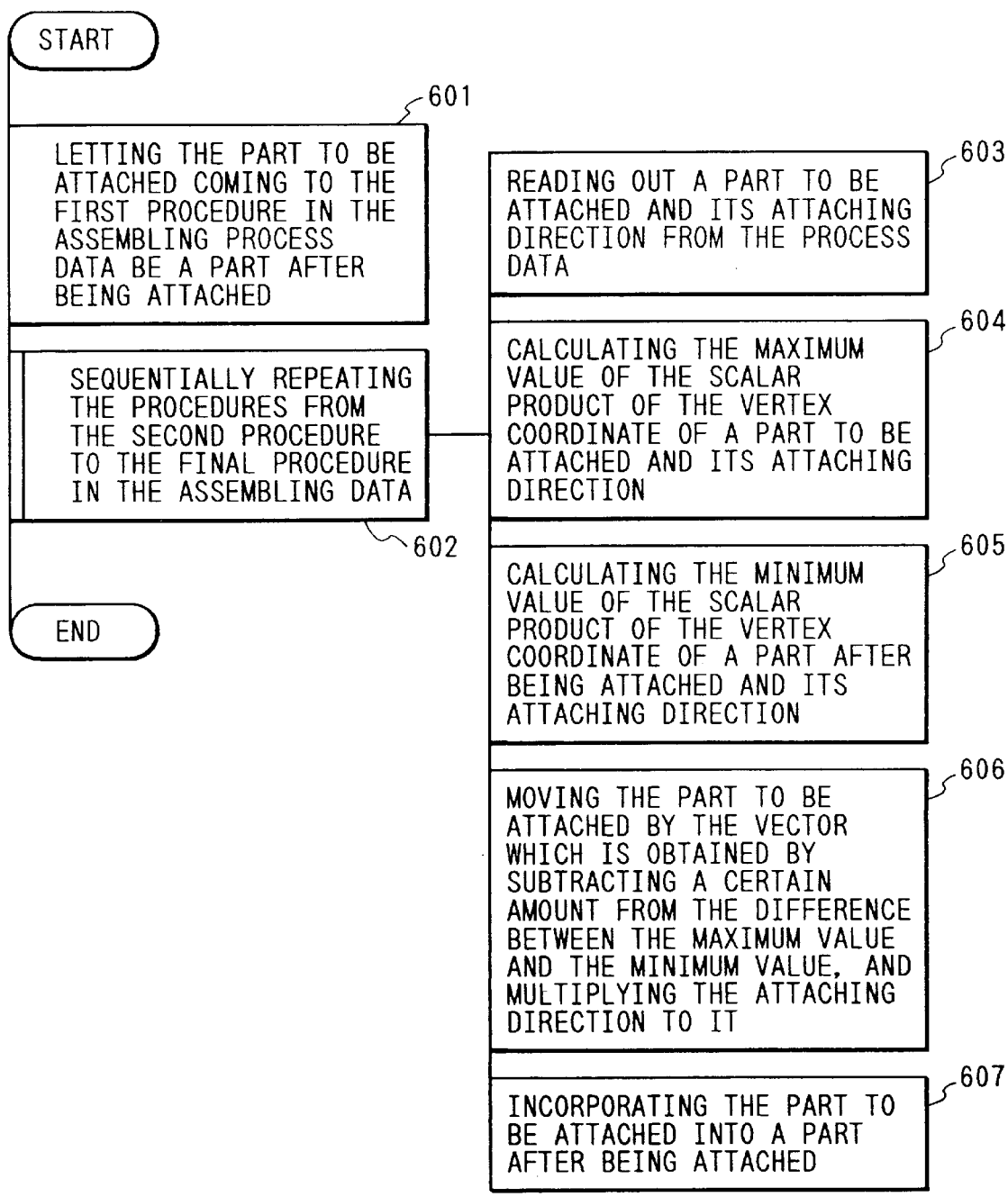
FIG. 6 is a flow chart expressing the processing procedure of the part for moving part to be attached.

FIG. 6 shows the process flow of the program for moving part to be attached. In process 601, a part to be attached in the step of the first procedure in the assembling process data is let be a part having been attached.

In process 602, the processes of process 603 to process 607 are sequentially repeated from the second procedure step to the final procedure step. In process 603, a part to be attached and an attaching direction in the procedure step now are read out from the attaching procedure data.

In process 604, the all vertex coordinates of the part to be attached are read out from the geometrical data, and the scalar product of each of the vertex coordinates and the attaching direction is calculated, and the maximum value is obtained among the values.

In process 605, the all vertex coordinates of the part having been attached are read out from the geometrical data and the scalar product of each of the vertex coordinates and the attaching direction is calculated, and the minimum value is obtained among the values.

In process 606, the part to be attached is moved by the vector which is obtained by subtracting the maximum value and also the certain value from the minimum value and by multiplying the attaching direction to the result. In process 607, the part to be attached brought into the disassembled state by the moving is added to the part having been attached.

Figures 7, 8:
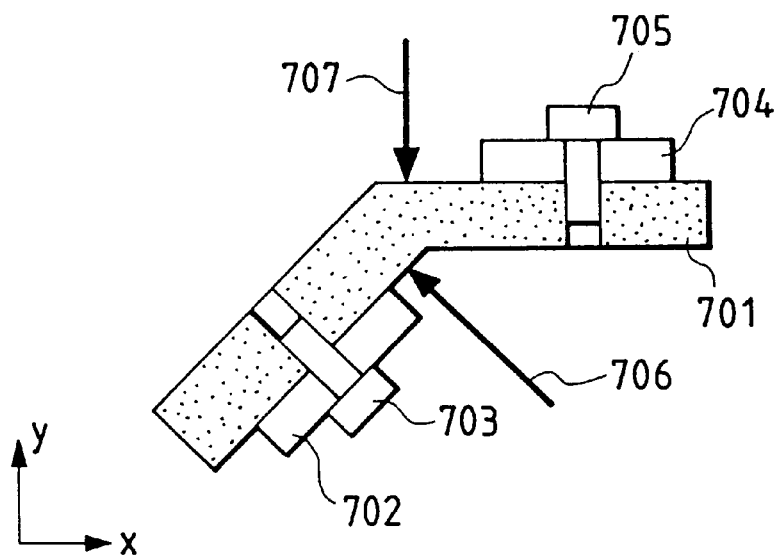
FIG. 7 is a view showing another assembled state of an assembly.
FIG. 8 is a diagram showing the data structure of the assembling process data.

The process of producing an exploded view through the process flow in FIG. 6 will be described below, referring to a detailed example. FIG. 7 shows the geometry of an assembly used in the explanation. The structure of the assembly is that a part 702 is fixed to a plate 701 with a bolt 703, and a part 704 is fixed to the plate 701 with a bolt 705.

The attaching direction of the part 702 and the bolt 703 is indicated by the directional vector 706, and the attaching direction of the part 704 and the bolt 705 is indicated by the directional vector 707.

The assembling process data for the assembly in FIG. 7 is shown in, for example, FIG. 8. The column of step of procedure 801 shows sequence numbers of assembling procedure, and assembling is performed in order of these numbers.

The column of part to be attached 802 shows parts to be attached in the corresponding steps of procedure. The each number in the column of part to be attached in FIG. 8 corresponds to the symbol attached to the each part in FIG. 7.

The column of attaching direction 803 shows direction vectors expressing attaching directions of the parts in the corresponding steps of procedure. The each attaching direction in the column of attaching direction in FIG. 8 corresponds to the symbol attached to the each attached direction in FIG. 7. Since the first procedure step 804 is a case of setting a part at the beginning, there is no need to specify the attaching direction.

Firstly, a part to be attached 701 in the step of the first procedure 804 is let be a part having been attached. In this stage, the assembly is in an assembled state shown in FIG. 7.

Herein, for the purpose of explanation, part having been attached is shown by dot-shading and part to be attached is shown by inclining-hatching in order to discriminate between part to be attached and part having been attached.

Figure 9:
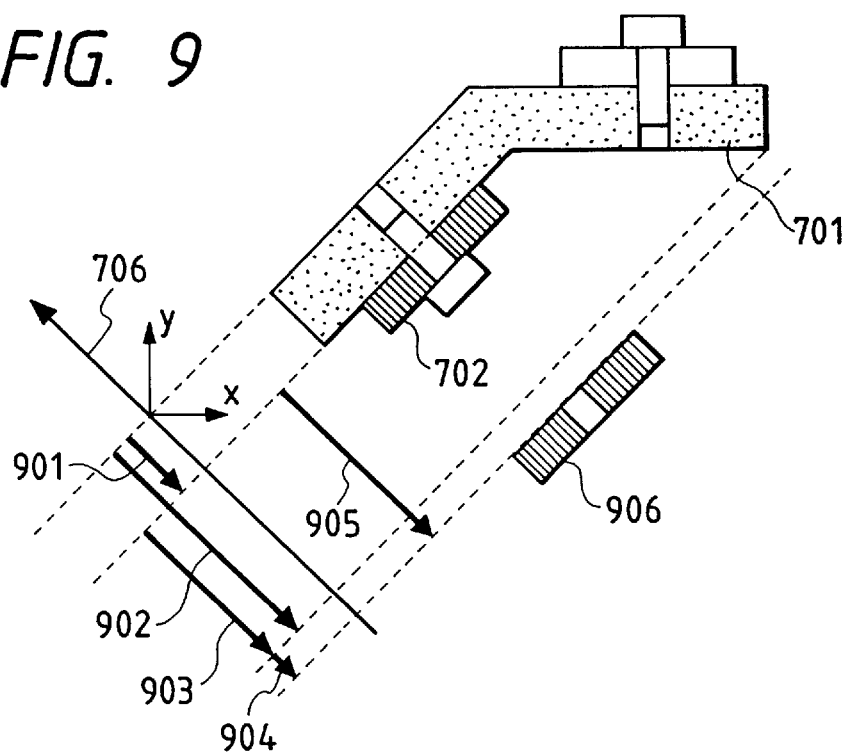
FIG. 9 is a view explaining the operation of the part for moving part to be attached for the assembly shown in FIG. 7.

In the state of FIG. 7, the part 701 is a part having been attached. Next, in process 602, the processes of process 603 to process 607 are sequentially repeated from the procedure step 5 to the procedure step 5. As the process 603 is performed in the second procedure step 805, the part to be attached becomes the state 702. This state is shown in FIG. 9.

By performing process 604 the maximum value of scalar product 901 is obtained, and by performing process 605 the minimum value of scalar product 902 is obtained. By performing process 606 the difference between the minimum value and the maximum value 903 is obtained.

By letting a certain gap value be the amount 904, the moving vector 905 is obtained and the position of the part to be attached 702 becomes the position 906. By performing process 607 the part to be attached 702 becomes a part having been attached 906.

Figure 10:
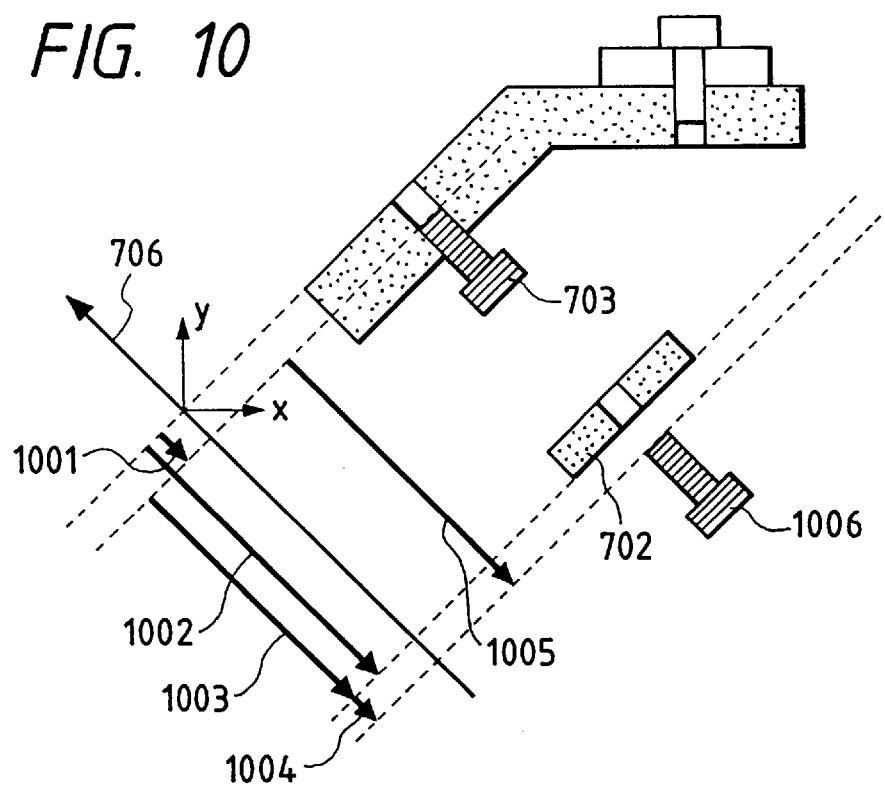
FIG. 10 is a view explaining the operation of the part for moving part to be attached for the assembly shown in FIG. 7.

FIG. 10 shows a feature where process 603 to process 607 are being performed in the third procedure step 806. The part to be attached is the bolt 703 and the attaching direction vector is shown by an arrow 706.

By performing process 604 the maximum value of scalar product becomes the arrow 1001 since the part-to-be attached is the bolt 703. By performing process 605 the minimum value of scalar product becomes an arrow 1002 since the part having been attached is the part 701 and the part 702.

The value 1003 of subtracting the value 1001 from the value 1001 is obtained, and the value 1005 of further subtracting the certain value 1004 from the result is obtained.

As the part 703 which is a part to be attached is moved in the attaching direction 706, the position of the part 703 becomes the position 1006. And the part 703 becomes a part having been attached in the position 1006. Similarly, the part to be attached is the bolt 703 and the attaching direction vector is shown by an arrow 706.

Figure 11:
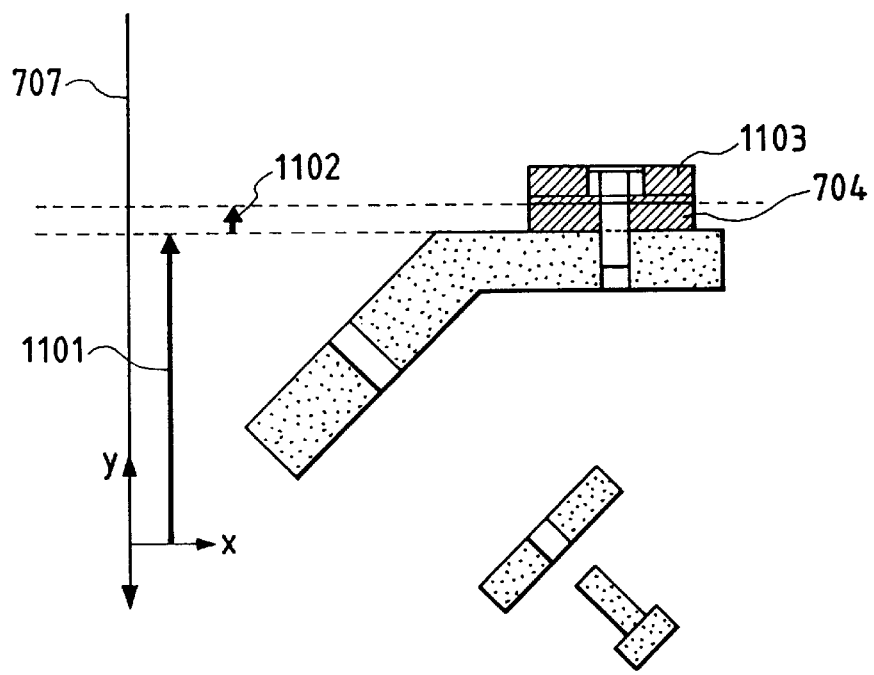
FIG. 11 is a view explaining the operation of the part for moving part to be attached for the assembly shown in FIG. 7.

FIG. 11 shows a feature where process 603 to process 607 are being performed in the fourth procedure step 807. In this case, the maximum value of scalar product is equal to the minimum value of scalar product and becomes as shown by the arrow 1101 in FIG. 11. Therefore, the moving amount is the gap distance 1102. Therefore, the position of the part 704 after moved is the position 1103.

Figure 12:
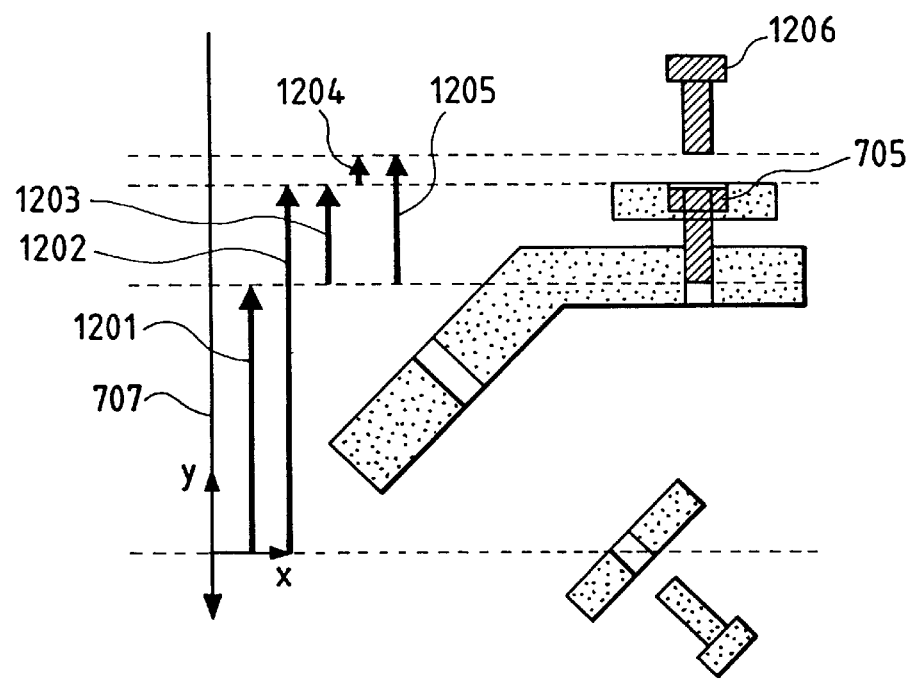
FIG. 12 is a view explaining the operation of the part for moving part to be attached for the assembly shown in FIG. 7.

Further, FIG. 12 shows a feature where process 603 to process 607 are being performed in the fifth procedure step 808. The maximum value of scalar product of the vertex coordinate of the part to be attached 705 and the attaching direction 707 is the magnitude shown by the arrow 1201.

The minimum value among the scalar products of the vertex coordinates of the parts having been attached 701 to 704 and the attaching direction 707 is the amount shown by the arrow 1202.

The difference between the minimum value and the maximum value is the amount shown by the arrow 1203. Letting the gap be the amount shown by the arrow 1204, the moving amount becomes the distance 1205. Therefore, the position of the part 705 after moved is the position 1206.

Figure 13:
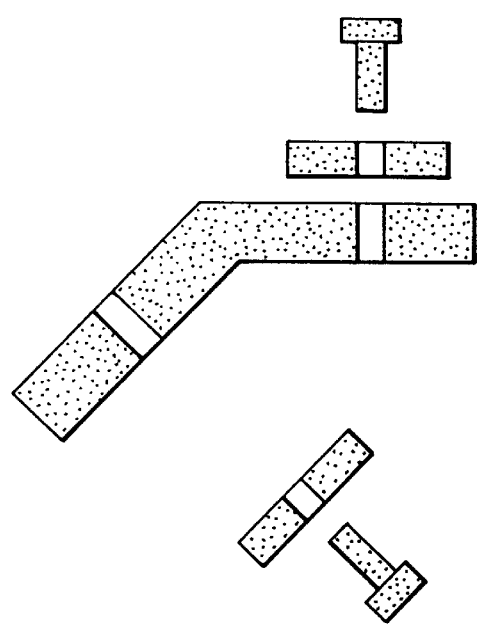
FIG. 13 is an exploded view produced by an embodiment according to the present invention for the assembly shown in FIG. 7.

FIG. 13 shows the feature of geometrical data after completion of the processes. An exploded view can be obtained by displaying the data.

Figure 14:
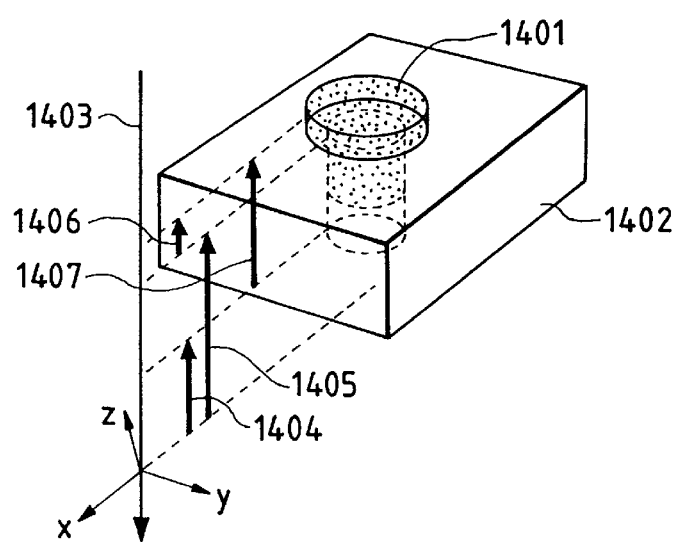
FIG. 14 is a view explaining the operation of the part for moving part to be attached for the assembly in three-dimensional geometry.

Although the description in this embodiment has been made in a case of two-dimension, the present invention can be directly realized in a case of three-dimension. In FIG. 14, for example, let the part 1401 be a part to be attached, the part 1402 be a part having been attached, the part 1403 directing downward be an attaching direction.

The maximum value of scalar product of the attaching direction 1403 and the vertex coordinate of the part to be attached 1401 is the amount shown by the arrow 1404.

Figure 15:
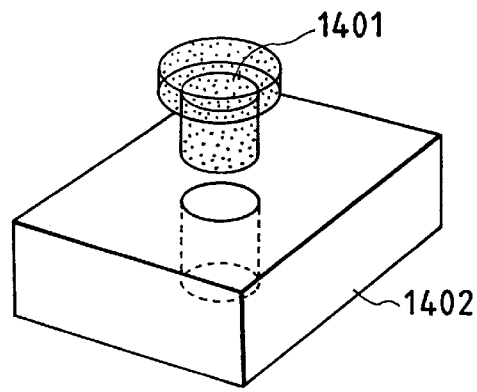
FIG. 15 is an exploded view produced by an embodiment according to the present invention based on three-dimensional geometrical data.

The minimum value of scalar product of the attaching direction 1403 and the vertex coordinate of the part having been attached 1402 is the amount shown by the arrow 1405. The amount of subtracting the maximum value 1405 and the distance 1406 for shift from the minimum value 1404 is the moving vector 1407 of the part to be attached. FIG. 15 shows a geometrical data the part to be attached 1402 after moved by the moving vector.

In the above embodiment, the scalar product of a part to be attached or a part having been attached and an attaching direction is calculated. In a case where a curved surface is included in a part, an easily understandable exploded view can be produced by incorporating the control points of curved lines and curved surfaces into points for calculating the scalar products.

Figure 16:
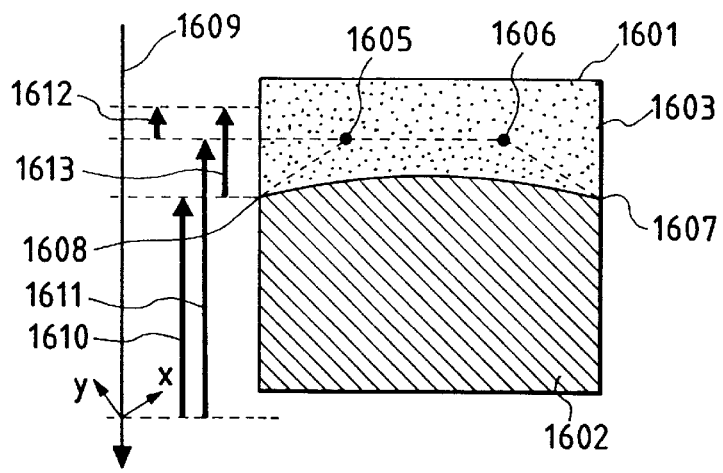
FIG. 16 is a view explaining the operation of an embodiment of the part for moving part to be attached.

In FIG. 16, let the part 1601 be a part to be attached, and the part 1602 be a part having been attached. In a case where a curved surface 1603 is included in both of the part to be attached and the part having been attached, the control points 1605 and 1606 of the curved surface 1603 are incorporated into points for calculating scalar products as well as the coordinates of vertexes 1607, 1608 when the scalar products with the attaching direction 1609 are calculated.

As the result, the maximum value among the scalar products of the coordinates of the vertexes and the control points of the part to be attached 1601 and the attaching direction vector 1609 is the value 1610 of the scalar product of the coordinate of the vertex 1608 and the directional vector 1609.

The minimum value among the scalar products of the coordinates of the vertexes and the control points of the part having been attached 1602 and the attaching direction vector 1609 is the value 1611 of the scalar product of the coordinate of the control point 1605 and the directional vector 1609.

The value 1613 which is obtained by subtracting the gap amount 1612 from the difference of the minimum value 1611 and the maximum value 1610 becomes the moving amount of the part to be attached 1601.

Figure 17:
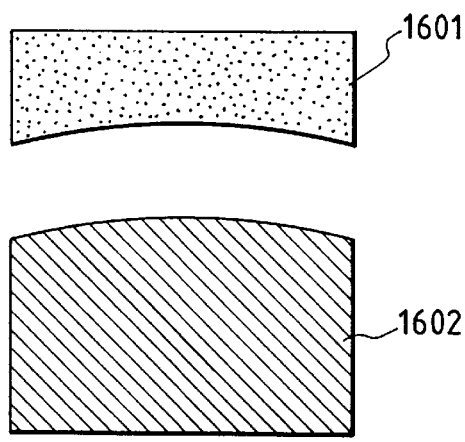
FIG. 17 is an exploded view produced by an embodiment according to the present invention for the assembly shown in FIG. 16.

FIG. 17 shows the geometrical data after moved. Although not all parts including a curved line or curved surface can be detached by using only coordinates of vertexes, by using control points of a curved line and curved surface it is possible to produce an exploded view where all parts are detached.

In another embodiment of the present invention, vertexes of a bounding box which is a polyhedron containing a geometry of a part are used instead of using the vertexes and control points of the geometry of a part.

Figure 18:
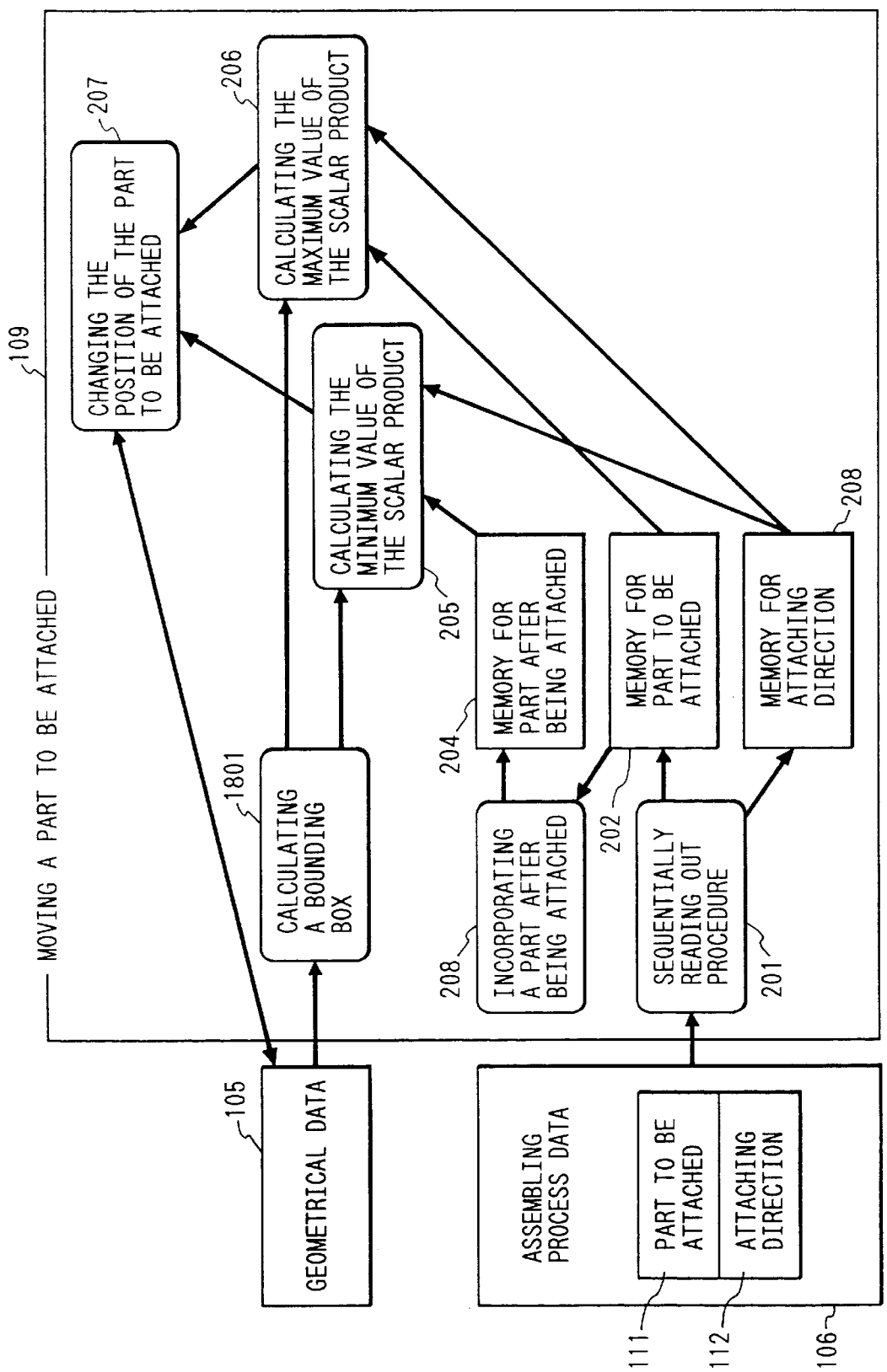
FIG. 18 is a block diagram showing the detailed structure of the part for moving part to be attached in another embodiment of an apparatus for producing exploded view according to the present invention.

FIG. 18 shows the construction of a program 109 for calculating moving amount of part to be attached to realize the present invention. The program is formed by adding a program 1801 for calculating bounding box to the program 109 for calculating moving amount of part to be attached shown in FIG. 2. The program 1801 for calculating bounding box obtains a polyhedron containing a geometry of a part with referring to the geometrical data 105.

The program 205 for calculating the minimum value of scalar product reads out a bounding box corresponding to the part stored in the memory 204 for part having been attached from the program 1801 for calculating bounding box, calculates the scalar product of the coordinate of each vertex and the attaching direction vector stored in the memory 208 for attaching direction, and obtains the minimum value among these values.

The program 206 for calculating the maximum value of scalar product reads out a bounding box corresponding to the part stored in the memory 204 for part having been attached from the program 1801 for calculating bounding box, calculates the scalar product of the coordinate of each vertex and the attaching direction vector stored in the memory 208 for attaching direction, and obtains the maximum value among these values. The other parts in FIG. 18 are the same as in FIG. 2.

Figure 19:
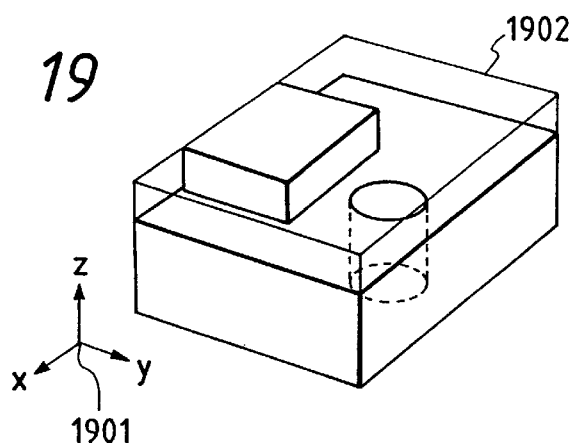
FIG. 19 is a view showing an example of a bounding box containing a geometry of part.

The bounding box as a polyhedron containing a geometry of a part is, for example, a rectangular block 1902 parallel to the coordinate axes of a coordinate system for a part or assembly as shown in FIG. 19.

In such a bounding box, it is possible to calculate the maximum value and the minimum value in the x-direction of coordinates of the vertexes and the control points constructing a geometry of a part, the maximum value and the minimum value in the y-direction, and the maximum value and the minimum value in the z-direction, respectively.

The calculation of bounding boxes for all parts may be performed before calculating moving amounts in advance, or may be performed during calculating moving amounts. And the bounding boxes may be included in the geometrical data 105.

In this case, the program 1801 for calculating bounding box is not necessary. Since the bounding box contains the geometry of part completely, it is possible to obtain an exploded view where all of the parts are separated since the moving amounts of parts to be attached certainly become larger than the moving amounts calculated using the coordinates of vertexes and control points.

Figure 44:
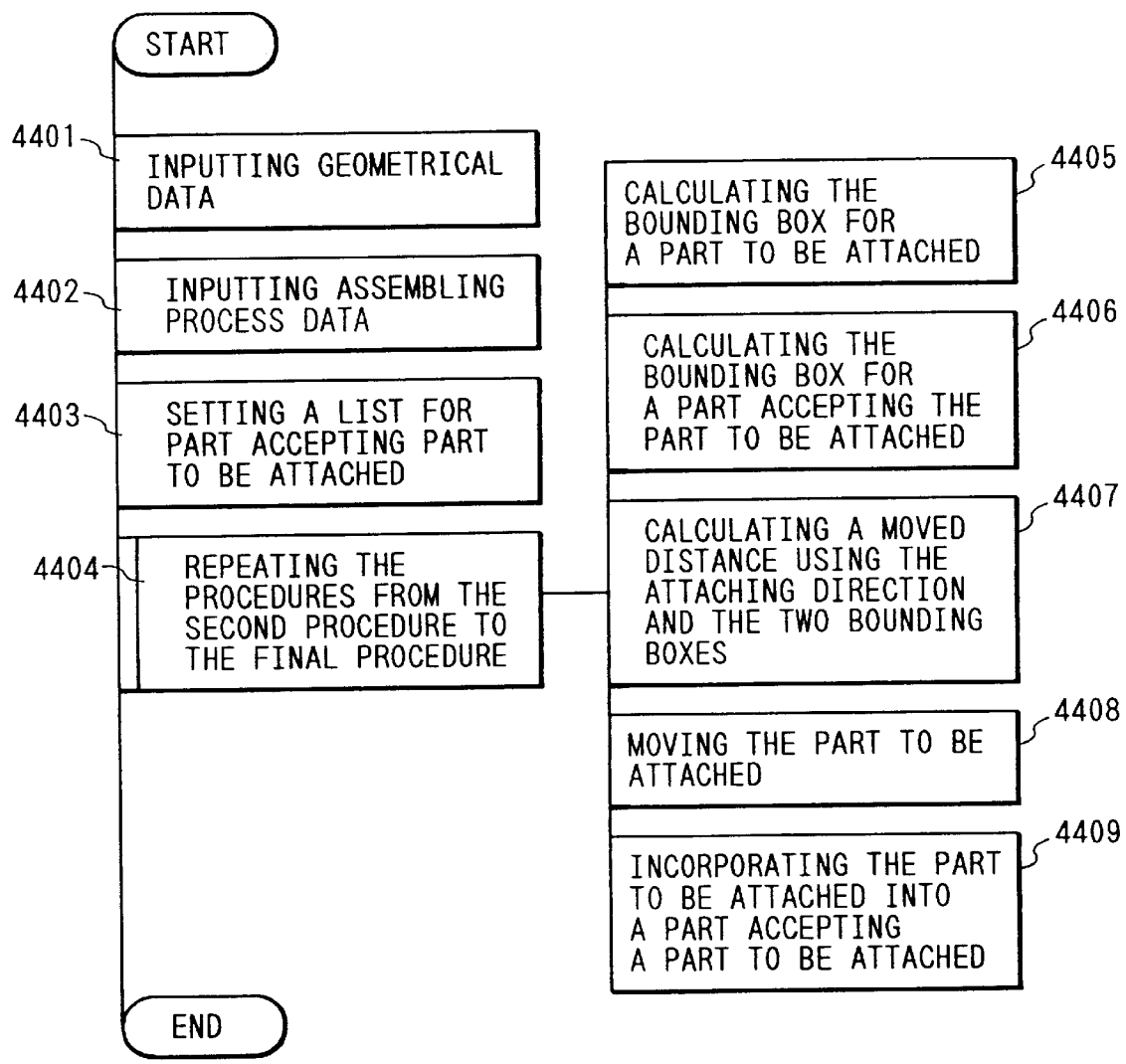
FIG. 44 is a process flow chart of an embodiment of a method of producing an exploded view shown in FIG. 18.

An embodiment using bounding boxes will be described in detail below. FIG. 44 is a flow-chart showing a procedure determining an arrangement of parts on an exploded view. In process 4401, geometrical data of parts relating to an object to be assembled and arrangement positions of parts in the state of the completion of assembling are fetched.

In process 4402, the assembling process data composed of data on assembling orders of parts and assembling directions is fetched. In process 4403, a list of parts accepting part to be attached as a list of part having been attached is emptied once and the part to be attached in the first data of the assembling process data is set in the list of parts accepting part to be attached.

In process 4404, the processes of process 4405 to process 4409 are sequentially repeated from the part to be attached in the second data of the assembling process data to the part to be attached in the final data in assembling order. In process 4405, a bounding box of part to be attached is calculated. Next, in process 4406, a bounding box containing all the parts in the list of parts accepting part to be attached is calculated.

In process 4407, using the attaching direction, the bounding box of part to be attached and the bounding box of part accepting part to be attached, a moving amount of the part to be attached is calculated so that the both bounding boxes are adjacent to each other.

In process 4408, the part to be attached is moved in the opposite direction to the attaching direction by the moving amount obtained in process 4407. In process 4409, the name of the part to be attached after completion of moving is added to the list of part accepting part to be attached.

Figure 45:
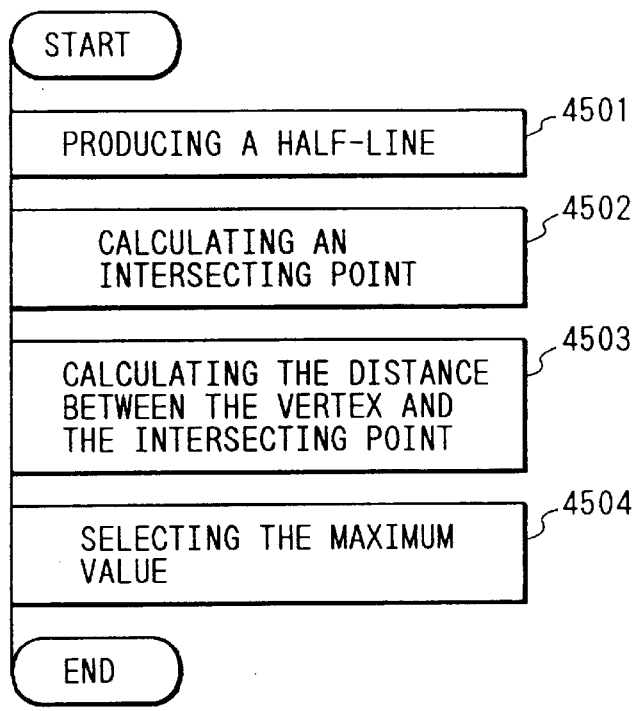
FIG. 45 is a detailed flow chart of the step 4407 in FIG. 44.

FIG. 45 is a detailed flow-chart showing the process 4407. In process 4501, half-lines are drawn, each of the half-line having a starting point of each vertex of a bounding box of a part to be attached and extending in the opposite direction to the attaching direction. In a case of two-dimension, four half-lines are drawn. In a case of three-dimension, eight half-lines are drawn.

In process 4502, the intersecting points of the half-lines produced in process 4501 with the bounding box of the part accepting part to be attached are obtained. When a half-line has two intersecting points with the bounding box, the point existing in a farther place from the starting point is employed as the intersecting point.

In process 4503, the distance between the starting point and the intersecting point for each of the half-lines is calculated. When there is no intersecting point, the distance is put to zero. In process 4504, the maximum value among the distances obtained in process 4503 is selected and the maximum value is put as the moving amount.

Figure 46:
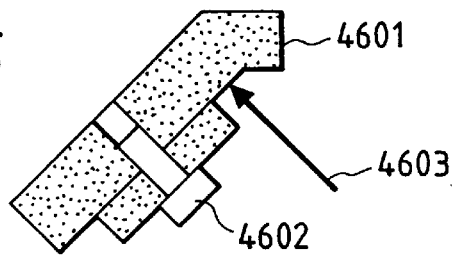
FIG. 46 is a view showing an assembled state of an assembly.
Figure 47:
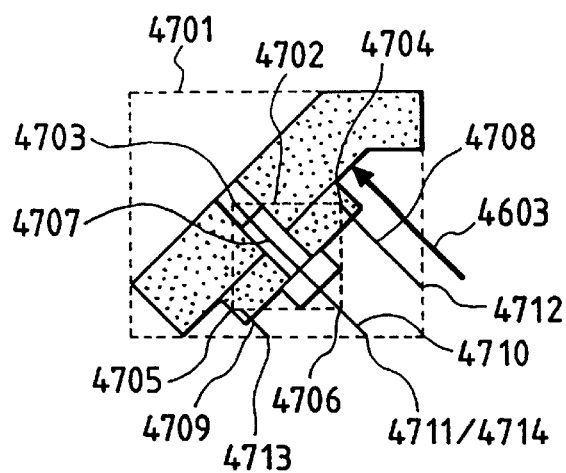
FIG. 47 is a view showing an assembled state of an assembly with adding bounding boxes and a half-line to parts to be attached.

FIG. 46 to FIG. 48 show an example of producing an exploded view in the embodiment. FIG. 46 is a view showing an assembly, for explanation, in a completed state. The assembly has such a structure that a bolt 462 is fixed to a plate 4601. Let the bolt 4602 be a part to be attached, the plate 4601 be a part accepting part to be attached, and the attaching direction of the bolt 4602 be the direction 4603.

The process will be described, referring to FIG. 47 showing information on the bounding box and the half-lines used in calculation. Firstly, in process 4405 and process 4406, a bounding box 4701 of the part accepting part to be attached and a bounding box 4702 of the part to be attached is calculated.

Next, in process 4501, half-lines 4707, 4708, 4709, 4710 are drawn from the vertexes 4703, 4704, 4705, 4706 of the bounding box 4702 of the part to be attached in the opposite direction to the attaching direction 4603. Next, in process 4502, intersecting points 4711, 4712, 4713, 4714 of the half-lines 4707, 4708, 4709, 4710 and the bounding box 4701 of the part accepting part to be attached are calculated.

Then, in process 4503, the distances between the starting point and the intersecting point, that is, the vertex 4703 to the intersecting point 4711, the vertex 4704 to the intersecting point 4712, the vertex 4705 to the intersecting point 4713, the vertex 4706 to the intersecting point 4714, are calculated.

Further, in process 4504, the maximum value among the distances between the starting point and the intersecting point, that is,the distance between the vertex 4703 and the intersecting point 4711 in the case of FIG. 47 is determined as a moving amount.

FIG. 48 shows a state where the part to be attached 4602 has been moved in the direction opposite to the attaching direction 4603 by the moving amount 4801 calculated in the process 4408.

As described above, the part to be attached can be placed in such a position that the bounding boxes of the part to be attached and the part accepting part to be attached do not overlap with each other by using the moving amount calculated through the process flow shown in FIG. 45.

Therefore, the part to be attached and the part accepting part to be attached can be arranged in separating from each other. By applying this process in order of assembling procedure, an exploded view of a whole assembly can be automatically produced.

A further embodiment of the present invention will be described below. FIG. 20 is a diagram showing the function structure of an apparatus for producing exploded view modified from that in FIG. 1 where a program 2001 for inputting direction of direction of projection is added, the program 109 for moving part to be attached is changed to a program 2002 for moving part to be attached considering direction of direction of projection, and the program 110 for displaying exploded view is changed to a program 2003 for displaying exploded view which displays the view in the direction of direction of projection input from the program 2001 for inputting direction of direction of projection.

The program 2001 for inputting direction of direction of projection receives a vector of direction of projection from an operator's instruction through the input unit 101 or from anther program or central processing unit.

The program 2002 for moving part to be attached considering direction of direction of projection receives the vector of direction of projection from the program 2001 for inputting direction of direction of projection, determines a moving amount of a part using the geometrical data 105 of part to be attached, the assembling process data 106 and the vector of direction of projection, changes the position of the part read out from the geometrical data 105 and then writes it in the geometrical data.

Figure 21:
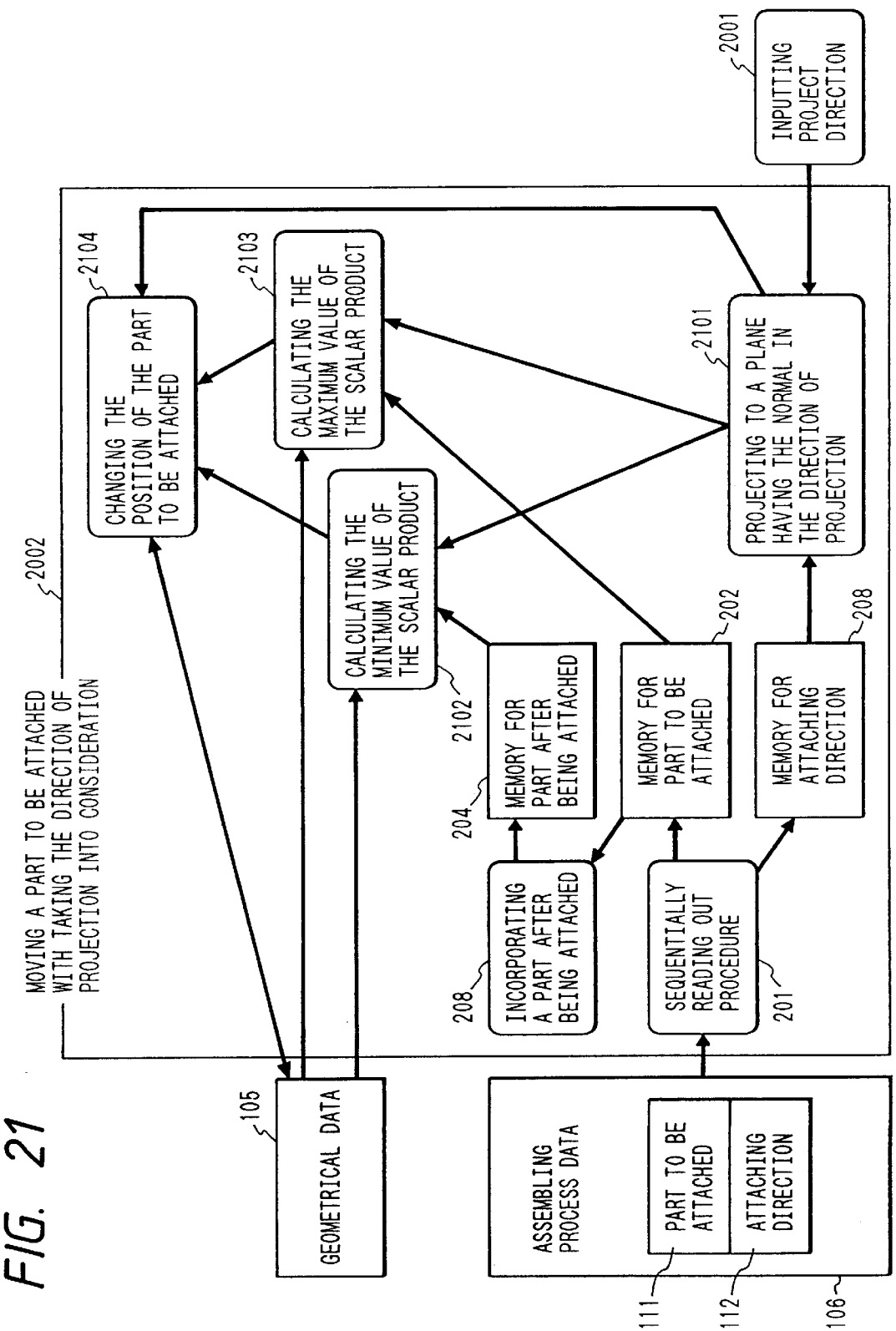
FIG. 21 is a block diagram showing the detailed structure of the part for moving part to be attached in FIG. 20.

FIG. 21 is a diagram showing the structure of an embodiment of a program 2002 for moving part to be attached considering direction of direction of projection. A program 201 for sequentially reading-out procedure reads out assembling procedures in the assembling process data 106 area one by one, and stores it into a memory 202 for part to be attached and a memory 208 for attaching direction.

The attaching direction 112 indicates the direction when a part to be attached is attached to a part having been attached, and is a unit vector. Let the vector be $V_a$. The memory 204 for part having been attached stores a list of parts having been attached in the steps of procedure before a certain step of assembling procedure.

A program 2101 for projecting to a plane having the normal in the direction of direction of projection receives an direction of projection vector $V_e$ from the program 2001 for inputting direction of direction of projection and reads out an attaching direction vector $V_a$ from the memory 208 for attaching direction, and calculates a projected vector $V_p$ of the attaching direction vector $V_a$ to the plane having the direction of projection vector $V_e$ as the normal using the following equation (3).

$$V_p = (V_e \times V_a)/|V_e \times V_a| \times V_e \quad (3)$$

The program 2102 for calculating the minimum value of scalar product reads out the list of parts having been attached form the memory 204 for part having been attached, calculates the scalar products of the vertex coordinates of the parts and the projected vector $V_p$, and calculates the minimum value among them. Let the minimum value be $D_{min}$.

The program 2103 for calculating the maximum value of scalar product reads out a part to be attached from the memory 202 for part to be attached, and extracts the vertex coordinates of the part from the geometrical data 105, and calculates the scalar product of the coordinates and the projected vector $V_p$ to obtain the maximum value among them. Let the maximum value be $D_{max}$.

The program 2104 for changing position of part to be attached obtains a vector V for moving the part to be attached using the following equation (4). Therein, the value $D_{const}$ is a gap of certain value determined in advance.

$$V = (D_{min} - D_{max} - D_{const}) \times V_a/(V_p \cdot V_a) \quad (4)$$

Then, the position $M_0$ of the part to be attached is fetched from the geometrical data 105, and multiplied by the moving matrix $M_v$ obtained from the moving vector V to obtain the value M which is written in the geometrical data 105 as a new position of the part. This calculation is performed with the following equation (2).

$$M = M_v \times M_0 \quad (2)$$

The program 208 for adding part having been attached adds the part to be attached which is changed its position into the memory 204 for part having been attached.

Figure 22:
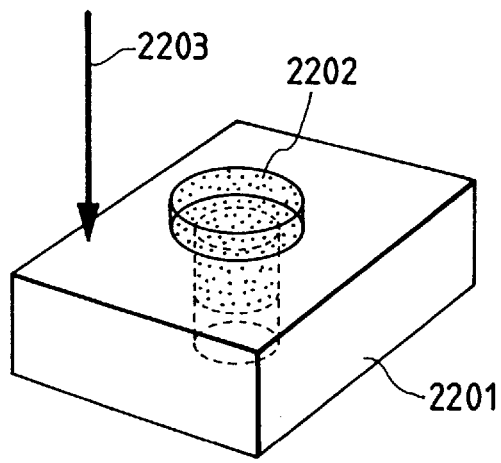
FIG. 22 is a view showing an assembled state of an assembly.

Description will be made below on the principle of production of exploded view with the program 2002 for moving part to be attached, referring to a detailed example. FIG. 22 shows an assembled state of two parts 2201 and 2202. Let the part 2201 be a part having been attached, and the part 2202 be a part to be attached.

A vector 2203 indicates the attaching direction $V_a$ of the part 2202. It is assumed that the direction of an direction of projection vector $V_e$ directs perpendicularly to the plane of FIG. 22 from this side to the other side.

Figure 23:
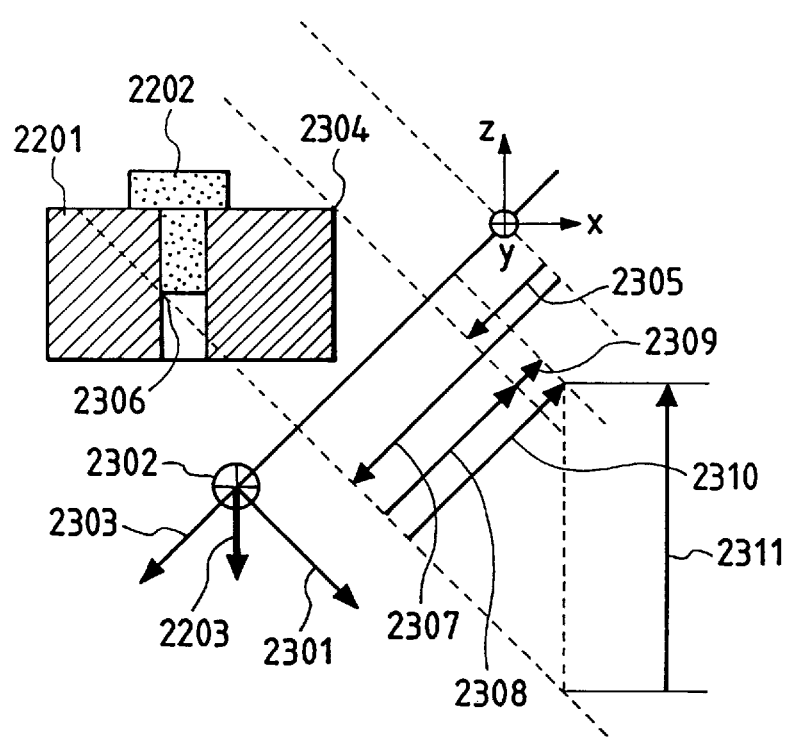
FIG. 23 is a view explaining the operation of the part for moving part to be attached for the assembly shown in FIG. 22.

FIG. 23 shows the assembly in FIG. 22 seeing from the direction perpendicular to both of the direction of projection vector $V_e$ and the attaching direction vector $V_a$. The vector 2301 is the direction of projection vector $V_e$.

Since the direction vector $V_t$ perpendicular to the plane of FIG. 23 is perpendicular to the direction of projection vector $V_e$ and also perpendicular to the attaching direction vector $V_a$, the direction vector $V_t$ is a normalized vector of the vector product of the direction of projection vector $V_e$ and the attaching direction vector $V_a$.

Therefore, the vector $V_t$ can be obtained form the following equation (5).

$$V_t = (V_e \times V_a)/|V_e \times V_a| \quad (5)$$

Therein, it is assumed that the vector $V_t$ is a vector 2302 directing from this side to the other side of the plane of FIG. 23.

The projected vector $V_p$ of the attaching direction vector $V_a$ to the plane having the direction of projection vector $V_e$ as the normal becomes the direction vector 2303 in FIG. 23.

Since the projected vector $V_p$ 2303 is perpendicular to the vector $V_t$ and also perpendicular to the direction of projection vector $V_e$, the project vector is calculated as the vector product of the vectors $V_t$ and $V_e$.

However, since the vectors $V_t$ and $V_e$ cross with each other at right angle, there is no need to normalize the vector product. Summarizing the above, the projected vector $V_p$ can be obtained by the following equation (6).

$$V_p = V_t \times V_e = (V_e \times V_a)/|V_e \times V_a| \times V_e \quad (6)$$

By the program 2102 for calculating the minimum value of scalar product, the minimum value of scalar product of the vertex coordinates of the part having been attached 2201 and the projected vector 2303 is obtained.

In the case of FIG. 22, the scalar product of the vertex coordinate 2304 and the projected vector becomes the minimum as shown in FIG. 23, and the value is a magnitude indicated by the arrow 2305.

On the other hand, by the program 2103 for calculating the maximum value of scalar product, the maximum value of scalar product of the vertex coordinates of the part to be attached 2202 and the projected vector 2303 is obtained.

In the case of FIG. 22, the scalar product of the vertex coordinate 2306 and the projected vector 2303 becomes the maximum as shown in FIG. 23, and the value is a magnitude indicated by the arrow 2307. By subtracting the maximum value 2307 from the minimum value 2305 makes a value indicated by the arrow 2308. By subtracting a pre-set constant value 2309 from the value 2308, a vector 2310 is obtained.

Since the vector 2310 is a moving amount on the projected vector, it is necessary to obtain a moving amount which is in the attaching direction and of which the result projected on the projected vector 2303 becomes the vector 2310.

Such a moving amount can be obtained by dividing the moving amount 2310 in the projected direction by the scalar product of the projected vector 2303 and the attaching direction vector 2203. By doing so, the moving amount 2311 can be calculated.

Figure 24:
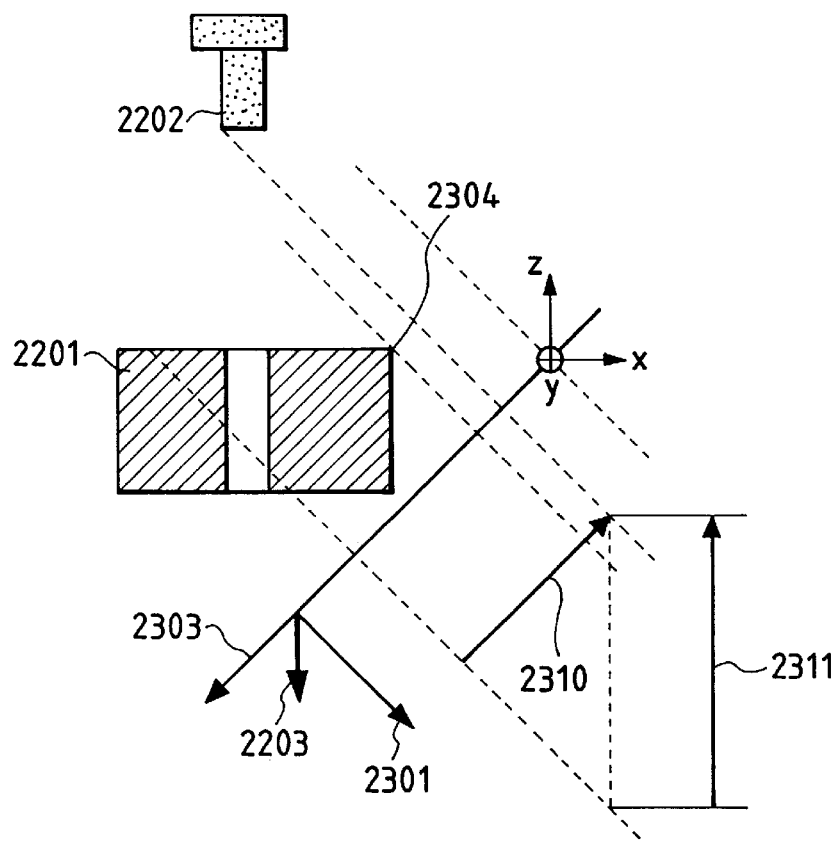
FIG. 24 is a view explaining the operation of the part for moving part to be attached for the assembly shown in FIG. 22.
Figure 25:
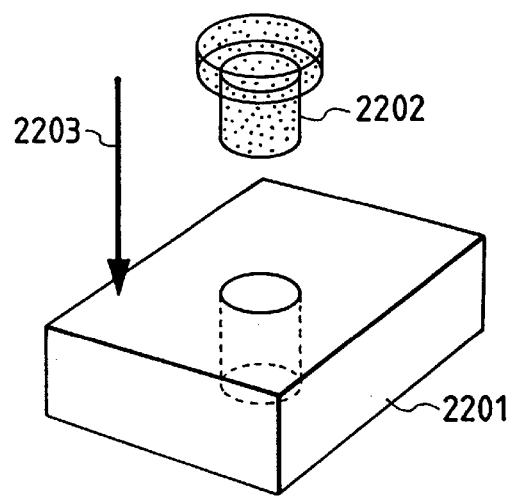
FIG. 25 is an exploded view produced by an embodiment according to the present invention.

As the part to be attached 2202 is moved in parallel to the attaching direction 2203 by the moving amount 2311, the feature becomes as shown in FIG. 24 and it is possible to obtain an exploded view in which the part having been attached 2201 and the part to be attached 2202 are separated from each other as shown in FIG. 25.

Figure 26:
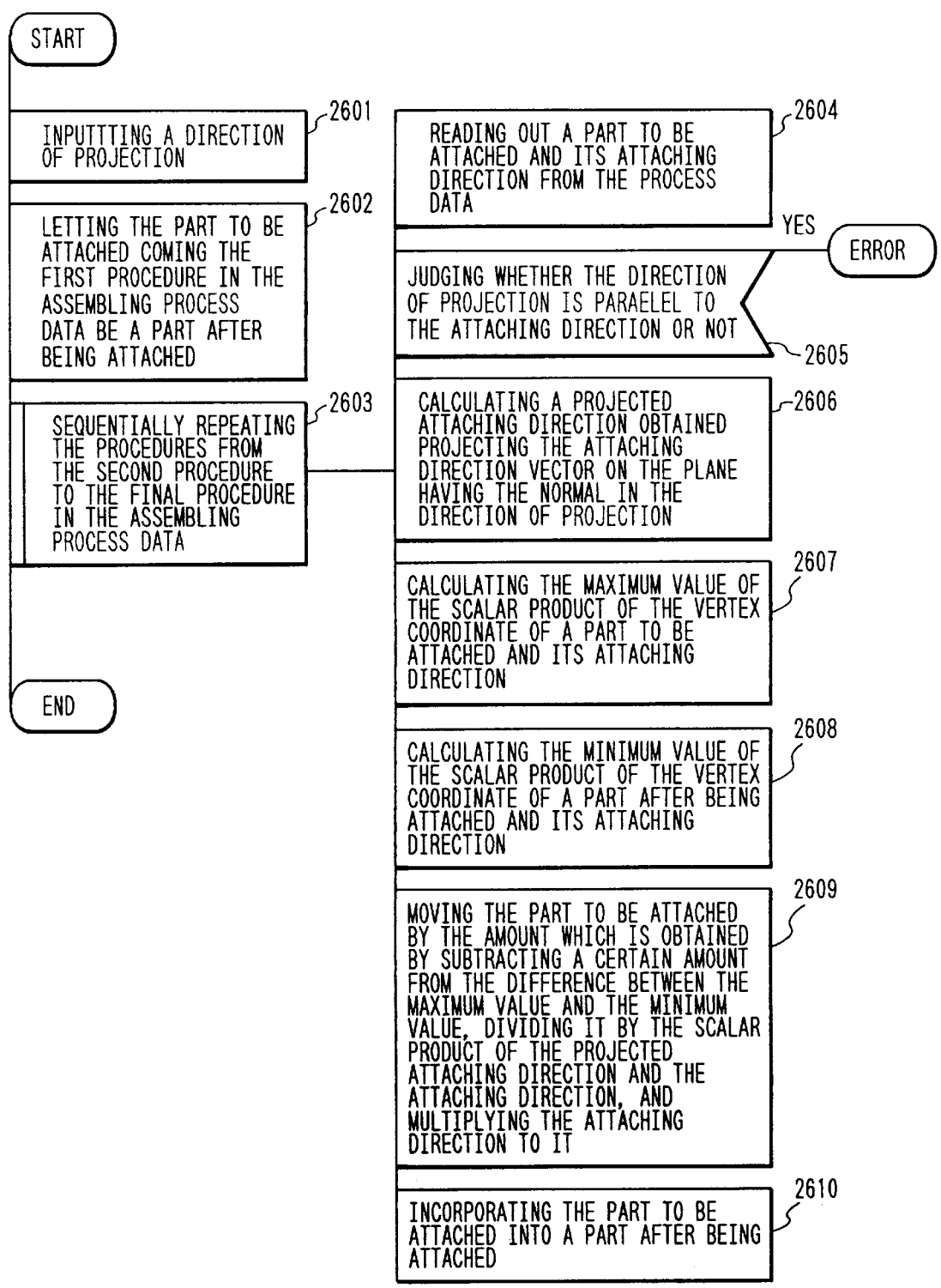
FIG. 26 is a flow chart expressing the processing procedure of the part for moving part to be attached shown in FIG. 22.

FIG. 26 is a flow diagram showing the process of the program for moving part to be attached with considering the direction of direction of projection.

In process 2601, an direction of projection vector is read out from the program for inputting direction of projection. In process 2602, a part to be attached in the step of the first procedure in the assembling process data is let be a part having been attached.

In process 2603, the processes of process 2604 to process 2610 are sequentially repeated from the second procedure step to the final procedure step. In process 2604, a part to be attached and an attaching direction in the procedure step now are read out from the attaching procedure data.

In process 2605, it is checked whether the direction of projection and the attaching direction are parallel to each other or not. If they are parallel, let it set as an error since the vector product becomes zero. In process 2606, the projected attaching direction is calculated using the above equation (6).

In process 2607, the all vertex coordinates of the part to be attached are read out from the geometrical data, and the scalar product of each of the vertex coordinates and the projected attaching direction, and the attaching direction is calculated, and the maximum value is obtained among the values.

In process 2608, the all vertex coordinates of the part having been attached are read out from the geometrical data, and the scalar product of each of the vertex coordinates and the projected attaching direction is calculated, and the minimum value is obtained among the values.

In process 2609, the part to be attached is moved by the vector which is obtained by subtracting the maximum value and also the certain value from the minimum value and by multiplying the attaching direction to the result. The moving vector V can be obtained using the following equation (4).

$$V = (D_{min} - D_{max} - D_{const}) \times V_a / (V_p \cdot V_a) \quad (4)$$

where $D_{min}$ is the minimum value obtained in process 2608, $D_{max}$ is the maximum value obtained in process 2607, $D_{const}$ is a constant value for gap, $V_a$ is the attaching direction vector read out in process 2604, $V_p$ is the projected attaching direction vector obtained in process 2606.

In process 2610, the part to be attached brought into the disassembled state by the moving is added to the part having been attached.

Although in the embodiment the coordinates of vertexes are used in calculation of the scalar products with the projected vector, in a case of containing a curved surface the coordinates of the control points of the curved surface may be used in the calculation together with the coordinates of vertexes.

Further, the coordinates of the vertexes of a bounding box as a polyhedron containing the geometry of a part may be used instead of using the vertexes or the control points.

Figure 27:
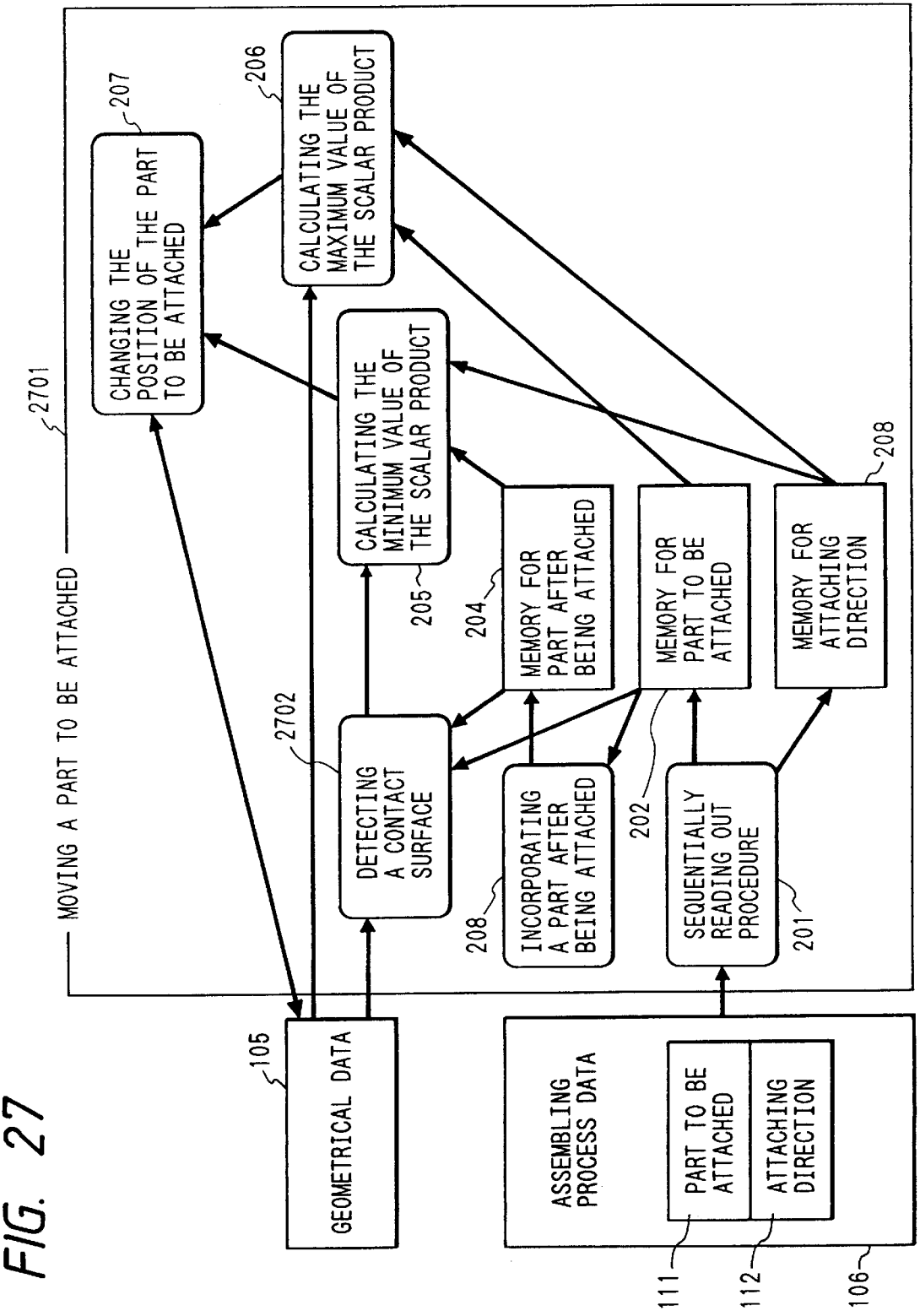
FIG. 27 is a block diagram showing the detailed structure of the part for moving part to be attached in another embodiment of an apparatus for producing exploded view according to the present invention.

FIG. 27 shows the detailed construction 2701 of a further embodiment of a program 109 for moving part to be attached in FIG. 1 and FIG. 2.

A program 201 for sequentially reading-out procedure reads out assembling procedures in the assembling process data 106 area one by one, and stores it into a memory 202 for part to be attached and a memory 208 for attaching direction.

The attaching direction 112 indicates the direction when a part to be attached is attached to a part having been attached, and is a unit vector. Let the vector be $V_a$. The memory 204 for part having been attached stores a list of parts having been attached in the steps of procedure before a certain step of assembling procedure.

A program 2702 for detecting contact surface reads out a part to be attached from the memory 202 for part to be attached, and reads out a part having been attached from the program 204 for part having been attached, and detects the contact surface between the part to be attached and the part having been attached by referring to the geometrical data 105.

The program 205 for calculating the minimum value of scalar product reads out the contact surface between the part to be attached and the part having been attached from the program 2702 for detecting contact surface, calculates the scalar products of the vertex coordinates of the contact surface and the attaching direction, and calculates the minimum value among them.

Let the minimum value be $D_{min}$. The program 206 for calculating the maximum value of scalar product reads out a part to be attached from the memory 202 for part to be attached, and extracts the vertex coordinates of the part from the geometrical data 105, and calculates the scalar product of the coordinates and the attaching direction to obtain the maximum value among them. Let the maximum value be $D_{max}$.

The program 207 for changing position of part to be attached obtains a vector V for moving the part to be attached using the above equation (1).

Then, the position $M_0$ of the part to be attached is fetched from the geometrical data, and multiplied by the moving matrix $M_v$ obtained from the moving vector V to obtain the value M which is written in the geometrical data as a new position of the part. This calculation is performed with the above equation (2).

The program 208 for adding part having been attached adds the part to be attached which is changed its position into the memory 204 for part having been attached.

Description will be made below on the principle of production of exploded view with the program 2002 for moving part to be attached, referring to a detailed example.

Figure 28:
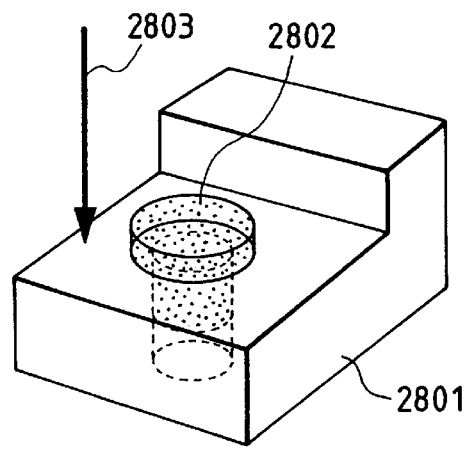
FIG. 28 is a view showing an assembled state of an assembly.

FIG. 28 shows an assembled state of two parts 2801 and 2802. Let the part 2801 be a part having been attached, and the part 2802 be a part to be attached. A vector 2803 indicates the attaching direction of the part 2802.

Figure 29:
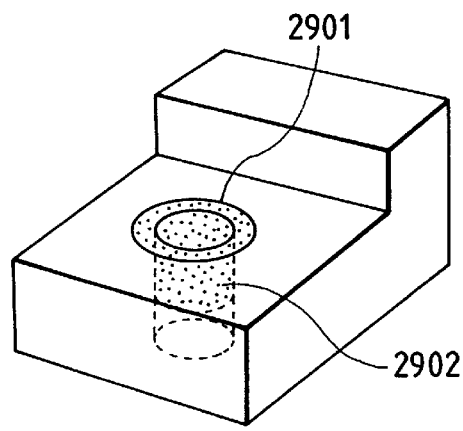
FIG. 29 is a view showing an example of a contact surface of an assembly.

Firstly, the program 2702 for detecting contact surface detects the contact surface between the part 2801 be a part having been attached, and the part 2802 be a part to be attached, and obtains a sheet surface of screw 2901 and a surface of screw 2902 as shown in FIG. 29.

By the program 205 for calculating the minimum value of scalar product, the minimum value of scalar product of the vertex coordinates of the surface 2901 and the surface 2902 and the attaching direction 2803 is obtained.

Figure 30:
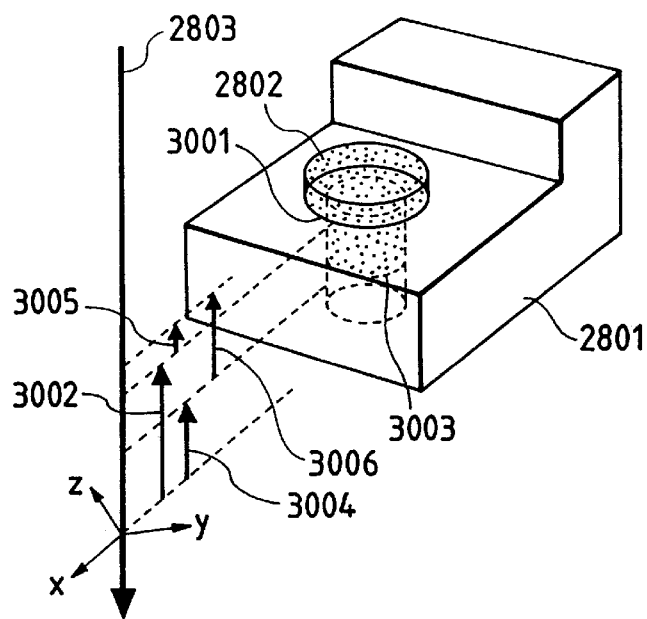
FIG. 30 is a view explaining the operation of the part for moving part to be attached for the assembly shown in FIG. 27.

In the case of FIG. 29, the scalar product of the vertex coordinate 3001 of the surface 2901 and the direction vector 2803 becomes the minimum as shown in FIG. 30, and the value is a magnitude indicated by the arrow 3002.

On the other hand, by the program 206 for calculating the maximum value of scalar product, the maximum value of scalar product of the vertex coordinates of the part to be attached 2802 and the attaching direction 2803 is obtained.

In the case of FIG. 29, the scalar product of the vertex coordinate 3003 and the attaching direction 2803 becomes the maximum as shown in FIG. 30, and the value is a magnitude indicated by the arrow 3004. Then, a moving amount 3006 is obtained by subtracting the maximum value 3004 and a per-set constant value 3005 from the minimum value 3002.

Figure 31:
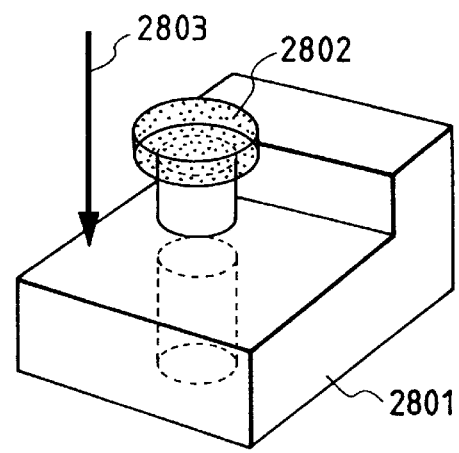
FIG. 31 is an exploded view produced by an embodiment according to the present invention.

As the part to be attached 2802 is moved in parallel to the attaching direction 2803 by the moving amount 3006, it is possible to obtain an exploded view in which the part having been attached 2801 and the part to be attached 2802 are separated from each other as shown in FIG. 31.

Although in the embodiment the coordinates of vertexes of the contact surface are used in calculation of the scalar products with the projected vector, the coordinates of the control points of the curved surface may be used in the calculation together with the coordinates of vertexes.

Further, by obtaining a bounding box containing the contact surface in advance, the coordinates of the vertexes of the bounding box may be used instead of using the vertexes or the control points.

Furthermore, by integrating the program for detecting contact surface in the program 2002 for moving part to be attached considering direction of projection shown in FIG. 21, the vertexes of a contact surface may be used in calculation of the minimum value of scalar product instead of using the vertexes of parts.

Figure 32:
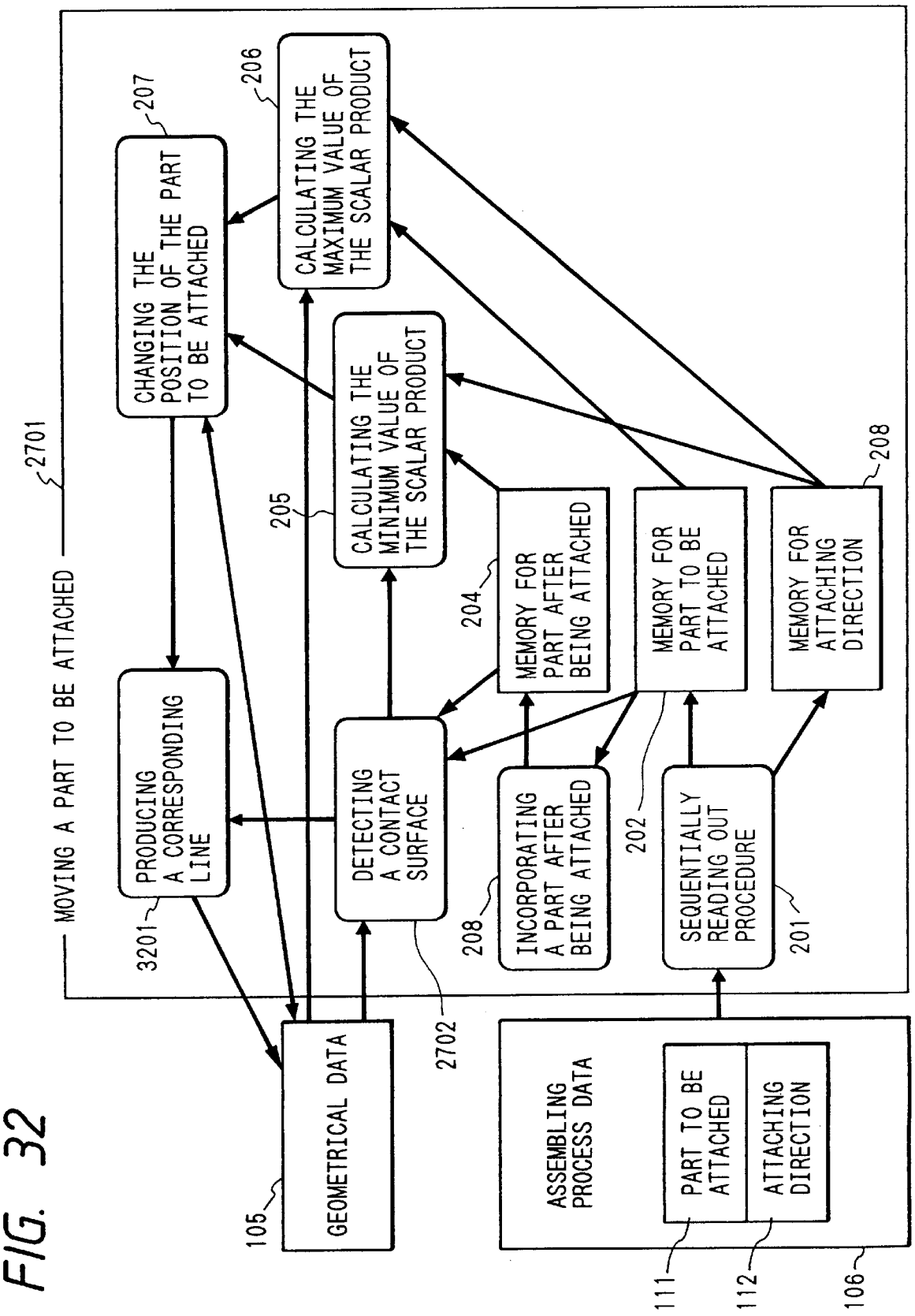
FIG. 32 is a block diagram showing the detailed structure of the part for moving part to be attached in another embodiment of an apparatus for producing exploded view according to the present invention.

FIG. 32 shows the structure of a further embodiment according to the present invention. The program in FIG. 32 is added a program 3201 for producing corresponding line to the program 2701 for moving part to be attached having the program for detecting contact surface shown in FIG. 27.

The program 3201 for producing corresponding line produces a corresponding line indicating the correspondence between the contact surface of a part to be attached and the contact surface of a part having been attached. The operation of the program 3201 for producing corresponding line will be described, referring to FIG. 33 and FIG. 34.

The program 3201 for producing corresponding line receives data of a contact surface from the program 2702 for detecting contact surface, and calculates, for example, its center of gravity.

Figure 33:
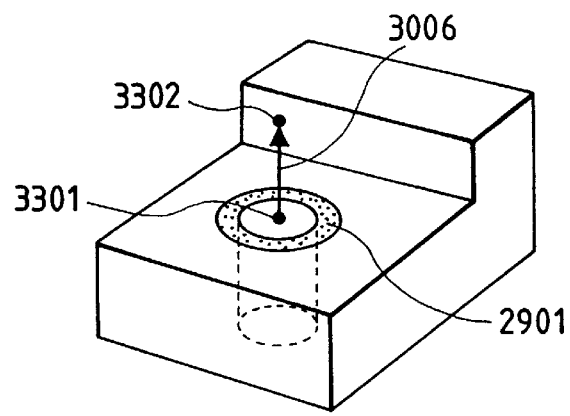
FIG. 33 is a view explaining the principle of producing a corresponding line of contact surfaces.

In the example of FIG. 33, data of a contact surface 2901 is transmitted from the program 2702 for detecting contact surface to obtain a center of gravity 3301. A moving vector 3006 of a part to be attached is received from the program 207 for changing position of part to be attached to obtain a point 3302 where the center of gravity 3301 of the contact surface is moved by the moving vector 3006. And a line segment connecting between the point 3301 and the point 3302 is added to the geometrical data 105.

Figure 34:
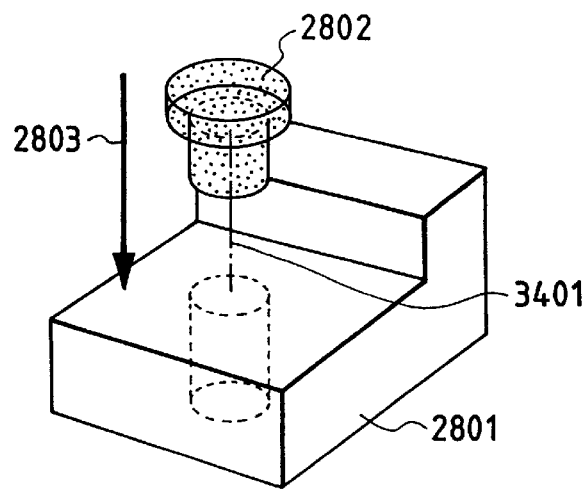
FIG. 34 is an exploded view containing a corresponding line produced by an embodiment according to the present invention.

When the line segment is displayed, a corresponding line 3401 indicating the correspondence between the contact surface of a part to be attached and the contact surface of a part having been attached is displayed in an exploded view as shown in FIG. 34.

Although the corresponding line 4301 in FIG. 34 is expressed by a chain line, it may be expressed by a line having different color or different width form the line for showing geometry.

Although, in the aforementioned embodiments, a constant value for gap $D_{const}$ is used in calculating the moving vector of part to be attached, the gap may be calculated from an direction of projection vector and an attaching direction vector.

Figure 35:
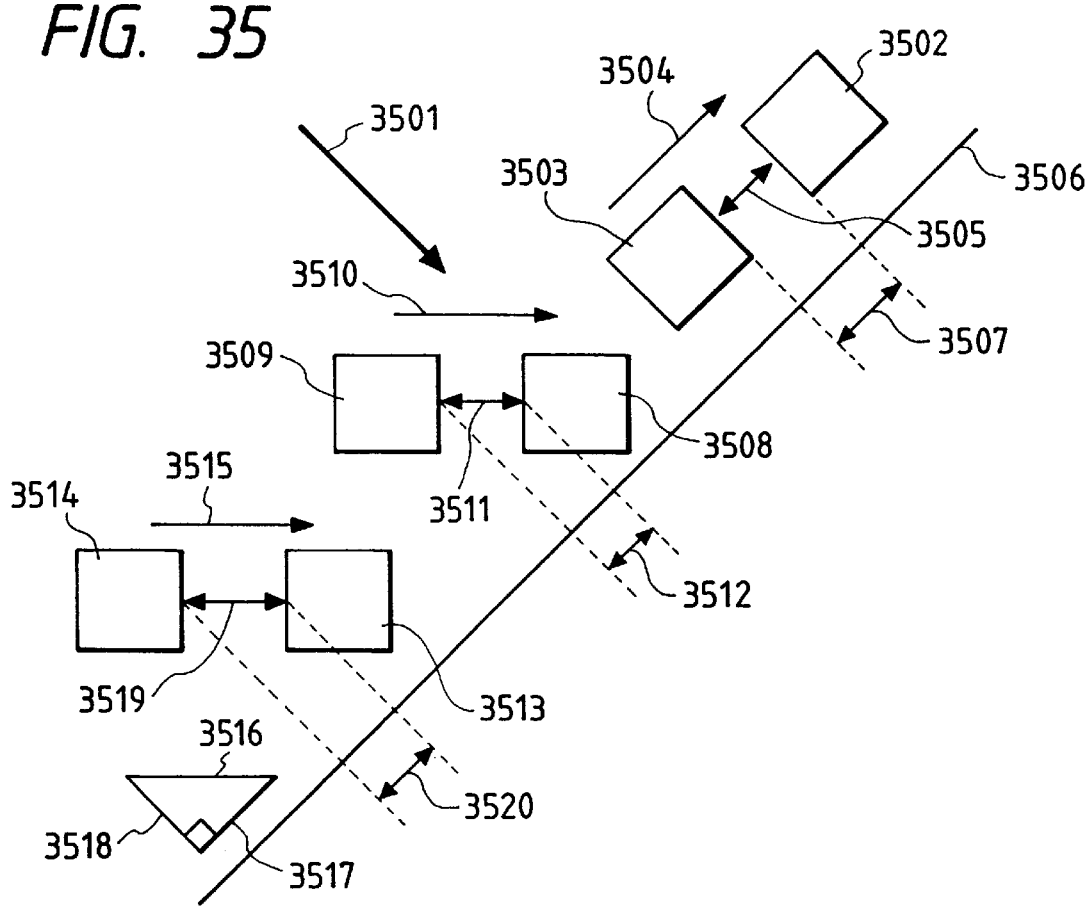
FIG. 35 is a view explaining the principle on the method of determining a gap between parts based on direction of projection.

FIG. 35 shows examples of a case where the gap between a part to be attached and a part having been attached is a constant and a case where the gap is calculated from an direction of projection vector and an attaching direction vector.

Let the direction of projection be a vector 3501. When a part 3502 and a part 3503 are jointed in an attaching direction 3504 to each other, the gap becomes the distance indicated by arrow 3505.

In this case, since the attaching direction 3504 is perpendicular to the direction of projection 3501, the apparent gap 3507 seen from the direction of projection 3501 is equal to the actual gap 3505. However, when a part 3508 and a part 3509 are jointed in an attaching direction 3510 to each other, the gap becomes the distance indicated by arrow 3511.

Although the gap 3511 is equal to the gap 3505, the apparent gap 3512 seen from the direction of projection 3501 is smaller than the gap 3507.

When the apparent gap becomes small, it looks as if the parts approach too close to observe an exploded view with ease. The apparent gap becomes small as the attaching direction approaches to parallel to the direction of projection. Therefore, the gap $D_{const}$ is calculated by using, for example, the following equation (7).

$$D_{const} = \frac{C}{\sqrt{1 - (V_a \cdot V_e)^2}} \quad (7)$$

Therein, $V_a$ is the attaching direction vector, $V_e$ is the direction of projection vector, C is a positive constant. For example, in FIG. 35, when a part 3513 and a part 3514 are attached to each other in an attaching direction 3515, the apparent length 3517 of a vector 3516 having unit length parallel to the attaching direction becomes the value of the denominator in the above equation (7) since the length 3518 is the absolute value of the scalar product of $V_a$ and $V_a$.

By calculating the gap 3519 using the above equation (7), the apparent gap 3520, therefore, can be kept constant independently of the relationship between the attaching direction and the direction of projection.

There are some cases where an assembly cannot assembled by attaching parts one by one due to the structure of the assembly, but the assembly can be assembled by firstly assembling a sub-assembly composed of plural parts and then attaching it to a part. An embodiment in a case of having a sub-assembly will be described below.

FIG. 49 shows such an example of assembly. The assembly in FIG. 49 is composed of three parts 4901, 4902, 4903. Such an assembly cannot be assembled in order of the parts 4901, 4902, 4903. Firstly, the part 4901 is placed, and the part 4902 and the part 4903 are assembled and then the assembled parts are attached to the part 4901.

The assembling process data for such an assembly can be expressed by, for example, FIG. 50. The level of part indicates the depth from a root 5101 when the assembling relationship of the assembly is expressed by a tree structure as shown in FIG. 51.

Therefore, the level of part for the part 4901 is 1, and the level of part for the parts 4902 and 4903 is 2, and the level of the sub-assembly assembled with the parts 4902 and 4903 is 1.

Figure 52:
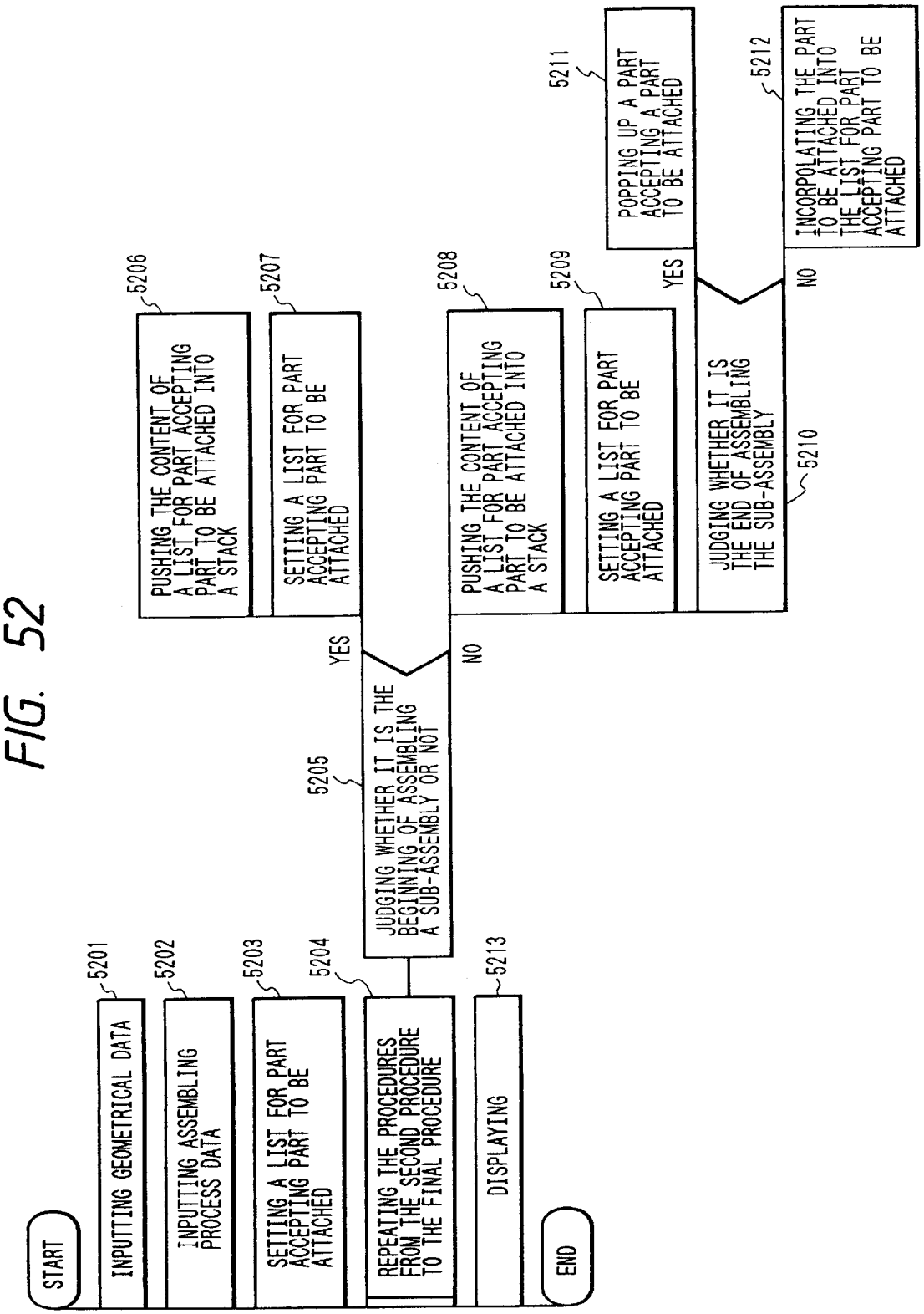
FIG. 52 is a flow chart showing another embodiment of a method of producing an exploded view coping with assembling of a sub-assembly according to the present invention.

FIG. 52 is a flow chart showing an embodiment of the method of producing an exploded view from assembling process data having a sub-assembly in the middle of assembling according to the present invention. In process 5201, geometrical data is input, the geometrical data being composed of geometries of parts forming an assembly and part positions in the state of completion of assembling.

In process 5202, assembling process data is input, the assembling process data being composed of assembling procedures, parts to be attached, attaching directions and levels of part as shown in FIG. 50. In process 5203, a part to be attached in the step of the first procedure in the assembling process data is set to a list for part accepting part to be attached.

In process 5204, the processes from process 5205 to the following are sequentially repeated from the second part to be attached to the final part to be attached. In process 5205, it is judged whether the part to be assembled is the first part for the sub-assembly or not.

For example, in a case where sub-assembly is expressed by the level of part as shown in FIG. 50, if the level of part for a part to be attached is larger than the level of part for the precedent part to be attached by one, the part to be attached is the first part for the sub-assembly.

Therefore, in process 5205, the processing is branched to the direction of YES to perform processes 5206, 5207. If the level of part for a part to be attached is smaller than the level of part for the precedent part to be attached by one, the processing is branched to the direction of NO to perform processes 5208 to 5211.

In process 5207, the contents of a list of parts accepting part to be attached now is pushed to the stack for storing parts accepting part to be attached. In process 5207, a list of parts accepting part to be attached is emptied once and the part to be attached now is set in the list of parts accepting part to be attached.

In process 5206 and process 5207, the information on the parts having been attached is temporary stored, and thereby the preparation to produce an exploded view for assembling the sub-assembly is completed.

In process 5208, the arrangement positions of the parts to be attached in a disassembled state are calculated using the geometrical data of the part to be attached and the parts accepting part to be attached, and the attaching directions of the part to be attached. The method of calculation is the same as having described above.

In process 5209, the parts to be attached are arranged in the arrangement positions calculated in the process 5208. In process 5210, it is judged whether the part to be attached now is the final part for assembling the sub-assembly or not. If it is the final part, the processing is branched to process 5211. If the part to be attached now is ont the final part for assembling the sub-assembly, the processing is branched to the direction of NO and goes to process 5212.

For example, in a case where the sub-assembly is expressed by the level of part as shown in FIG. 50, when the level of part for the part to be attached now is larger than the level of part for the part to be attached behind by one, the part to be attached now is the final part for assembling the sub-assembly.

In process 5211, the parts accepting part to be attached pushed in the stack for storing part-accepting-part to be attached at the last are popped, and the group of the popped parts are set in the list for part-accepting-part to be attached now.

In process 5212, the part to be attached is added to the list for part-accepting-part to be attached. After completion of applying the process 5205 to all the parts to be attached in the assembling process data by process 5204, the geometrical data after moved is displayed in process 5213. Thereby, an exploded view is displayed.

The stack for storing part-accepting-part to be attached is realized by, for example, a table composed of columns of stack pointer 5301, name of part 5303 and number of parts 5302 as shown in FIG. 53. The stack pointer 5301 stores the number of lists for part-accepting-part to be attached stored now in the stack.

When a list for part-accepting-part to be attached is newly pushed, the value in the stack pointer is added by one and a list for the number of parts and the name of part is stored in a row having the value of the stack pointer after addition as the index, in this case, in the third row 5304.

On the contrary, when a list for part-accepting-part to be attached is popped, a list for the part in a row having the value of the stack pointer 5301 is popped and the row is deleted from the table, and the value in the stack pointer is subtracted by one.

In the case of FIG. 53, since the value in the stack pointer is 2, the name of part C is popped from the second row 5305 and the row 5305 is deleted, and the value in the stack pointer 5301 is subtracted by 1 and becomes 1. Thereby, a list for name of part stored in the last can be obtained in the first place.

The feature of producing an exploded view, in a case where the process in FIG. 52 is applied to the data in FIG. 49 and the assembling process data in FIG. 50, will be described, referring to the figures. In processes 5201, 5202, geometrical data of FIG. 49 and assembling process data of FIG. 50 are input.

By executing process 5203, a part to be attached 4901 in the step of the first procedure in the assembling process data in FIG. 50 is set to a list for part-accepting-part to be attached.

In process 5205, it is judged whether the next part-to-be-assembled 4903 is the first part for the sub-assembly or not. The level for the part to be assembled 4901 precedent by one is 1 and the level for the part to be assembled now 4903 is 2.

Since the level for the part to be assembled now is lager than the level for the part to be assembled precedent by one, it is understood that the part to be assembled now is the first part for assembling a sub-assembly.

And in process 5206, the contents of the list for part-accepting-part to be attached, in this case, the part 4901 is stored in the stack for part-accepting-part to be attached. And in process 5204, the part to be attached now 4903 is set as a part accepting part to be attached.

Then the processes following to process 5205 are executed for the part to be attached 4902 with the loop in process 5204. Firstly, in process 5205, it is checked whether it is the beginning of assembling a sub-assembly or not. The level for the part to be assembled 4903 precedent by one and the level for the part to be assembled now 4902 are 2 and the same.

Therefore, since the part to be assembled now is not the first part for assembling the sub-assembly, the processing is branched to the direction of NO and proceeds to process 5208. Therein, an arrangement position in a disassembled state is calculated using the geometrical data of the part to be attached 4902 and the part-accepting-part to be attached 4903 and the attaching direction data for the part to be attached 4902.

FIG. 54 shows the state where the part 4902 is moved in process 5209 based on the calculated result. Next, in process 5210, it is judged whether it is the end of assembling the sub-assembly or not. Since the level of part for the part 4902 is 2 and the level of part for the next part to be attached 4902+4903 is 1, the part 4902 is the final part for the sub-assembly.

Therefore, the processing is branched to the direction of YES, and the part 4901 is popped from the stack for part-accepting-part to be attached and set in the list for part-accepting-part to be attached. Then the processes following to process 5205 are executed for the part to be attached 4902+4903 with the loop in process 5204.

The part to be attached 4902+4903 indicates assembling through attaching the two parts 4902 and 4903 together. In process 5205, the level of part for the part 4902+4903 is 1 and the level of part for the part to be attached 4902 precedent by one is 2.

Therefore, the part 4902+4903 is not the first part for assembling the sub-assembly. Therefore, the processing is branched to the direction of NO and proceeds to process 5208. An arrangement position in a disassembled state is calculated.

Therein, the parts 4902 and 4903 having the positions and geometrical data in the disassembled state calculated in the precedent loop as parts to be attached and the part 4901 as a part-accepting-part to be attached.

Figures 55, 56, 57:
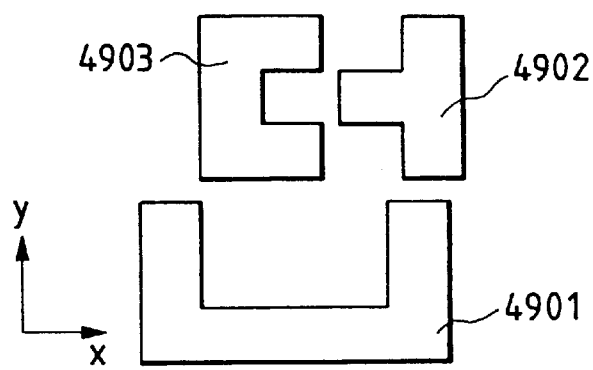
FIG. 55 is a view showing the final state of producing an exploded view.
FIG. 56 is a diagram showing the data structure of the assembling procedure with assembling of a sub-assembly.
FIG. 57 is a diagram showing the data structure of the assembling procedure with assembling of a sub-assembly.

In process 5209, the parts 4902 and 4903 are moved. FIG. 55 shows the state. By doing as the above, an exploded view having assembling process data with assembling a sub-assembly can be produced.

As for assembling process data having assembling a sub-assembly, although description has been made on an embodiment where the sub-assembly is expressed by the level of part as shown in FIG. 50, it may be possible that a flag indicating presence and absence of assembling a sub-assembly is provided in assembling process data as shown in FIG. 56, and the flag is set as 0 when there is no assembling of a sub-assembly and the flag is 1 when there is assembling of a sub-assembly.

The assembling procedure for assembling a sub-assembly is expressed by preparing another assembling process data as shown in FIG. 56. The correspondence between the part to be attached 4904 with assembling a sub-assembly in FIG. 56 and the assembling process data for assembling a sub-assembly can be performed by storing the name of sub-assembly in the assembling process data and by checking the agreement of the part to be attached with the name of sub-assembly.

In a case of such expression of assembling process data, the judgement of the beginning of assembling a sub-assembly is performed by whether the flag is 1 or not. And assembling process data having the same name of sub-assembly as the name of part to be attached is retrieved, and the part to be attached retrieved in the first is set as a new part-accepting-part to be attached.

The judgement of the end of assembling a sub-assembly is performed by whether the processing reaches the final process of the assembling process data or not.

Figure 36:
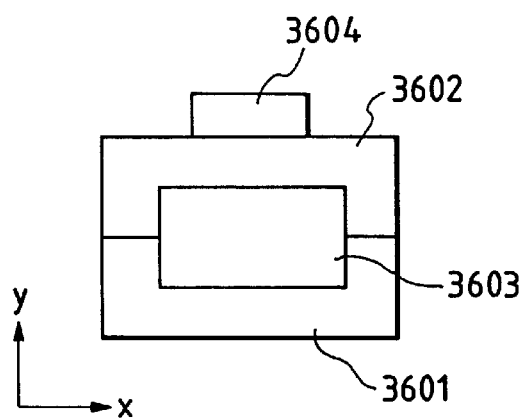
FIG. 36 is a view showing an assembled state of an assembly.

The feature of producing an assembling procedure of an assembly in the apparatus for producing exploded view shown in FIG. 1 will be described below, using an example. FIG. 36 shows the structure of the assembly to be used in this explanation. The assembly is composed of a part 3601, a part 3602, a part 3603 and a part 3604.

Figures 37, 38, 39:
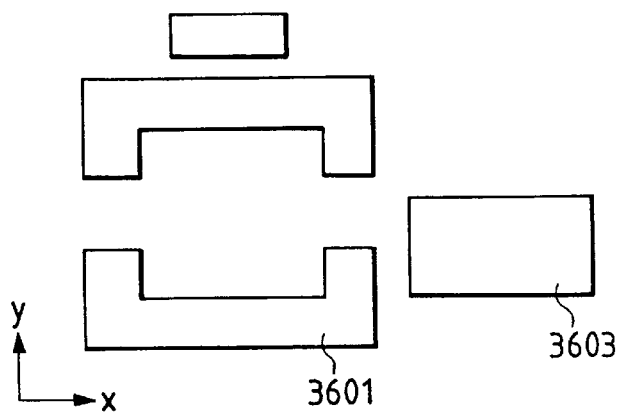
FIG. 37 is a diagram showing the data structure of the assembling process data.
FIG. 38 is an exploded view produced by an embodiment of an apparatus according to the present invention.
FIG. 39 is a diagram showing the data structure of the assembling process data.

FIG. 37 shows an example of assembling procedure input by an operator. This assembling procedure is that the part 3601 is firstly placed, next the part 3602 is attached from upper side, the part 3603 is attached from side, and finally the part 3604 is attached from upper side. An exploded view for the above case is produced by using the apparatus for producing exploded view according to the present invention, and FIG. 38 is obtained.

The operator looks at FIG. 38 and understands that when the part 3603 is attached from side the part 3601 interrupts the part 3603 to be attached. Since the part 3603 is attached to the part 3601 only from upper side, the operator gives an instruction to the program 109 for inputting assembling procedure to change the attaching direction 3901 of the part 3603 to attaching from upper side as the assembling procedure shown in FIG. 39.

Figures 40, 41:
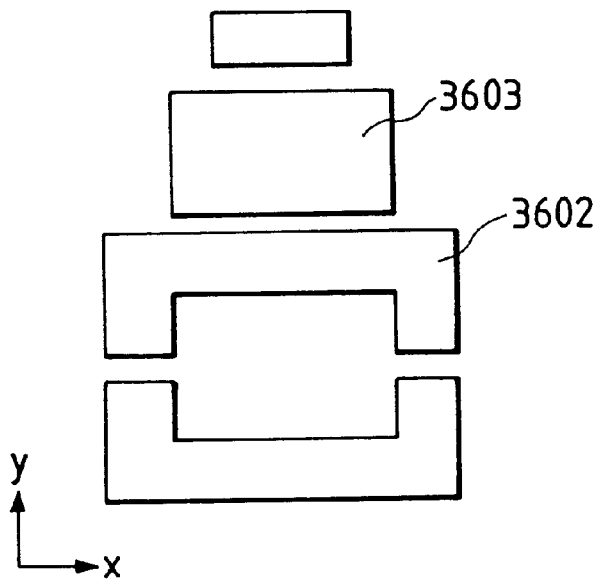
FIG. 40 is an exploded view produced by an embodiment of an apparatus according to the present invention.
FIG. 41 is a diagram showing the data structure of the assembling process data.

Based on the assembling procedure of FIG. 39, an exploded view is produced by operating the program 109 for moving part to be attached, and displayed by the program 110 for displaying exploded view to get FIG. 40. Looking at FIG. 40, the operator understands that since the part 3603 is attached after attaching the part 3602, the part 3602 interrupts the part 3603 to be attached.

Therefore, the operator gives an instruction to the program 108 for inputting assembling procedure to change to place the step of attaching procedure 4101 of the part 3603 before the step of attaching procedure 4102 of the part 3602 as the assembling procedure in FIG. 41.

Figure 42:
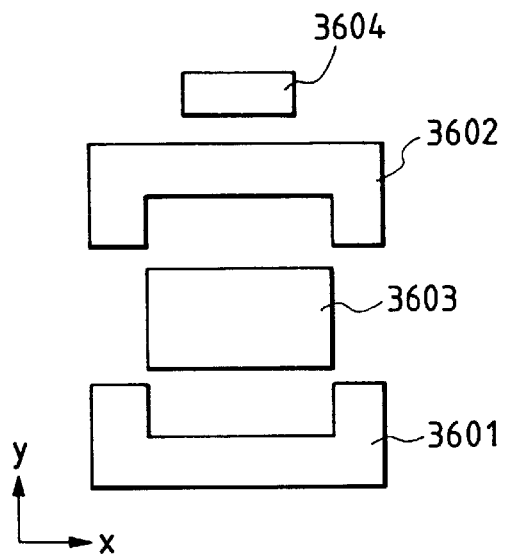
FIG. 42 is an exploded view produced by an embodiment of an apparatus according to the present invention.

Based on the assembling procedure of FIG. 41, an exploded view is produced by operating the program 109 for moving part to be attached, and displayed by the program 110 for displaying exploded view to get FIG. 40. Looking at FIG. 42, the operator understands that there is no trouble such as to collide between parts during assembling.

Therewith, a correct assembling procedure can be obtained by repeating inputting assembling procedures and forming exploded views.

Figure 58:
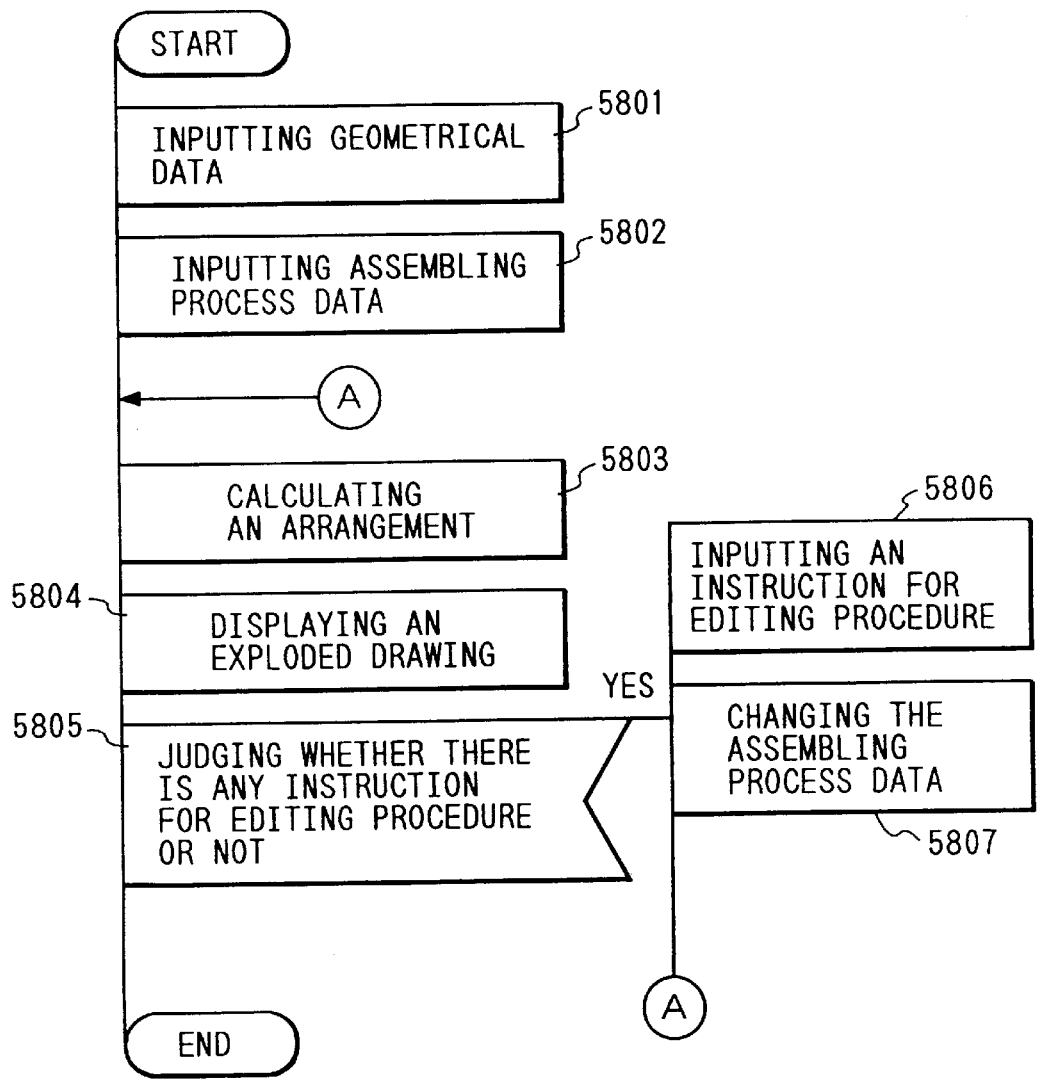
FIG. 58 is a flow chart showing the processing procedure in a case of editing an assembling procedure on another embodiment of an exploded view according to the present invention.

FIG. 58 shows a further embodiment of a method of changing assembling procedure using an exploded view according to the present invention. In process 5801, geometrical data is input, the geometrical data being composed of geometries of parts composing an assembly of which an exploded view is produced and positions of the parts in a state of completion of assembling.

In process 5802, assembling process data composed of assembling procedures, parts to be attached, attaching directions is input. In process 5803, positions of parts in a disassembled state are calculated using the assembling geometrical data and the assembling process data.

In process 5804, the geometries of parts are displayed in the positions of parts in the disassembled state calculated in process 5803 to display an exploded view. In process 5805, the operator is inquired whether there is any change in assembling procedure.

The operator inputs presence or absence of the necessity of change using the input unit such as key-board or mouse. If there is no need to change, the processing to change procedure is completed. If there is any need to change, process 5806 is executed. In process 5806, the instruction for changing the procedure is inquired of the operator.

The operator inputs the parts required change and the contents of the change using the key-board or the mouse. With instructing plural parts to be changed, in process 5807, the assembling procedure is changed based on the changing instruction input by the operator. As for the changing instruction, there is an instruction, for example, to specify two parts and exchange the assembling orders of the parts.

As another example, there is an instruction to sequentially specify plural parts to be changed and then to insert procedures in the specified order before or after parts specified separately.

Figure 59:
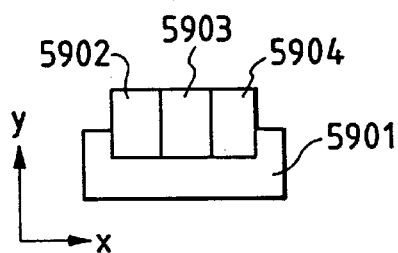
FIG. 59 is a view showing an assembled state of an assembly.

FIG. 59 to FIG. 63 show an embodiment of the method of editing assembling procedure shown in FIG. 58. FIG. 59 shows an example of geometrical data input in process 5801. In this example, the assembly is composed of four parts 5901, 5902, 5903, 5904.

Figures 60, 61:
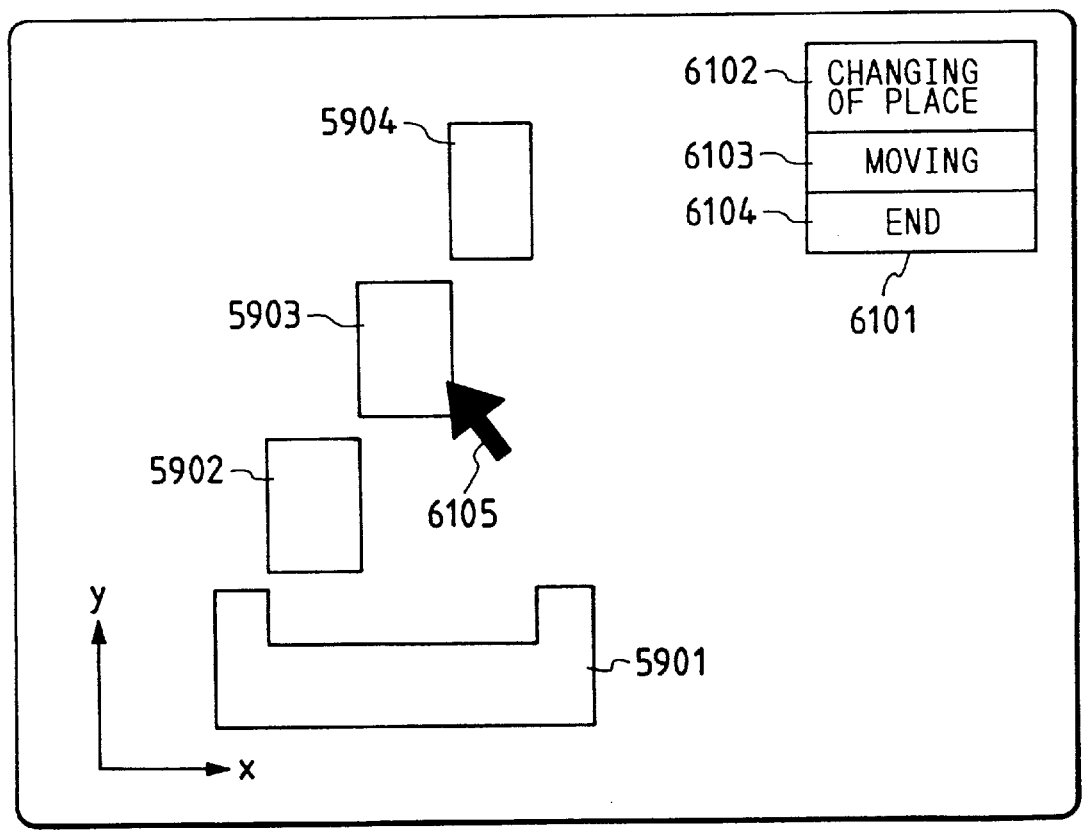
FIG. 60 is a diagram showing the data structure of assembling process data.
FIG. 61 is a view explaining the method of instructing assembling procedure editing on an exploded view.

FIG. 60 shows an example of assembling process data input in process 5802. The assembling process data expresses the assembling procedure that firstly the part 5901 is placed, next the part 5902 is attached from the direction of -Y axis, then the part 5903 is attached from the direction of -Y axis, and finally the part 5904 is attached from the direction of -Y axis.

FIG. 61 shows an exploded view produced by the process 5801 and the process 5804. A menu 6101 for changing assembling procedure is displayed by process 5805, an operator selects a command 6102 for exchanging using, for example, a mouse.

By doing so, control shifts to process 5806, an instruction for changing is input. In a case of, for example, exchanging, two parts 5903 and 5904 are specified. Then, the orders of the part 5902 and the part 5903 in the data for assembling procedure are exchanged by the process 5807.

Figures 62, 63:
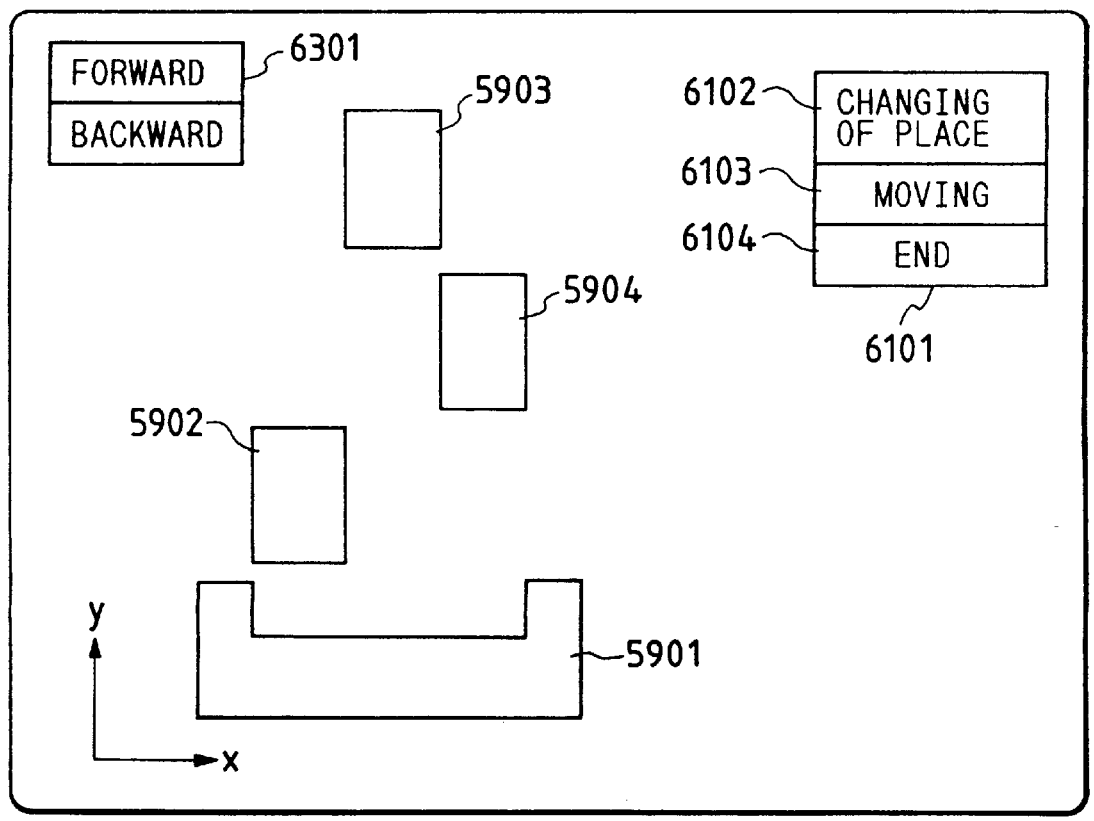
FIG. 62 is a diagram showing the data structure of assembling process data after completion of assembling procedure editing.
FIG. 63 is a view showing an exploded view after completion of assembling procedure editing.

FIG. 62 shows the data for assembling procedure after changing. In process 5803, arrangement positions are calculated using the data for assembling procedure after changing and the geometrical data input in process 5801. The result is displayed in process 5804 as shown in FIG. 63. After displaying the exploded view after changing, a menu 6101 for changing assembling procedure is again displayed by process 5805.

Therein, as the operator selects the command 6103 for moving, a changing instruction is input from process 5806. In a case of the moving command, a part to be moved in order, a part accepting the moved part are specified on the exploded view and whether the moved part is inserted before or after the accepting part is instructed through the menu.

For example, in FIG. 63, the part 5903 and the part 5904 are specified in this order as parts to be changed in orders, and then the part 5902 is specified as a part accepting the moved part. Then "before" is selected through the menu 6301. IN process 5807, the part 5903 and the part 5904 in this order are moved before the part 5902 according to the instruction input in process 5806, and as the result the assembling process data shown in FIG. 64 is obtained.

Figures 64, 65:
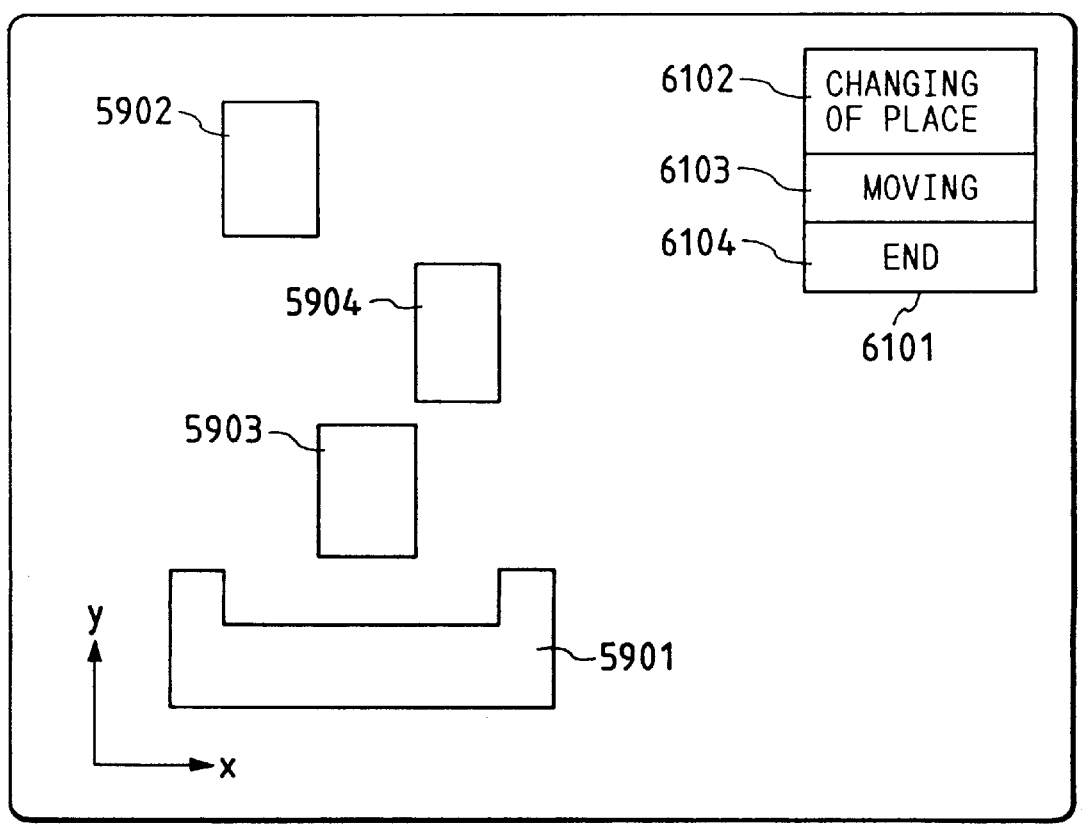
FIG. 64 is a diagram showing the data structure of assembling process data after completion of assembling procedure editing.
FIG. 65 is a view showing an exploded view after completion of assembling procedure editing.

Based on the data for assembling procedure in FIG. 64 and the geometrical data and the arrangement data in FIG. 59, arrangement positions are calculated in process 5803. And in process 5804, the resultant data is displayed to obtain an exploded view as shown in FIG. 65.

In process 5805, the menu 6101 is displayed. If the operator determines that there is no need to change the assembling procedure further, the end 6104 is selected to complete the editing processing.

As described above, by instructing assembling procedure on an exploded view, it becomes easy to instruct part since parts are disassembled and to understand assembling procedure since parts are arranged in assembling procedure order. Therefore, it is easier to change assembling procedure order on an exploded view than to change assembling procedure order on a complete assembled state.

According to the aforementioned embodiments of the present invention, there is an effect to decrease man-power to produce an exploded view since the exploded view can be automatically produced as far as there are geometrical data and assembling process data.

By using vertex coordinates of a bounding box containing a geometry of part instead of using coordinates of vertexes or control points of a geometry of part, there is an effect to make an exploded view in a short time since calculations of six scalar products at the most of vertex coordinates and attaching direction vectors per part are sufficient.

By using the direction of projection of exploded view in calculating the amount of moving a part to be attached, there is an effect to produce the exploded view easily understandable since it is possible to produce the view where the disassembled parts do not apparently overlap with each other in the exploded view.

By using the direction of projection of exploded view in calculating the amount of moving a part to be attached, there is an effect to produce the exploded view easily understandable since it is possible to produce the view where the disassembled parts are apparently spaced in the same distance one another in the exploded view.

There is an effect to produce an exploded view easily understandable since it is possible to connect the surfaces to be contacted to each other in an assembled state with a line-segment in the exploded view.

There is an effect to easily make a plan for assembling procedure in manufacturing process of products since less effort is expended in inputting assembling process data for displaying an exploded view, detecting a defective condition by looking at the exploded view and correcting the assembling process data, and consequently the exploded view can be easily produced.

According to the present invention, the man-power for producing an exploded view can be decreased by automatically producing an exploded view and by eliminating the work to move a part by instructing the moving direction and the moving amount part by part which has been performed by an operator in the past.

The present invention will be described below, referring to the accompanying drawings.

Figure 66:
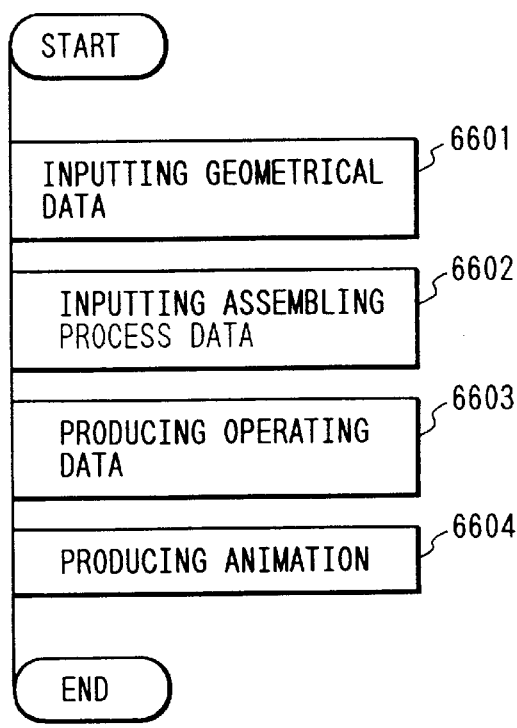
FIG. 66 is a flow-chart showing the basic procedure of an embodiment of a method for producing animation of assembling according to the present invention.

FIG. 66 is a flow-chart showing the process procedure of a method for producing animation of assembling according to the present invention. Firstly, in process 6601, geometrical data of each part in an assembled model of product is input.

Next, in process 6602, assembling procedure data is input. The assembling procedure data consists of sets of part to be attached and attaching direction, and the order of inputting is order of attaching.

Then, in process 6603, operating data is produced from the geometrical data input in process 6601 and the assembling procedure data input in process 6601. Finally, in process 6604, an animation is produced using the operating data produced in process 6603 as input parameters and the animation of assembling is displayed.

FIG. 67 shows the structure of an embodiment of an apparatus for producing an animation of assembling according to the present invention, an input unit 6701 is composed of a machine taking instructions from an operator such as key-boards and a mouse and a machine receiving data from another computer such as a communication apparatus and a floppy disk drive.

A central processing unit 6702 is constructed with a CPU which calculates data in a memory 6703 according to a program stored in the memory 6703, and exchanges data between the input unit 6701 and an output unit 6704.

The memory 6703 is constructed with a RAM, a magnetic disk and so on, and stores programs and data. The output unit 6704 is constructed with a display unit such as a CRT, machines to transfer data to another computer such as a communication apparatus and a floppy disk drive.

The memory 6703 stores geometrical data 6705, assembling procedure data 6706, operating data 6707, a program 6708 for inputting geometrical data, a program 6709 for inputting assembling procedure data, a program 6710 for producing operating data, and a program 6711 for producing animation.

The geometrical data 6705 is geometrical information of an assembly. The assembling procedure data 6706 is composed of set of parts to be attached 6712 and attaching direction data 6713 in assembling order. The operating data 6707 is composed of parts to be attached 6714, data of kind of operation 6715, data of operating direction 6716, data of amount of operation 6717, and data of time step 6718.

The program 6708 for inputting geometrical data fetches geometrical information of an assembly from the input unit 6701 and stores it as the geometrical data 6705. The program 6709 for inputting assembling procedure fetches parts to be attached and attaching directions from the input unit 6701 in assembling order and stores them as the assembling procedure data 106.

The program 6710 for producing operating data automatically produces operating data for each part to be attached using the assembling procedure data 6707 and stores it as the operating data 6707.

The program 6711 for producing animation produces animation data using the geometrical data 6705 and the operating data 6707 and outputs to the output unit 6704. Inputting of the geometrical data 6705 and the assembling procedure data 6706 is performed by an operator with using a mouse and a key-board, or through a net-work or a floppy disk in a case of data prepared by another central processing unit.

Figure 68:
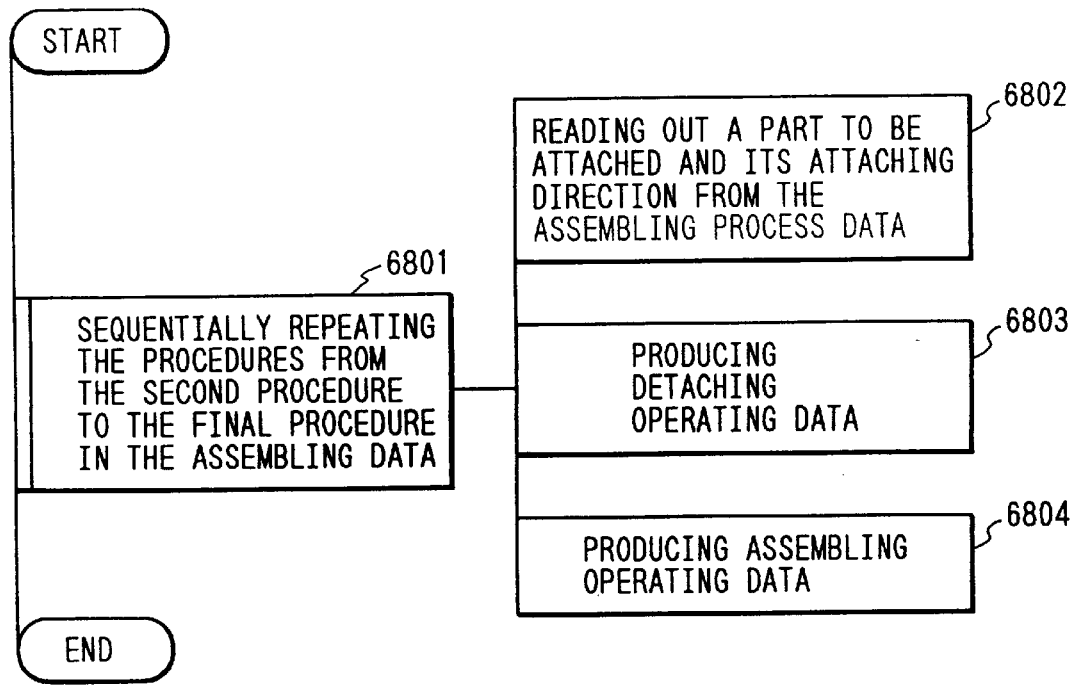
FIG. 68 is a flow-chart showing the detailed procedure of operation data producing process.

FIG. 68 is a flow-chart showing the detailed process procedure of the process 6603 for producing operating data shown in FIG. 66. In process 6801, the processes of process 6802 to process 6804 are applied from the second procedure step of the assembling procedure to the final procedure step.

Therein, the operating data for the first procedure step is not necessary to be produced since the first procedure step is to set a part in the beginning and it is out of the scope of the animation. In process 6802, data of part to be attached and data of attaching direction are read out from the procedure data.

Next, in process 6803, data of detaching operating data is produced from the read-out data of part to be attached and the data of attaching direction. The detaching operating data is data for preforming an animation in which the part to be attached is moved from a position in an assembled state along a direction opposite to the attaching direction by a certain distance.

Next, in process 6804, assembling operating data is produced using the data of part to be attached and the data of attaching direction read out. The assembling operating data is data for performing an animation in which the part to be attached is moved from the moved position in process 6803 to the assembled state along the attaching direction.

As described above, in process 6703 for producing operating data, the data for detaching operation and the data for assembling operation for each of the parts to be attached are produced.

Figure 69:
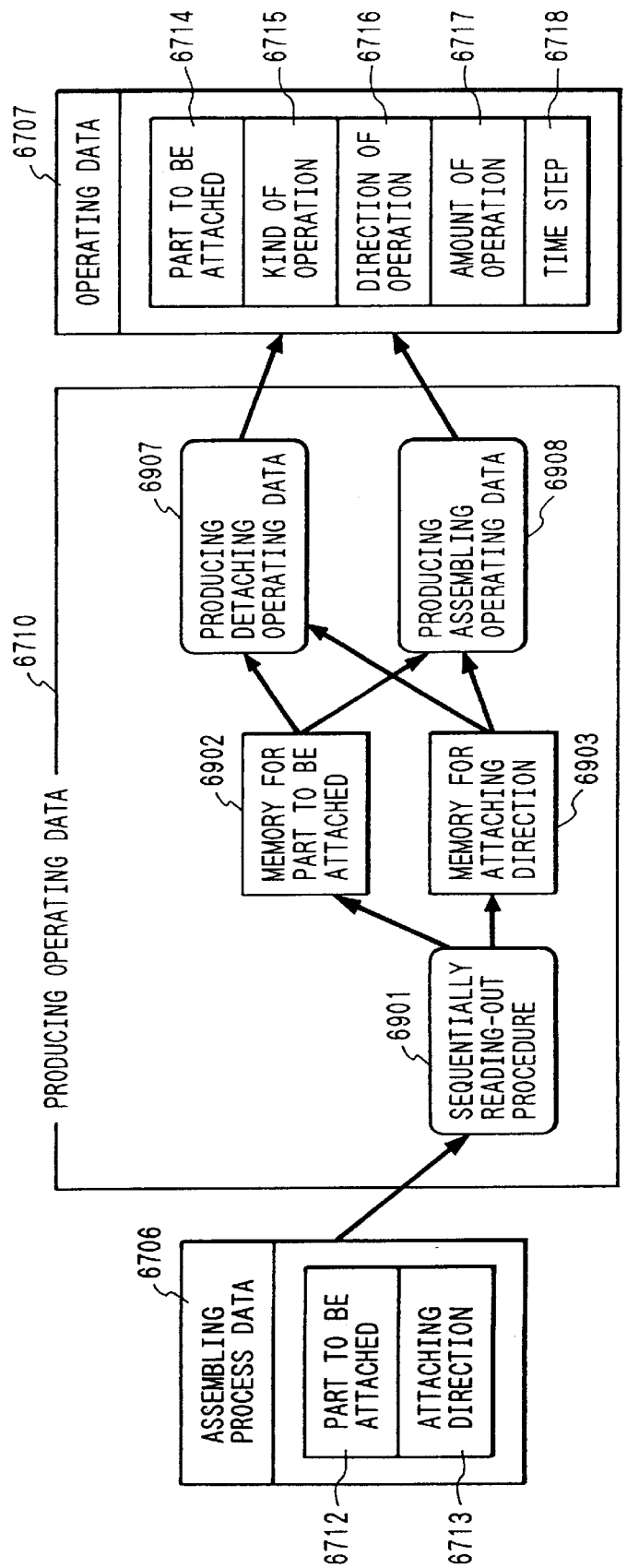
FIG. 69 is a functional structural diagram showing an apparatus executing operation data producing process.

FIG. 69 shows the construction of an apparatus for executing process for producing operating data. A program 6901 for sequentially reading-out procedure reads out assembling procedure step in the assembling procedure data 6906 one by one, and stores it into a memory 6902 for part to be attached and a memory 6903 for attaching direction. The attaching direction data 6713 indicates the direction by which a part to be attached is attached to parts having been attached, and is a unit vector.

A program 6907 for producing detaching operating data reads out the data of part to be attached from the memory 6902 for part to be attached, and reads out the data of attaching direction from the memory 6903 for attaching direction, and produces the detaching operating data consisting of the data of the position of the starting point at an assembled state and of the position of the ending point which is far by predetermined distance toward the opposite direction to the attaching direction. The operating data produced is stored as the operating data 6707.

A program 6908 for producing detached operating data reads out the data of part to be attached from the memory 6902 for part to be attached, and reads out the data of attaching direction from the memory 6903 for attaching direction, and produces the attaching operating data in which the starting point is the ending point in the program 6907 for producing detaching operating data and the ending point is the position of an assembled state of the part to be attached. The operating data produced is stored as the operating data 6707.

Figure 70:
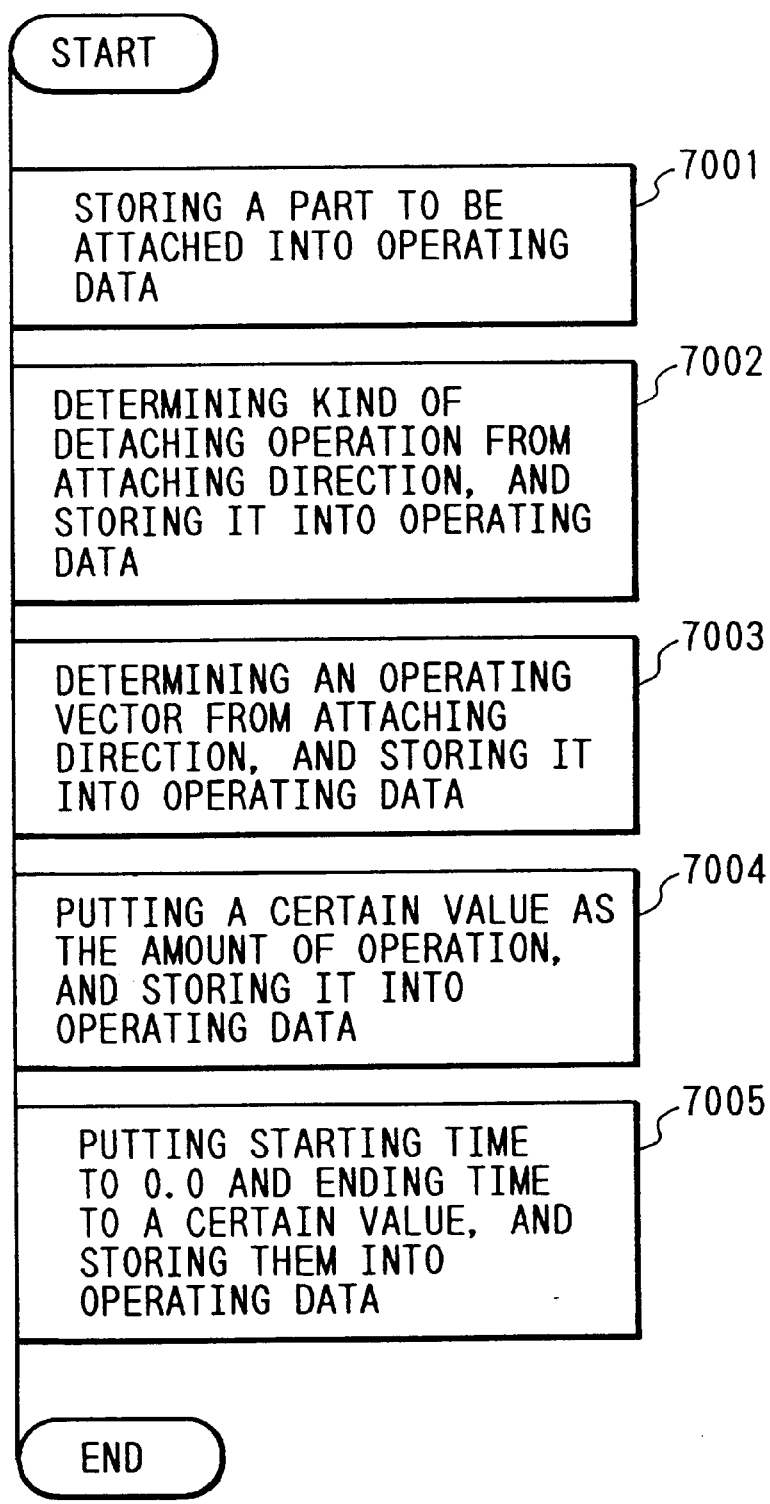
FIG. 70 is a flow-chart showing the detailed procedure of detaching operation data producing process.

FIG. 70 is a flow chart showing the detailed process procedure of the process 6803 for producing detached operating data. In process 7001, the part to be attached data read out from the assembling procedure data is set to the operating data 6707. In process 7002, the kind of operation is determined from the attaching direction data read out from the assembling procedure data, and is set to the operating data 6707.

In process 7003, the direction of operation is determined from the attaching direction, and set to the operating data 6707. In process 7004, a predetermined distance data is set to the operating data 6707. In process 7005, the starting time step is set as "0.0" and the ending time step is set as a certain time, and they are set in the operating data 6707.

Figure 71:
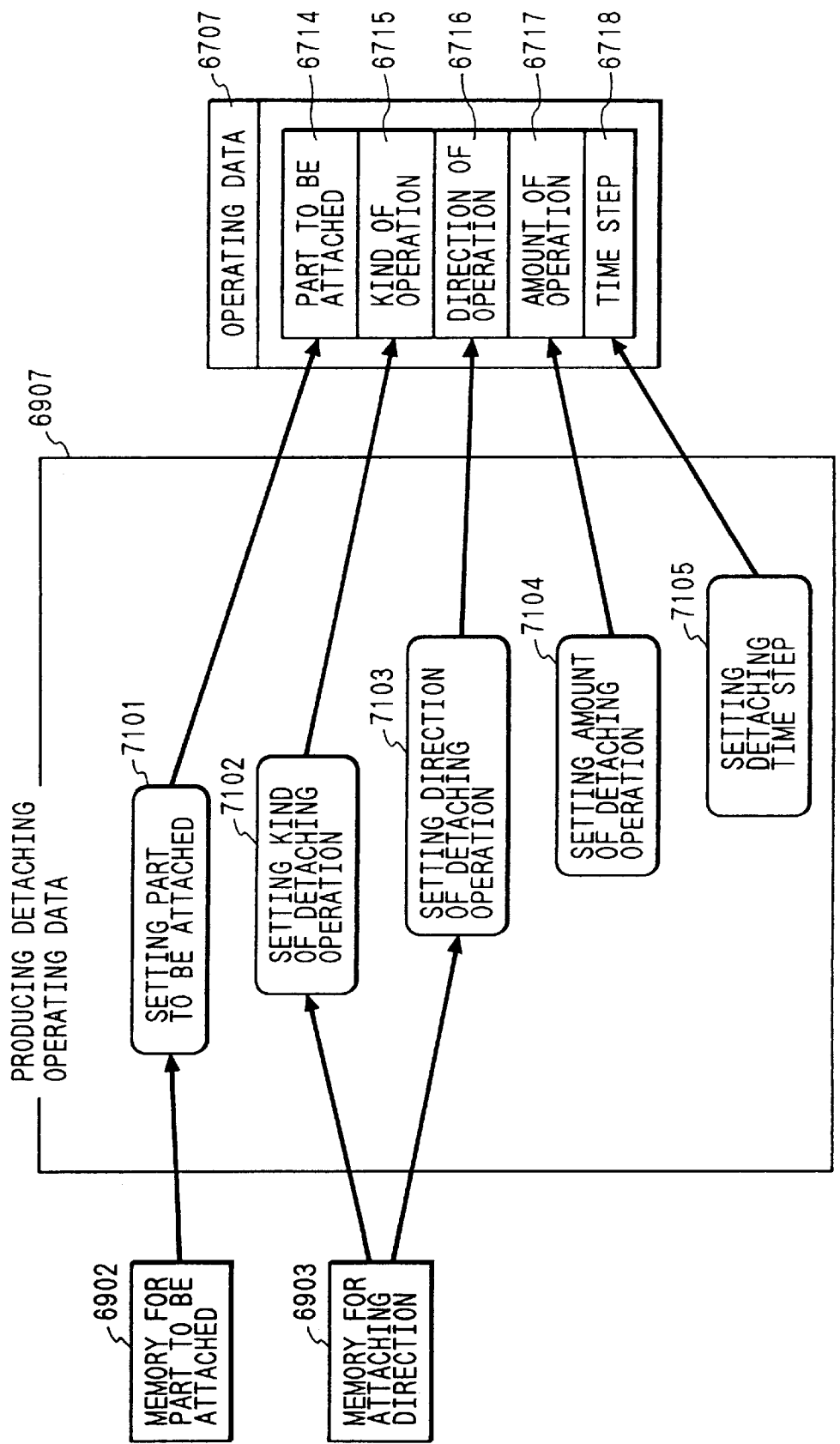
FIG. 71 is a functional structural diagram showing an apparatus executing detaching operation data producing process.

FIG. 71 is a diagram showing the structure of an apparatus executing the process for producing detaching operation. A program 7101 for setting part to be attached reads out the data of part to be attached from the memory 6902 for part to be attached, and stores it to the operating data 6707 as part to be attached 6714.

A program 7102 for setting kind of detaching operation reads out the data of attaching direction from the memory 6903 for attaching direction, and obtains the kind of operation corresponding to the kind of attaching direction, and stores it in the operating data 6707 as kind of operation 6715.

A program 7103 for setting direction of detaching operation reads out the attaching direction data from the memory 6903 for attaching direction, and stores the direction opposite to the attaching direction in the operating data 6707 as the operating direction 6716. A program 7104 for setting amount of detaching operation sets the amount of moving the part to be attached from an assembled state to detached state.

In this embodiment, a constant is stored in the operating data 6707 as the amount of operation 6717 independently of the sizes of the assembly and the part. A program 7105 for setting detaching time step sets the time step to detach each part from an assembled state in the direction opposite to the attaching direction. In this embodiment, the starting time step is set as "0.0" and the ending time step is set as a constant value, and they are stored in the time step 6718 in the operating data 6707.

Description will be made below using an example on the feature where the operating data 6707 for detaching the part from an assembled state is produced by the process for producing operating data in FIG. 68 and the process for producing detaching operating data in FIG. 70.

Figures 72, 73, 74:
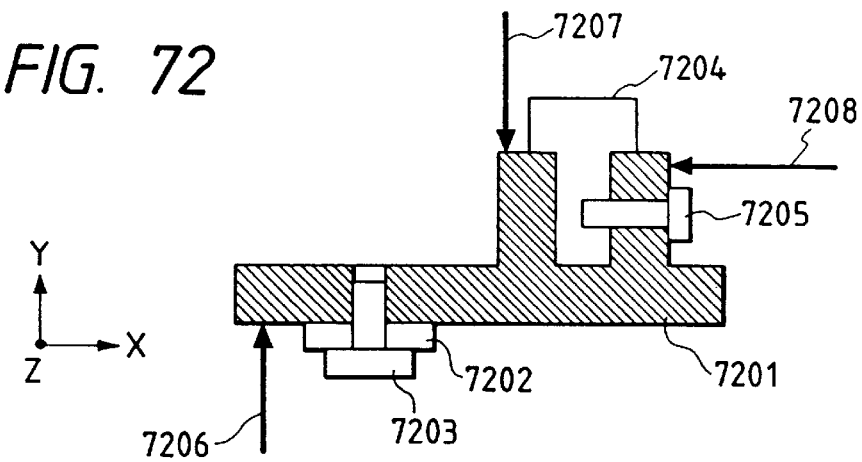
FIG. 72 is a view showing an example of assembly.
FIG. 73 is a diagram showing an embodiment of assembling procedure data.
FIG. 74 is a diagram showing operation data of detaching operation produced by an embodiment according to the present invention.

FIG. 72 shows the geometry of an assembly used in the explanation. The structure of the assembly is that a part 7202 is fixed to a plate 7201 with a bolt 7203, and a part 7204 is fixed to the plate 7201 with a bolt 7205. The attaching direction of the part 7202 and the bolt 7203 is indicated by the directional vector 7206, and the attaching direction of the part 7204 is indicated by the directional vector 7207, and the bolt 7205 is indicated by the directional vector 7208.

FIG. 73 is a diagram showing an example of the assembling procedure data for the assembly in FIG. 72. The column of step of procedure 7301 shows sequence numbers of assembling procedure, and assembling is performed in order of these numbers.

The column of part to be attached 7302 shows part to be attached in the corresponding step of procedure. The each number in the column of part to be attached in FIG. 73 corresponds to the symbol attached to the each part in FIG. 72. The column of attaching direction 7303 shows kind of attaching direction 7304 and direction value 7305.

The kind of attaching direction 7304 indicates kind of movement of part to be attached, and the indication "moving" means to move along a straight line. The direction value 7305 of attaching direction indicates direction value corresponding to the kind of attaching direction 7304, and is expressed by a directional vector when the kind 7304 is "moving".

The each attaching direction in the column of attaching direction in FIG. 73 corresponds to the symbol attached to the each attached direction in FIG. 72. Since the first procedure step 7306 is a case of setting a part at the beginning, there is no need to specify the attaching direction.

The processes 6802 to 6804 in FIG. 68 are repeated to be applied by the process 6801 during steps of procedure from 2 to 5. The result of the process is shown in FIG. 74. Only the process 6803 for producing detaching operating data will be described here, but the process 6804 for producing assembling operating data will be described later.

The process of the second step 7307 of procedure will be described. In process 6802, the assembling procedure in step 7307 of procedure is read out. And in process 6083, the data of detaching operation is produced. In process 7001 in FIG. 70, the part to be attached 7202 read out is stored in the operating data.

Next, in process 7002, since the kind of attaching direction read out is "moving", the kind of operation is stored in the operating data as "straight moving". Then, in process 7003, the direction opposite to the directional vector 7206 read out is stored in the operating data.

Why the opposite direction vector is stored in the operating data is because the direction to detaching from an assembled state is opposite to the attaching direction.

Next, in process 7004, a constant distance ($D_{const}$) is stored in the operating data as the amount of operation. In the last, in process 7005, the beginning of time step is set to "0.0" and the end of time step is set to a constant value ($T_{const}$) and they are stored in the operating data.

The operating data shown in FIG. 74 is composed of part to be attached 7401, kind of operation 7402, operating direction 7403, amount of operation 7404 and time step 7405. The data of detaching operation of part to be attached in the step of procedure 7307 is the symbol 7406.

Herein, the operating direction of the symbol 7406 is written as "−7206" since it is opposite to the attaching direction 7206. By executing the steps of procedure 7308 to 7310 in the same manner as the step of procedure 7307, the operating data of 7407, 7408, 7409 shown in FIG. 74 is produced.

Figure 75:
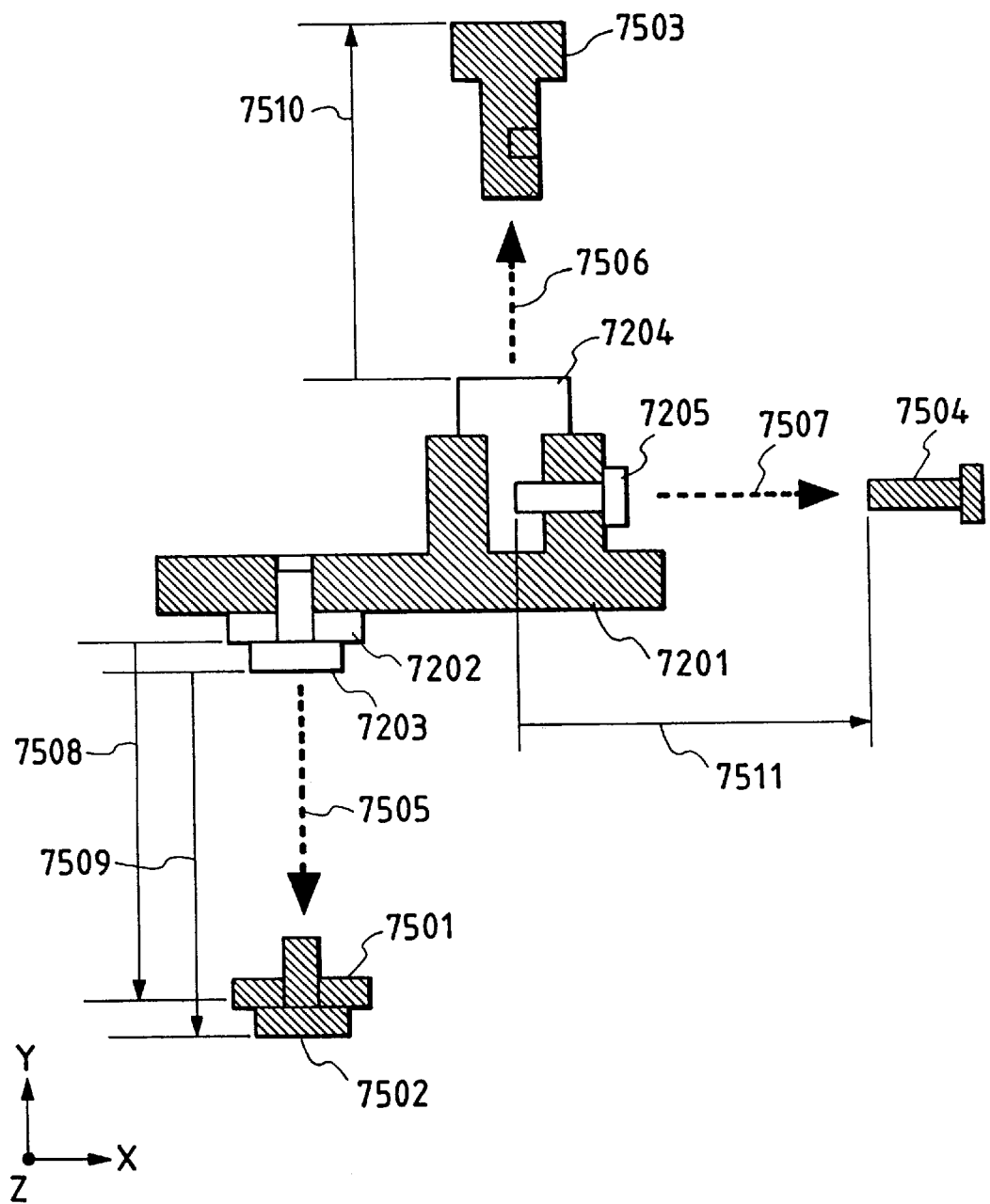
FIG. 75 is a view showing an animation display based on the operation data of detaching operation produced by an embodiment according to the present invention.

FIG. 75 is a view showing the process displayed by an animation which is produced by using the operating data shown in FIG. 74 as input data and producing the animation of the process 6604 shown in FIG. 66. In this figure, the part to be attached in the assembled state is illustrated by hollow picture and the part to be attached after detached is illustrated by hatched picture.

The direction of animation is illustrated by the arrow of broken line. The animation by the operating data of 7406 in the step of procedure 7307 is the movement from the position of the part to be attached 7202 to the position of the part to be attached 7501 in the animation direction 7505.

The time step is 0 second in the position of the part to be attached 7202 and $T_{const}$ second in the position of the part to be attached 7501. The amount of operation is the distance 7508 from the part to be attached 7202 to the part to be attached 7501, and is $D_{const}$. The animation by the operating data of 7407 in the step of procedure 7308 is the movement from the position of the part to be attached 7203 to the position of the part to be attached 7502 in the animation direction 7505.

The time step is 0 second in the position of the part to be attached 7203 and $T_{const}$ second in the position of the part to be attached 7502. The amount of operation is the distance 7508 from the part to be attached 7203 to the part to be attached 7502, and is $D_{const}$.

The animation by the operating data of 7408 in the step of procedure 7309 is the movement from the position of the part to be attached 7204 to the position of the part to be attached 7503 in the animation direction 7506. The time step is 0 second in the position of the part to be attached 7204 and $T_{const}$ second in the position of the part to be attached 7503. The amount of operation is the distance 7510 from the part to be attached 7204 to the part to be attached 7503, and is $D_{const}$.

The animation by the operating data of 7409 in the step of procedure 7310 is the movement from the position of the part to be attached 7205 to the position of the part to be attached 7504 in the animation direction 7507. The time step is 0 second in the position of the part to be attached 7205 and $T_{const}$ second in the position of the part to be attached 7504. The amount of operation is the distance 7511 from the part to be attached 7205 to the part to be attached 7504, and is $D_{const}$.

By seeing change of all the parts to be attached over time, at time step of 0 second the parts are in an assembled state, then all the parts each move in the corresponding animation directions at a time, and at time step of $T_{const}$ the animation of detaching operation is completed.

Figure 76:
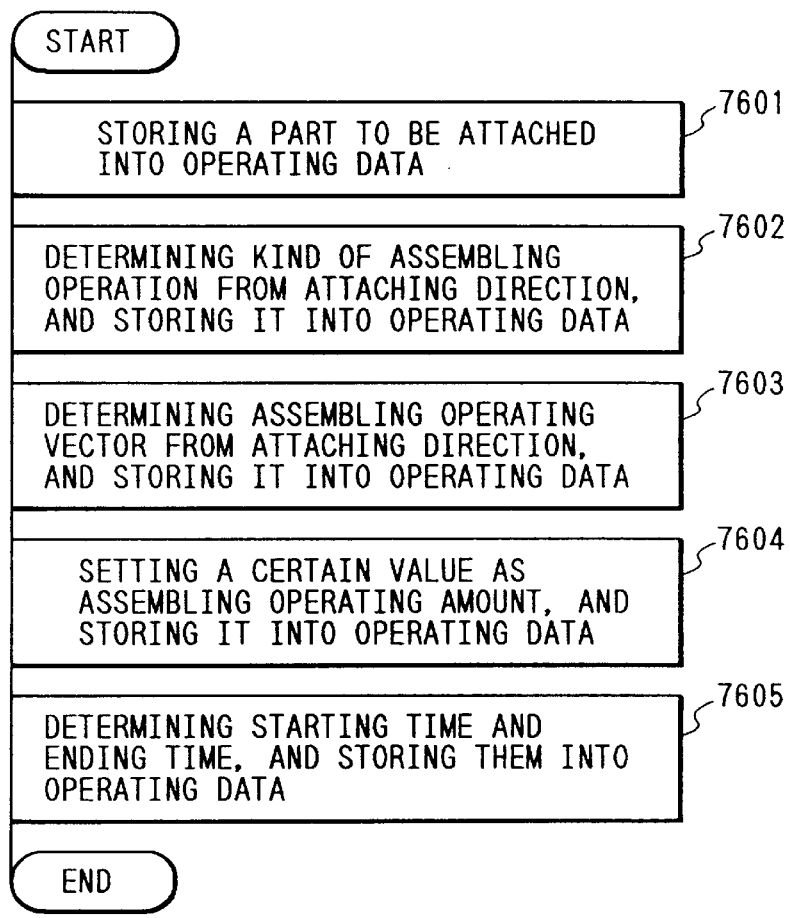
FIG. 76 is a flow-chart showing the detailed procedure of assembling operation data producing process.

The process for producing assembling operating data will be described below. FIG. 76 is a flow chart showing the detailed process procedure of the process 6804 for producing attached operating data. In process 7601, the part to be attached data read out from the assembling procedure data is set to the operating data 6707. In process 7602, the kind of operation is determined from the attaching direction data read out from the assembling procedure data, and is set to the operating data 6707.

In process 7603, the direction of operation is determined from the attaching direction, and set to the operating data 7607. In process 7604, the amount of operation is set as a constant amount, and is set to the operating data 6707. In process 7605, the starting time and the ending time are obtained from the step of procedure so that the animation time is not overlapped with that of other part to be attached, and they are set in the operating data 6707.

Figure 77:
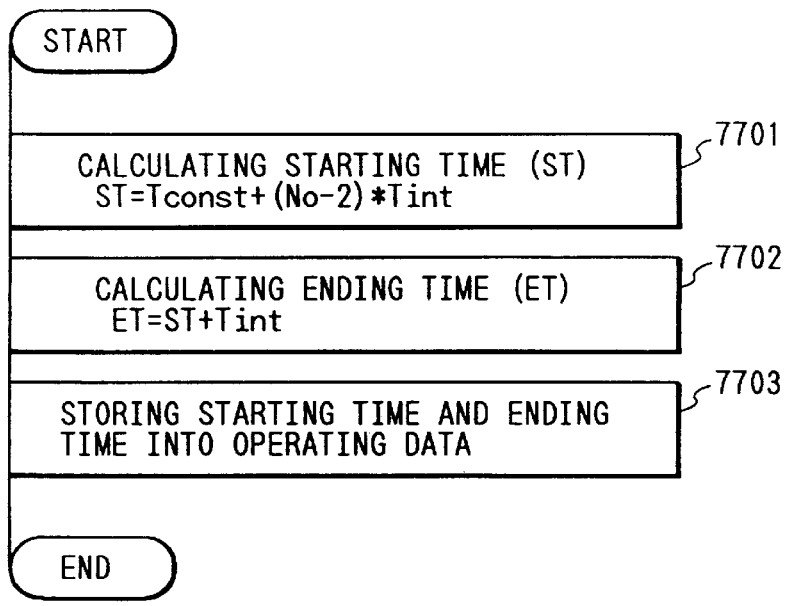
FIG. 77 is a flow-chart showing the detailed procedure of assembling time step setting process in the assembling operation data producing process.

FIG. 77 is a flow chart showing the detailed process procedure of the process 7605 shown in FIG. 76. In process

7701, the starting time (ST) is obtained by the following equation:

$$ST = T_{const} + (N_0 - 2) \times T_{int} \quad (8)$$

where $T_{const}$ is a constant value for time step, and is equal to the ending time of parts to be attached in the detaching operating data. $N_0$ is the sequence number of the step of procedure. $T_{int}$ is the animation time during which a part to be attached changes from a detached state to an attached state.

In process 7702, the ending time (ET) is obtained by the following equation:

$$ET = ST + T_{int} \quad (9)$$

In process 7703, the starting time and the ending time obtained in process 7701 and process 7702 are stored in the operating data.

Figure 78:
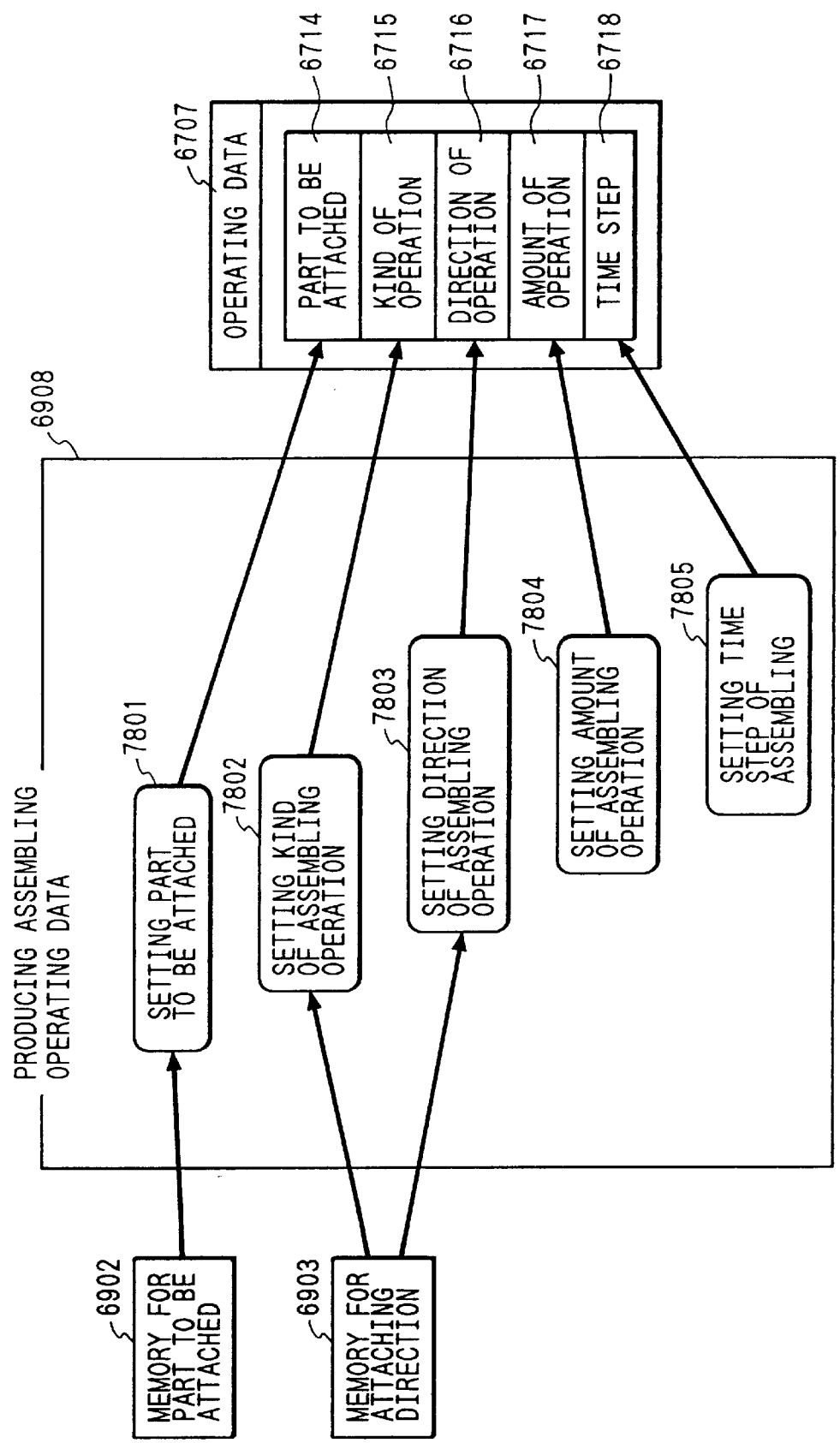
FIG. 78 is a functional structural diagram showing an apparatus executing assembling operation data producing process.

FIG. 78 is a diagram showing the structure of an apparatus executing the process for producing attaching operation. A program 7801 for setting part to be attached reads out the data of part to be attached from the memory 6902 for part to be attached, and stores it to the operating data 6707 as part to be attached 6714.

A program 7802 for setting kind of assembling operation reads out the data of attaching direction from the memory 6903 for attaching direction, and obtains the kind of operation corresponding to the kind of attaching direction, and stores it to the operating data 6707 as kind of operation 6715.

A program 7803 for setting direction of assembling operation reads out the attaching direction data from the memory 6903 for attaching direction, and stores the direction opposite to the attaching direction in the operating data 6707 as the operating direction 6716.

A program 7804 for setting amount of assembling operation sets the amount of moving the part to be attached from an assembled state to detached state, and stores it in the operating data 6707 as the amount of operation 6717. A program 7805 for setting assembling time step determines the time step so that the animation time does not overlap with that of other part to be attached, and stores it to the time step 6719 in the operating data 6707.

Description will be made below using an example on the feature where the operating data 6707 for assembling the part from a separated state to an assembled state is produced by the process for producing operating data in FIG. 68, the process for producing assembling operation data in FIG. 76 and the process for calculating time step of the assembling operating data in FIG. 77.

Figures 79, 80:
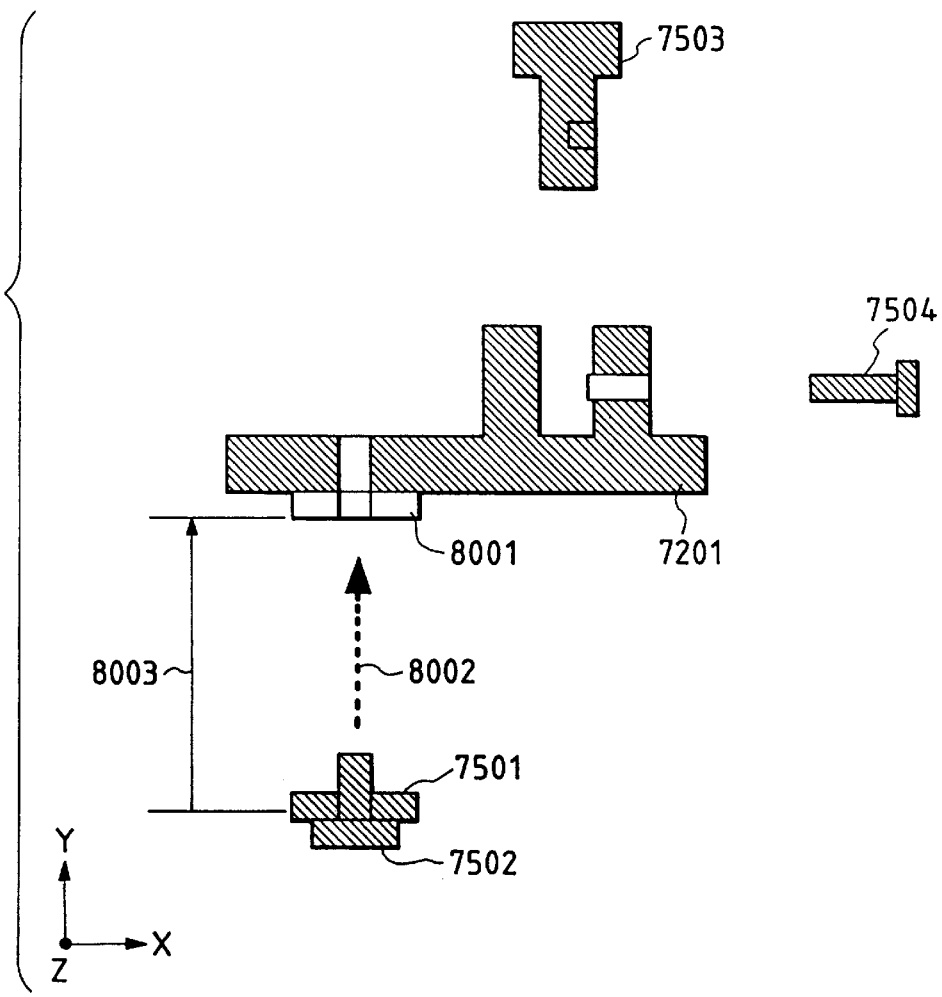
FIG. 79 is a diagram explaining operation data of assembling operation produced by an embodiment according to the present invention.
FIG. 80 is a view showing an animation display based on the operation data of assembling operation produced by an embodiment according to the present invention.

The geometry of the assembly is the same in FIG. 72. A part 6201, a part to be attached 7501, a part to be attached 7502, a part to be attached 7503, a part to be attached 7504 are in a disassembled state. The processes 6802 to 6804 are repeated to be applied by the process 6801 during steps of procedure from 2 to 5. The result of the process is shown in FIG. 79.

Only the process 6804 for producing assembling operating data will be described here, but the process 6803 for producing detaching operating data has been described above. The process of the second step 7307 of procedure will be described.

In process 6802, the assembling procedure in step 7307 of procedure is read out. And in process 6083, the data of assembling operation is produced. In process 7601 in FIG. 76, the part to be attached 7202 read out is stored in the operating data.

Next, in process 7602, since the kind of attaching direction read out is "moving", the kind of operation is stored in the operating data as "straight moving". Then, in process 7603, the directional vector 7206 read out is stored in the operating data. Next, in process 7604, a constant distance ($D_{const}$) is stored in the operating data as the amount of operation. In the last, in process 7605, time step is determined and stored it to the operating data.

As for determining the time step, the starting time step is determined by calculation described in process 7701 not so as to overlap with the time step of the detaching operation and the time step of a part to be attached of which assembling operation has been determined.

Since the step of procedure 7303 is for the first part of assembling operation, that is, the sequence number of the step of procedure is "2", the starting time becomes $T_{const}$. Next, the ending time is determined. The ending time is the sum of the starting time and the attaching animation time ($T_{int}$). Then the starting time and the ending time determined in process 7703 are stored in the operating data. The operating data produced in the step of procedure 7307 is shown in FIG. 79.

The assembling operating data of the part to be attached 7202 in the step of procedure 7307 is indicated by the numeral 7901 in FIG. 79. After completion of producing the assembling operating data in the step of procedure 7307, the step of procedure 7308 to the step of procedure 7310 are sequentially performed.

Here, only the determination of time step will be described. The starting time of the step of procedure 7308 becomes $T_{const} + T_{int}$ since the sequence number of the step of procedure is 3. This time is the same as the ending time of the step of procedure 7307, that is, the assembling animation of the part to be attached 7203 starts after completion of the assembling animation of the part to be attached 7202. The ending time is $T_{const} + 2 \times T_{int}$.

Similarly, the starting time of the step of procedure 7309 is $T_{const} + 2 \times T_{int}$ and is the same as the ending time of the step of procedure 7308. The ending time is $T_{const} + 3 \times T_{int}$. The starting time of the step of procedure 7310 is $T_{const} + 3 \times T_{int}$ and is the same as the ending time of the step of procedure 7309. The ending time is $T_{const} + 4 \times T_{int}$. The assembling operating data of the steps of procedure 7308 to 7310 are indicated by the numerals 7902, 7803, 7904 in FIG. 79.

FIG. 80 to FIG. 83 are views showing the process displayed by an animation which is produced by using the operating data shown in FIG. 79 as input data and producing the animation of the process 6604 shown in FIG. 66.

In these figures, for the purpose of explanation, the part to be attached in the detached state is illustrated by hatched picture and the part to be attached in an assembled state is illustrated by hollow picture. The direction of animation is illustrated by the arrow of broken line.

FIG. 80 shows the animation process of the operating data 7901. This is an animation in which the part to be attached 7201 is moved in the animation direction 8002 from the position 7501 at the starting time $T_{const}$ to the position 8001 at the ending time $T_{const} + T_{int}$. The amount of operation is the distance 8003 from the position 7501 to the position 8001 is $D_{const}$.

Figure 81:
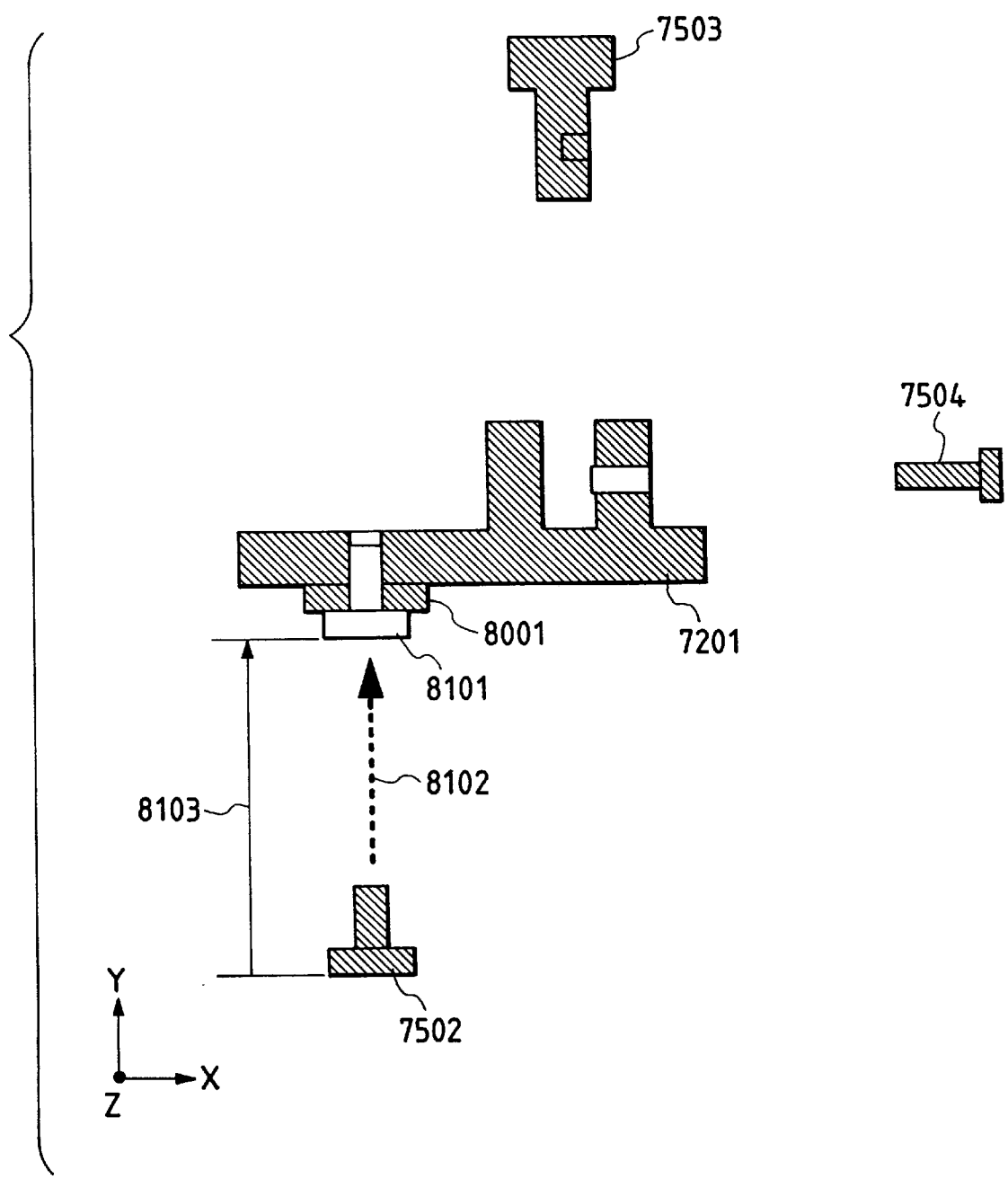
FIG. 81 is a view showing an animation display based on the operation data of assembling operation produced by an embodiment according to the present invention.

FIG. 81 shows the animation process of the operating data 7902. This is an animation in which the part to be attached 7203 is moved in the animation direction 8102 from the position 7502 at the starting time $T_{const} + T_{int}$ to the position 8101 at the ending time $T_{const} + 2 \times T_{int}$. The amount of operation is the distance 8103 from the position 7502 to the position 8101 is $D_{const}$.

Figure 82:
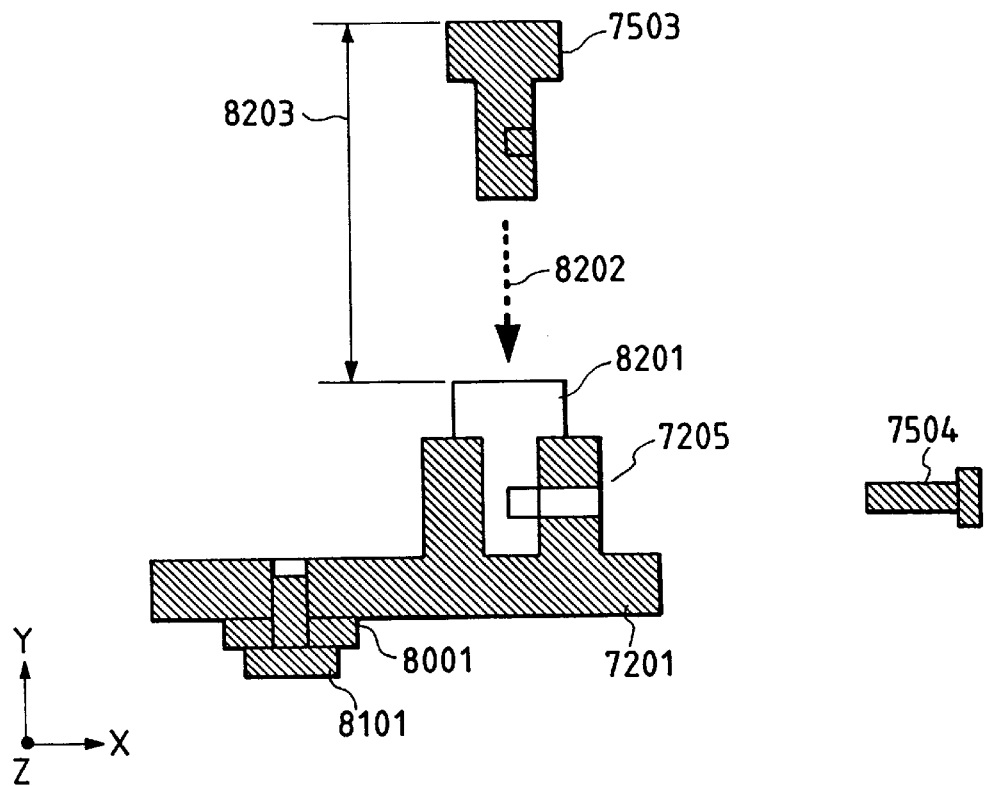
FIG. 82 is a view showing an animation display based on the operation data of assembling operation produced by an embodiment according to the present invention.

FIG. 82 shows the animation process of the operating data 7903. This is an animation in which the part to be attached 7204 is moved in the animation direction 8202 from the position 7503 at the starting time $T_{const}+2\times T_{int}$ to the position 8201 at the ending time $T_{const}+3\times T_{int}$. The amount of operation is the distance 8203 from the position 7503 to the position 8201 is $D_{const}$.

Figure 83:
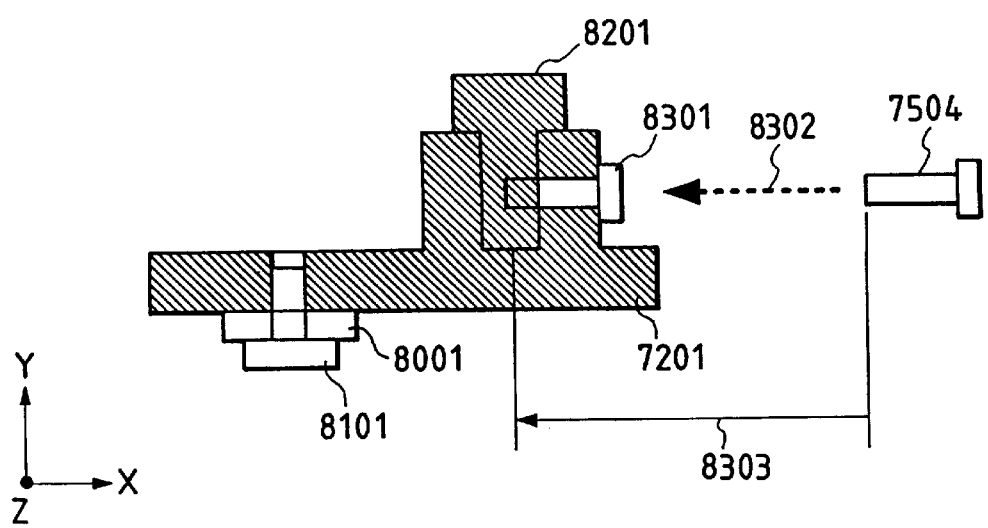
FIG. 83 is a view showing an animation display based on the operation data of assembling operation produced by an embodiment according to the present invention.

FIG. 83 shows the animation process of the operating data 7904. This is an animation in which the part to be attached 7205 is moved in the animation direction 8302 from the position 7504 at the starting time $T_{const}+3\times T_{int}$ to the position 8301 at the ending time $T_{const}+4\times T_{int}$ The amount of operation is the distance 8303 from the position 7504 to the position 8301 is $D_{const}$.

As described above, by producing assembling operating data shown in FIG. 79, an animation display can be obtained from a detached state to an assembled state of parts to be assembled with the unit of sequential number in the assembling procedure. Further, by combining the detaching operating data shown in FIG. 74 and the assembling operating data shown in FIG. 79 to a set of data and performing the process for producing animation of process 6604, an assembling animation starting from an assembled state can be obtained.

Figure 84:
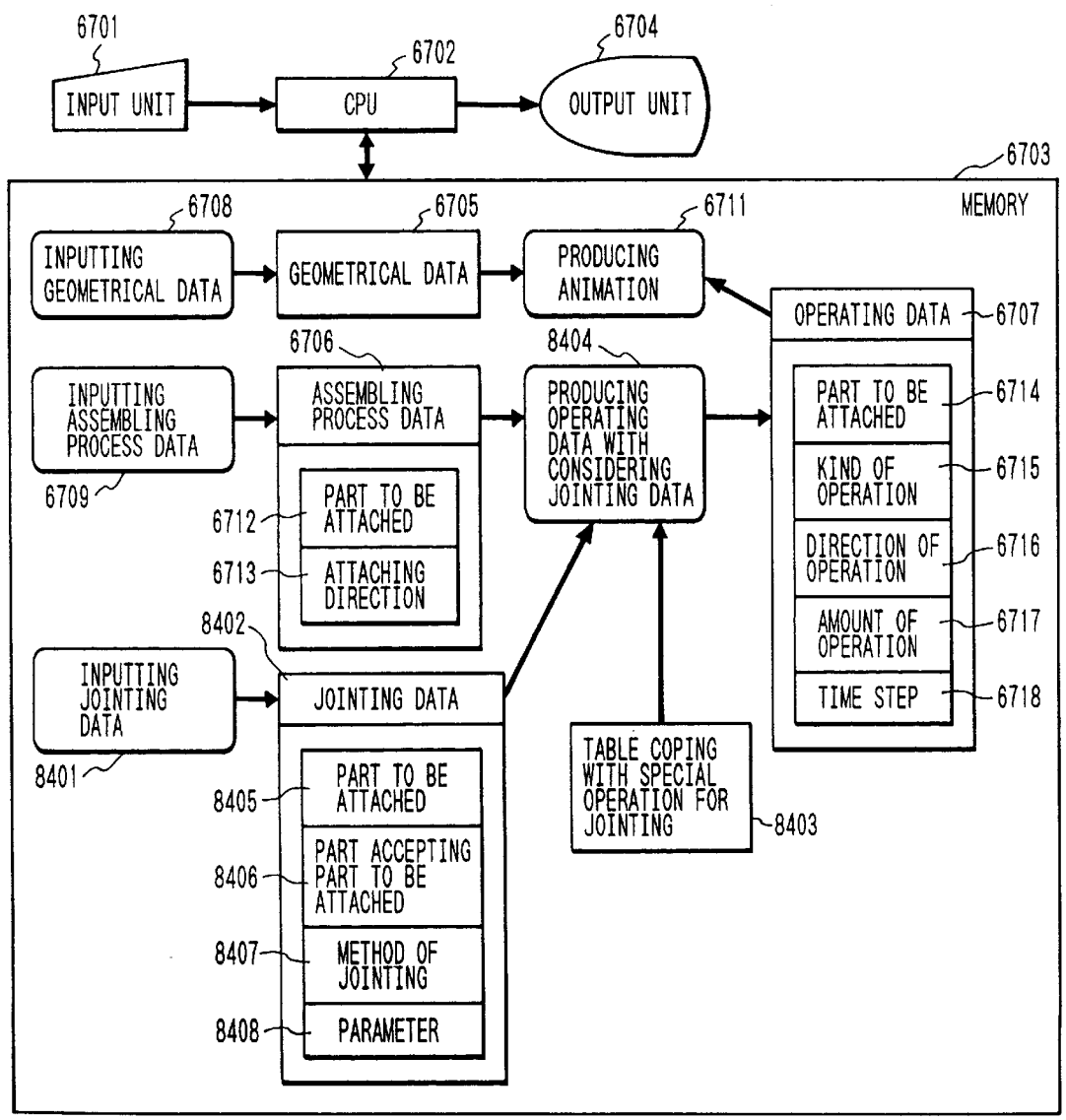
FIG. 84 is a functional structural diagram showing an apparatus realizing an embodiment according to the present invention.

Another embodiment of the present invention will be described below. FIG. 84 is a functional diagram showing the construction of an apparatus for producing animation of assembling where in the construction of the apparatus for producing animation of assembling shown in FIG. 67, a program 8401 for inputting jointing data, jointing data 8402, a table 8403 coping with special operation for jointing are added, and the program 6710 for producing operating data is changed to a program 8404 for producing operating data with considering jointing data.

The program 8401 for inputting jointing data is to take instruction of an operator from the input unit 6701 and jointing data from other programs and the computer. The jointing data 8402 stores sets of part to be attached 8405, part accepting part to be attached 8406, method of jointing 8407 and parameter 8408 of detailed data of the method 8407 of jointing for each of the parts to be attached.

The program 8404 for producing operating data with considering jointing data produces operating data for each of the parts to be attached from the assembling procedure data 6706 and reads out data from the jointing data 8402, and produces operating data special for jointing by referring the table 8403 coping with special operation for jointing, and then stores it as the operating data 6707. The table 8403 coping with special operation for jointing is a table for making correspondence between the method of jointing in the jointing data and the operation of the method of jointing.

Figures 85, 88:
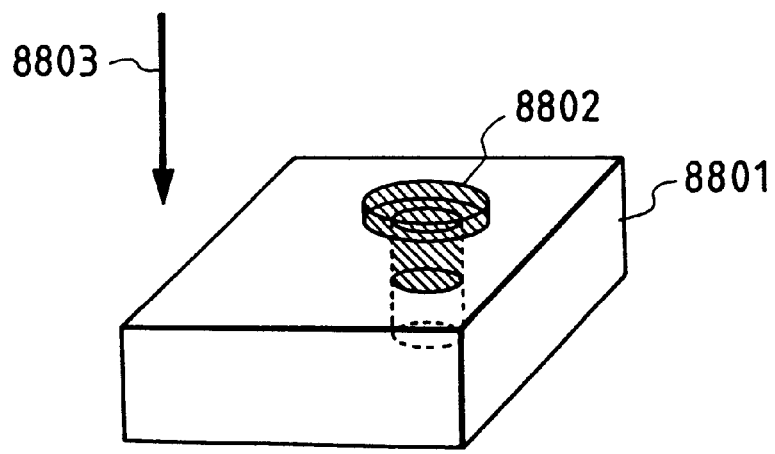
FIG. 85 is a diagram showing an embodiment of a table for special-jointing-operation.
FIG. 88 is a view showing an example of assembly.

FIG. 85 shows an example of the table 8403 coping with special operation for jointing. The methods of jointing for assembling work such as screw, welding, soldering and so on are set in the column of jointing method 8501, and the kinds of movement of part to be attached itself such as revolution, locking and so on are set in the column of special operation 8502.

Figure 86:
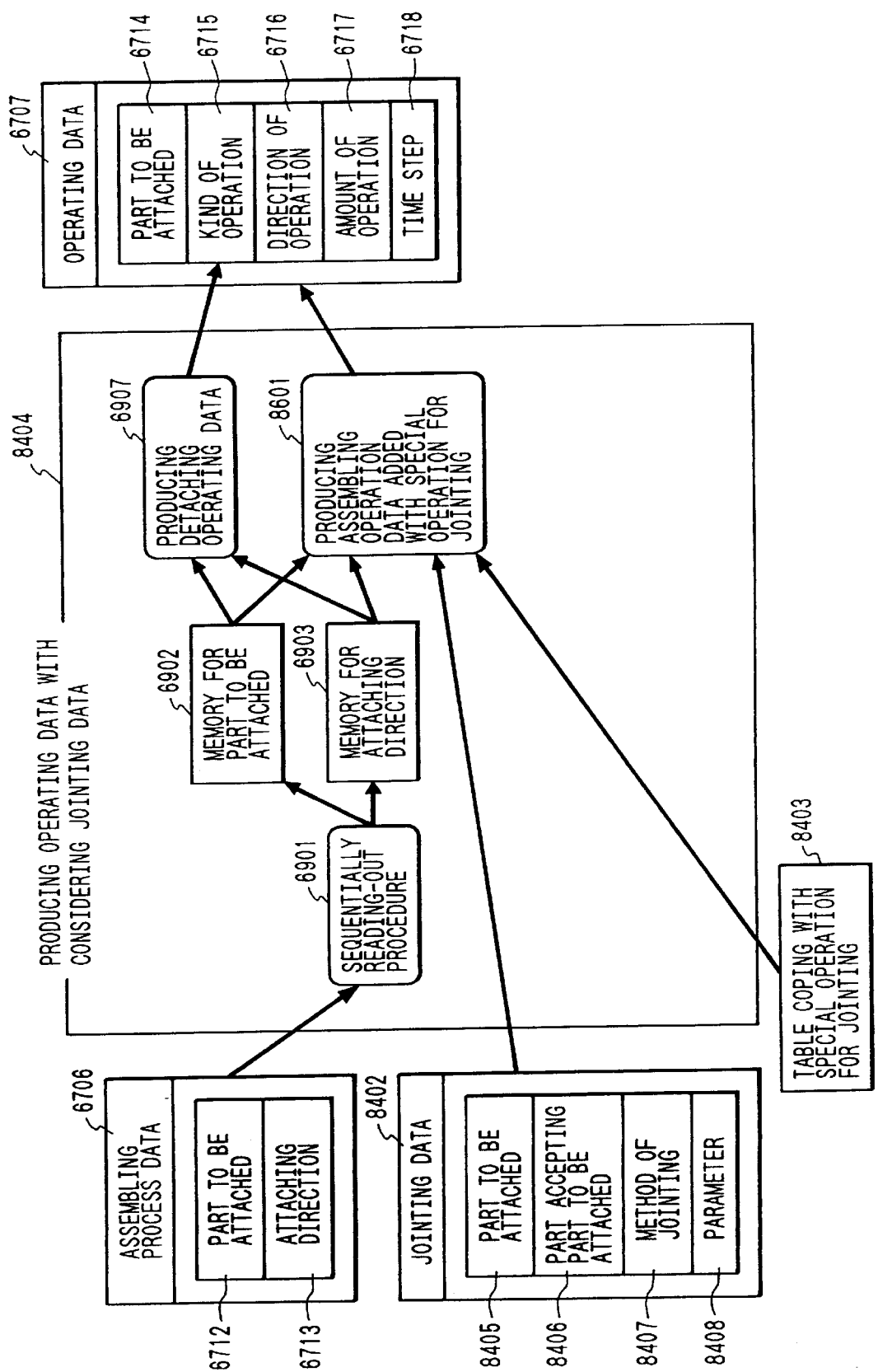
FIG. 86 is a functional structural diagram showing an apparatus executing operation data producing process.

FIG. 86 is a functional diagram showing the construction of an embodiment of the program 8404 for producing operating data. A program 6901 for sequentially reading-out procedure reads out assembling procedure step in the assembling procedure data 6906 one by one, and stores it into a memory 6902 for part to be attached and a memory 6903 for attaching direction.

A program 6907 for producing detaching operating data produces the detaching operating data in which the starting point is the position of an assembled state of the part to be attached and the ending point is the position proceeding in the direction opposite to the attaching direction read out from the memory 6903 for attaching direction. The operating data produced is stored as the operating data 6707.

A program 8601 for producing assembling operating data added with special operation for jointing produces the attaching operating data in which the starting point is the ending point in the program 6907 for producing detaching operating data and the ending point is the position of an assembled state of the part to be attached. The operating data produced is stored as the operating data 6707.

In addition to these, the program 8601 for producing assembling operating data added with special operation for jointing reads out the jointing data 8402 and produces assembling operating data added with special operation for jointing by referring to the table coping with special operation for jointing, and stores the result to the operating data 6707.

Figure 87:
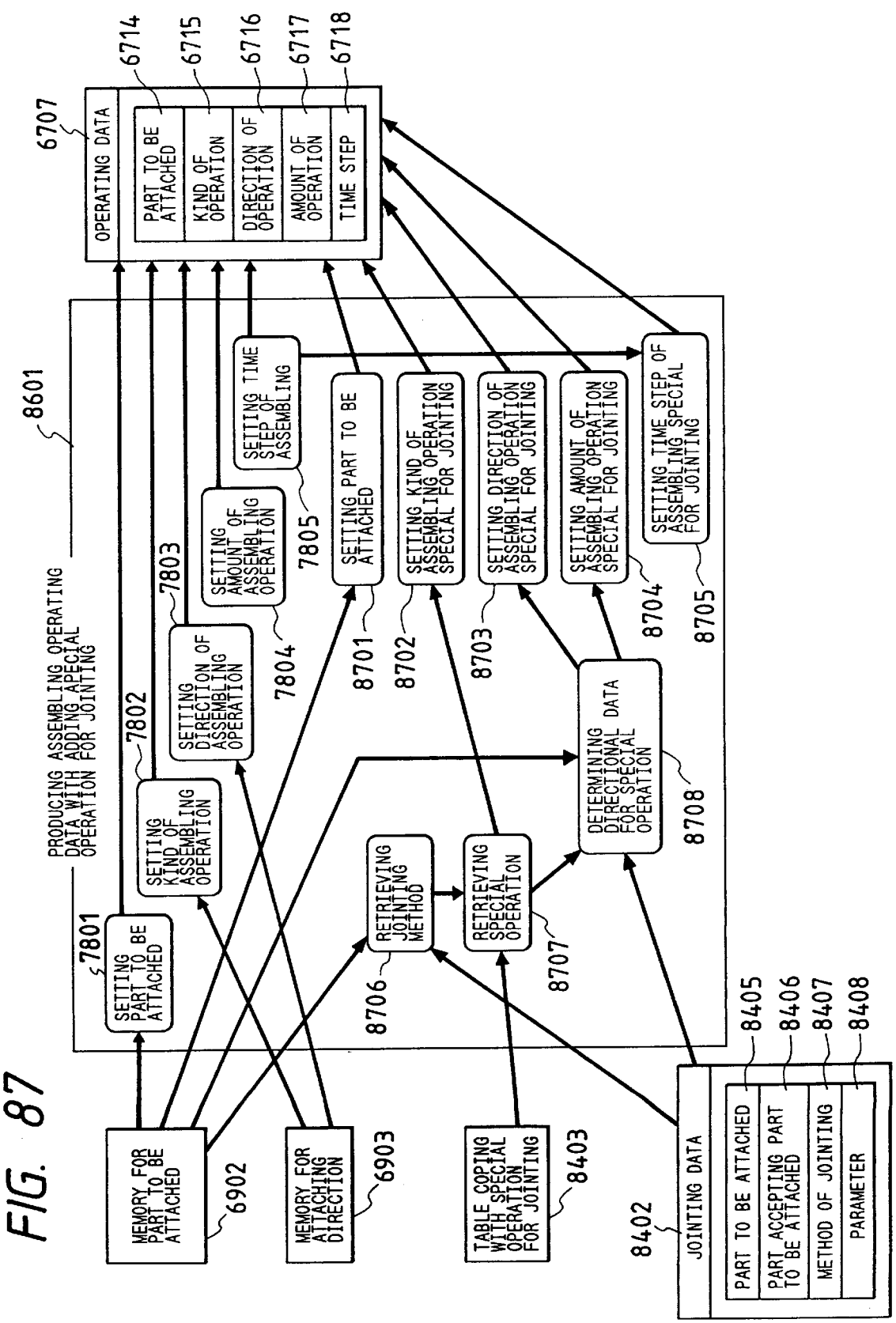
FIG. 87 is a functional structural diagram showing an apparatus executing assembling operation data producing process.

FIG. 87 is a functional diagram showing the construction of an embodiment of the program 8601 for producing assembling operating data with adding special operation for jointing. The process from the program 8701 for setting part to be attached to the program 7805 for setting assembling time step is the same as described in connection to FIG. 78.

The program 8701 for setting part to be attached reads out a part to be attached from the memory 6902 for part to be attached and stores it to the part to be attached 6714 in the operating data 6707. A program 8402 for retrieving jointing method retrieves the part to be attached data read out from the memory 6902 for part to be attached in the jointing data 8402.

A program 8707 for retrieving special operation for jointing retrieves the special operation of jointing method retrieved by the program 8706 for retrieving joint method from the table 8403 coping with special operation for jointing.

A program 8708 for determining operating data special for jointing determines the direction and the amount of operation of operation special for jointing from the special operation retrieved by the program 8707 for retrieving special operation from the jointing data 8402 with referring to the parameter of jointing method.

A program 8702 for setting kind of assembling operation special for jointing receives a special operation from the program 8707 for retrieving jointing method and stores it to the kind of operation 6715 in the operating data 6707.

A program 8703 for setting direction of assembling operation special for jointing receives a direction of operation special for jointing form the program 8708 for determining operating data special for jointing, and stores it to the direction of operation 6716 in the operating data 6707.

A program 8704 for setting amount of assembling operation special for jointing receives an amount of operation special for jointing from the program 8708 for determining operating data special for jointing, and stores it to the amount of operation 6717 in the operating data 6707.

A program 8705 for setting assembling time step special for jointing receives a time step from the program 7805 for setting assembling time step, and stores it to the time step 6718 in the operating data 6707.

Description will be made below using an example on the principle where the program 8601 for producing assembling operating data with adding special operation for jointing.

FIG. 88 shows an assembled state of two parts 8801 and 8802. This assembling procedure data is shown in FIG. 89. In FIG. 89, the part 8801 is a part to be set at the beginning, and the part 8802 is a part to be attached in the direction of a vector 8803. FIG. 90 shows the input jointing data. Firstly, operating data is produced by the programs 7801 to 7805 in FIG. 87, and stores it to the operating data 6707.

This operation is the same as described with connection to the aforementioned embodiment. The result of operating data is in the row 9101 in FIG. 91.

Next, assembling operating data special for jointing is produced and stored to the operating data 6707. Firstly, part to be attached 8802 is read out from the memory 6902 for part to be attached and stored to the operating data 6707.

Next, the part to be attached 8802 is retrieved from the jointing data in FIG. 90, and the method of jointing "screw" is obtained. After that, the "screw" is retrieved from the table coping with special operation for jointing in FIG. 85, and the special operation for jointing "revolution" is obtained.

The special operation for jointing "revolution" obtained is stored in the operating data 6707 as the kind of assembling special for jointing. Next, the parameter of jointing method "screw" is referred from the jointing data in FIG. 90.

Then, the parameter of center axis is set as a vector of center axis around which the part to be attached 8802 is rotated. The angle of rotation by which the part to be attached 8802 is rotated is obtained from the parameter of screw length. Letting these values be $D_v$, $D_{rot}$, respectively.

The obtained vector $D_v$ of center axis is stored in the operating data 6707 as the direction of operation, and the obtained angle $D_{rot}$ of rotation is stored in the operating data 6707 as the amount of operation. In the last, the value equal to the time step of the operating data 9101 of the part to be attached 8802 is stored in the operating data 6707 as the time step for the assembling operation special for jointing. The result of operation data is shown in the row 9102 in FIG. 91.

Figure 92:
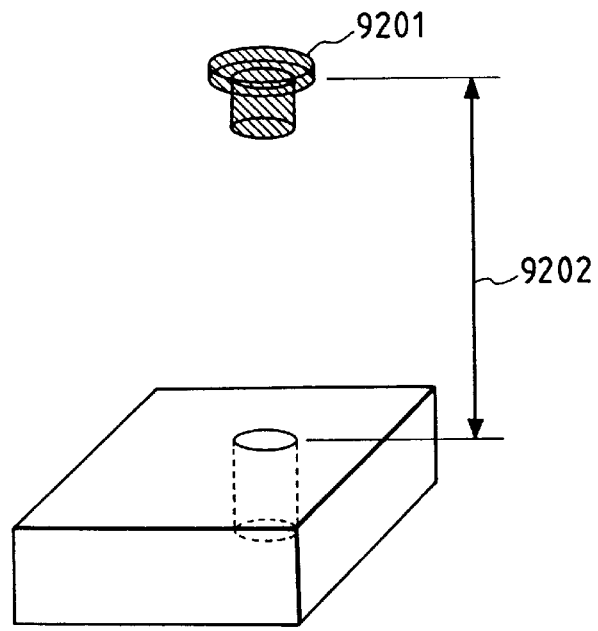
FIG. 92 is a view showing an animation display based on the operation data of assembling operation produced by an embodiment according to the present invention.
Figure 93:
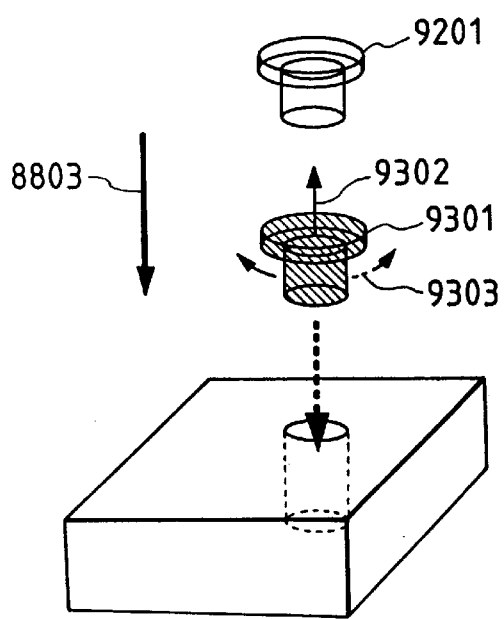
FIG. 93 is a view showing an animation display based on the operation data of assembling operation produced by an embodiment according to the present invention.

FIG. 92 and FIG. 93 are views showing the process displayed by an animation which is produced by using the operating data shown in FIG. 79 as input data and producing the animation of the process 6604 shown in FIG. 66. Herein, the animation process from a detached state will be described, assuming that the animation of detaching operating data has been completed.

FIG. 92 shows a state where the part 9201 is detached, that is, a state just before starting assembling operation. The time step at this time is ST1 ($T_{const}$) and the distance 9202 moved from the assembled state by the animation of detaching operating data is $D_{const}$.

FIG. 93 shows an intermediate state of the animation of assembling operation. This is a feature where the part to be attached reaches the position of part 9301 after passing a certain time from the position of part 9201. The movement of the part to be attached itself is being rotated with vector 9302 as the vector of center axis $D_v$ and arrow 9303 as the rotating angle while the part to be attached moving straight in a directional vector 8803.

Finally, the parts becomes in an assembled state at time step of ET1 as shown in FIG. 88. As described above, by adding operation special for jointing, the details of assembling work as well as the order of assembling can be easily confirmed.

Figure 94:
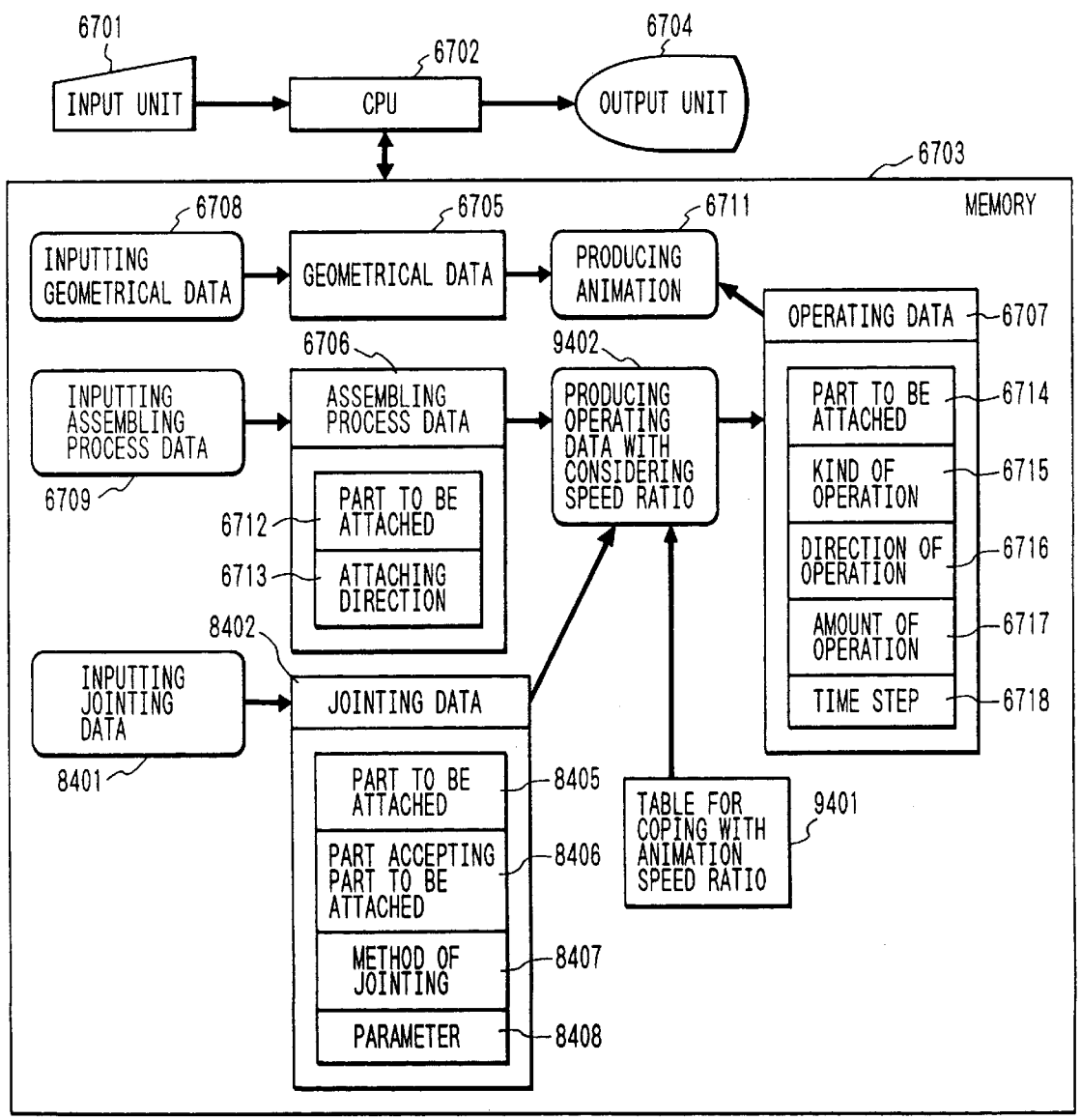
FIG. 94 is a structural diagram showing an apparatus realizing an embodiment according to the present invention.

A further embodiment of the present invention will be described below. FIG. 94 is a functional diagram showing the construction of an apparatus for producing animation of assembling where in the apparatus for producing animation of assembling in FIG. 84, the table 8403 coping with special operation for jointing is changed to a table 9401 for coping with animation speed ratio, and the program 8404 for producing operating data with considering jointing data is changed to a program 9402 for producing operating data with considering speed ratio.

The program 9402 for producing operating data with considering speed ratio reads out each of the part to be attached from the assembling procedure data 6706 and jointing data from the jointing data 8402, and produces the operation data with referring to the table 9401 for coping with animation speed ratio, and stores it to the operating data 6707. The table 9401 for coping with animation speed ratio is a table for making correspondence between the method of jointing in the jointing data and the animation speed ratio of operation of the method of jointing.

Figures 95, 98:
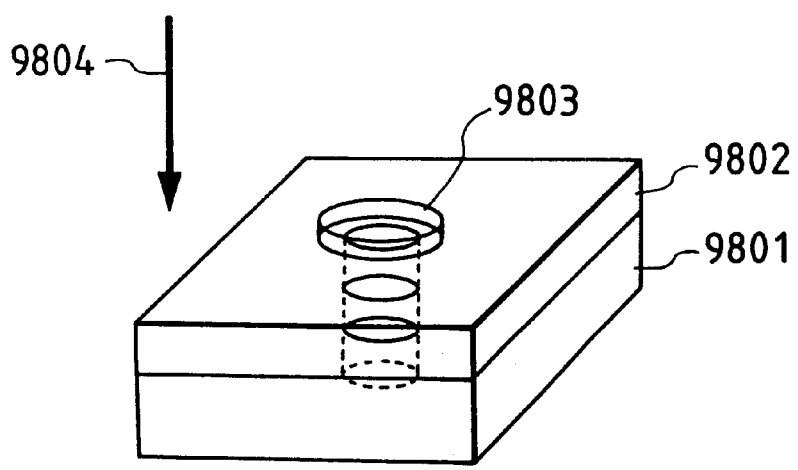
FIG. 95 is a diagram showing an embodiment of a table for animation-speed-ratio.
FIG. 98 is a view showing an example of assembly.

FIG. 95 shows an example of the table 9401 coping with animation speed. The methods of jointing for assembling jointing such as snap, screw, welding and so on are set in the column of jointing method 9501, and the ratio of the animation time of the jointing method to the animation time ($T_{int}$) for each of the part to be attached described in the aforementioned embodiment are set in the column of special operation 9502.

Figure 96:
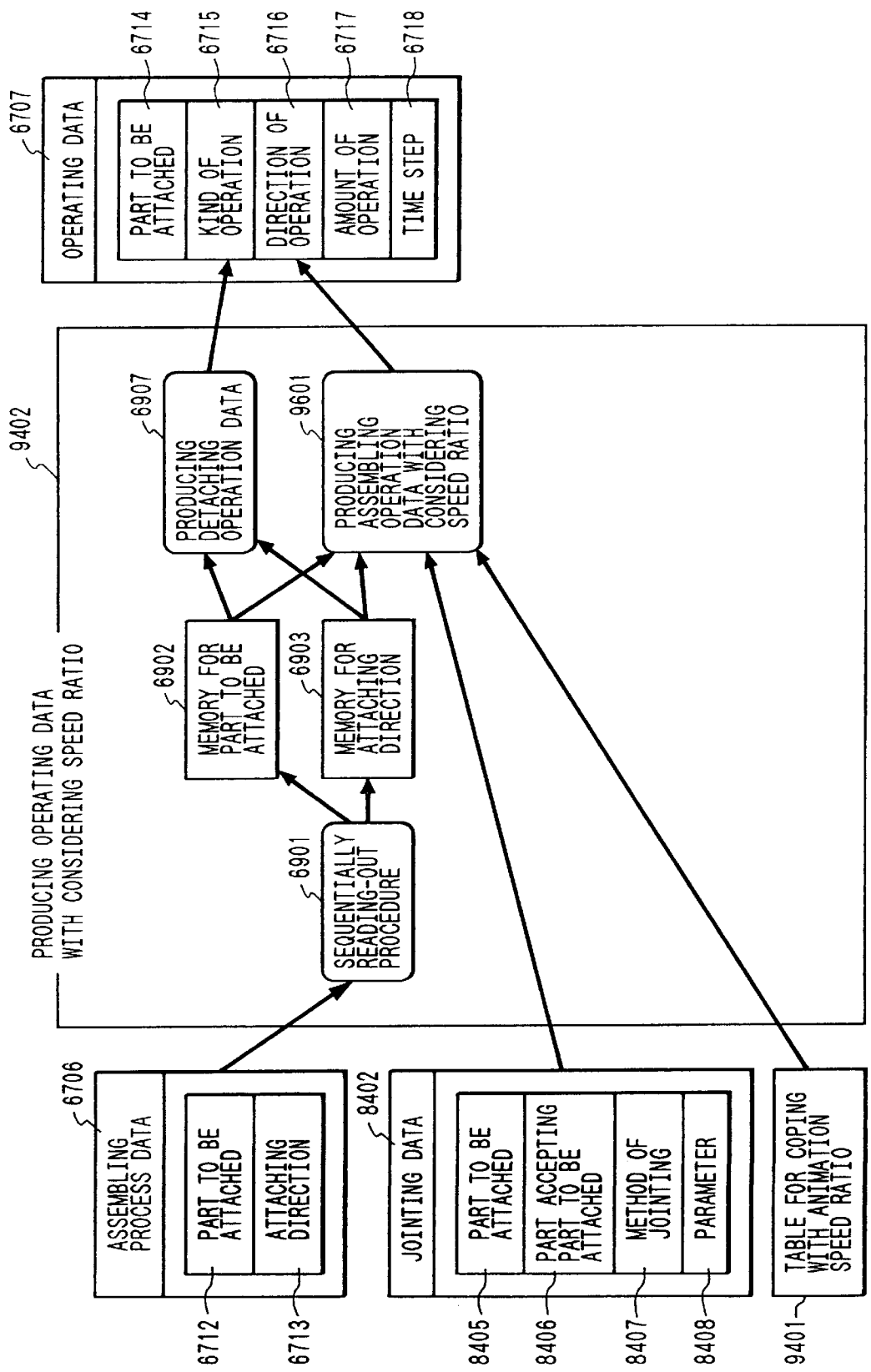
FIG. 96 is a functional structural diagram showing an apparatus executing operation data producing process.

FIG. 96 is a functional diagram showing the construction of an embodiment of the program 9402 for producing operating data with considering speed ratio. A program 6901 for sequentially reading-out procedure reads out assembling procedure step in the assembling procedure data 6906 one by one, and stores it into a memory 6902 for part to be attached and a memory 6903 for attaching direction.

A program 6907 for producing detaching operating data produces the detaching operating data in which the starting point is the position of an assembled state of the part to be attached and the ending point is the position proceeding in the direction opposite to the attaching direction read out from the memory 6903 for attaching direction. The operating data produced is stored as the operating data 6707.

A program 9601 for producing assembling operating data with considering speed ratio produces the assembling operating data having an animation time with considering speed ratio in which the starting point is the ending point in the program 6907 for producing detaching operating data and the ending point is the position of an assembled state of the part to be attached. The operating data produced is stored as the operating data 6707.

FIG. 97 is a functional diagram showing the construction of an embodiment of the program 9601 for producing assembling operating data with considering speed ratio. The process from the program 8701 for setting part to be attached to the program 7804 for setting amount of assembling operation is the same as described in connection to FIG. 78.

A program 8706 for retrieving jointing method retrieves the part to be attached data read out from the memory 6902 for part to be attached in the jointing data 8402. A program 9701 for retrieving speed ratio retrieves the speed ratio of jointing method retrieved by the program 8706 for retrieving jointing method from the table 9401 for coping with animation speed ratio.

A program 9702 for setting assembling time step with considering speed ratio receives a speed ratio from the program 9701 for retrieving speed ratio, and calculates time step, and stores it to the time step 6718 in the operating data 6707.

Description will be made below using an example on the principle where the program 9601 for producing assembling operating data with considering speed ratio. FIG. 98 shows an assembled state of three parts 9801, 9802 and 9803. The attaching direction of the parts 9802, 9803 is the directional vector 9804.

This assembling procedure data is, for example, as shown in FIG. 99. The step of procedure 9901 is to set the part 9801 in the beginning, and the sequence of attaching is order of the part 9802 and then the part 9803 according to the steps of procedure 9902, 9903.

FIG. 100 shows input jointing data. The description of this example will be made only on setting of the assembling time step of the part 9802. The setting of the assembling time step of the part 9802 is as follows.

Firstly, the step of procedure 9902 of the part to be attached 9802 is retrieved by the program 8706 for retrieving jointing method with referring to the jointing data shown in FIG. 100, and the jointing method "snap" is obtained.

Next, the "snap" is retrieved by the program 9701 for retrieving speed ratio with referring to the table coping with animation speed ratio shown in FIG. 95, and the speed ratio "1.0" is obtained. Then, starting time and ending time are calculated by the program 9702 for setting assembling time step, and the result is stored in the operating data 6707.

The starting time (ST1) and the ending time (ET1) are obtained by the following equation.

$$ST1 = T_{const} \quad (10)$$

$$ET1 = T_{const} + RT1 \times T_{int} \quad (11)$$

where $T_{const}$ is a constant value of time step, and is equal to the ending time of each part to be attached in the detaching operation data. $T_{int}$ is a standard animation time during which a part-to-be-attache is changed from a detached state to an attached state. RT1 is a speed ratio retrieved by the program 9701 for retrieving speed ratio, and is "1.0" in this case, the result of operating data is shown in the row 10101 in FIG. 101.

Setting of assembling time step in next step of procedure 9903 is as follows. Firstly, the part to be attached 9803 in the step of procedure 9903 is retrieved with referring to the jointing data shown in FIG. 100, and the jointing method "screw" is obtained.

Next, the "screw" is retrieved by the program 9701 for retrieving speed ratio, and the speed ratio "1.5" is obtained. Then a starting time and the ending time are calculated by the program 9702 for setting assembling time step, and the results are stored in the operating data 6707.

The starting time (ST2) and the ending time (ET2) are obtained by the following equation.

$$ST2 = ET1 \quad (12)$$

$$ET2 = ST2 + RT2 \times T_{int} \quad (13)$$

where RT2 is the speed ratio retrieved by the program 9701 for retrieving speed ratio, and is "1.5" in this case. The starting time (ST2) is the ending time (ET1) of the part to be attached precedent by one. The ending time (ET2) is calculated by using the product of the standard animation time and the speed ratio as the animation time.

It can be understood from this that the animation time of the part to be attached 9803 is larger than that of the part to be attached 9802, and therefore the part to be attached 9803 moves slower than the part to be attached 9802.

Figure 102:
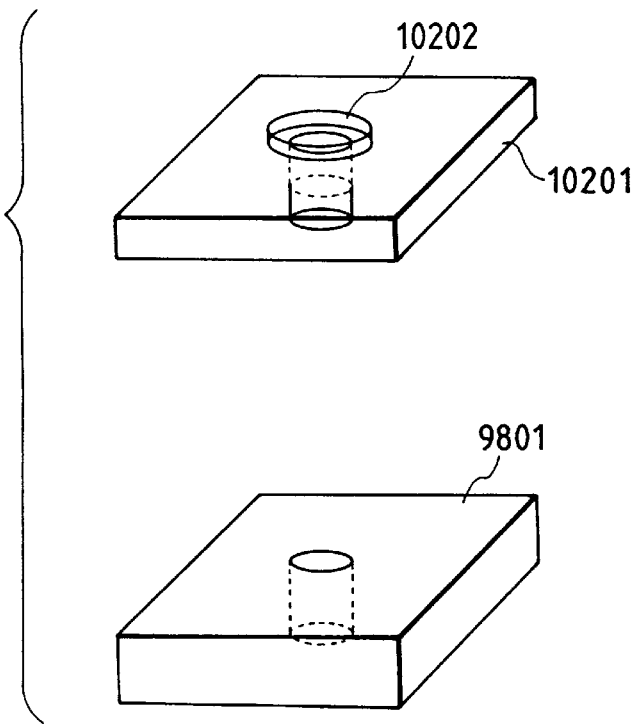
FIG. 102 is a view showing an animation display based on the operation data of assembling operation produced by an embodiment according to the present invention.
Figure 103:
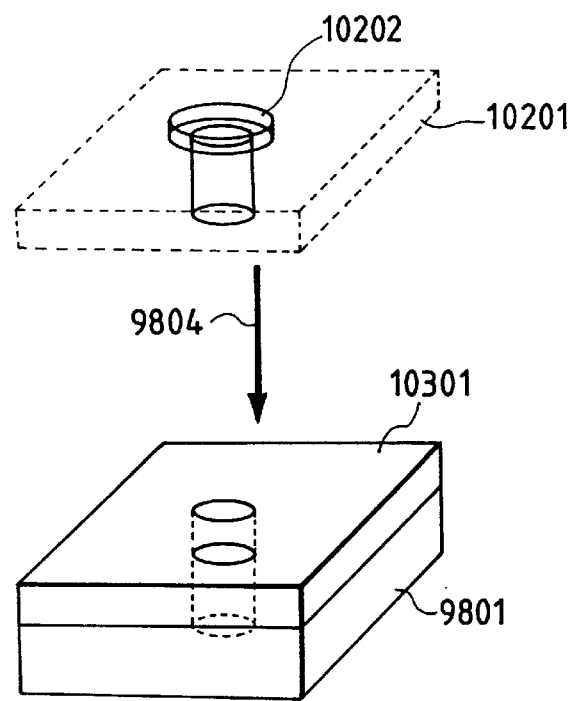
FIG. 103 is a view showing an animation display based on the operation data of assembling operation produced by an embodiment according to the present invention.
Figures 104, 106:
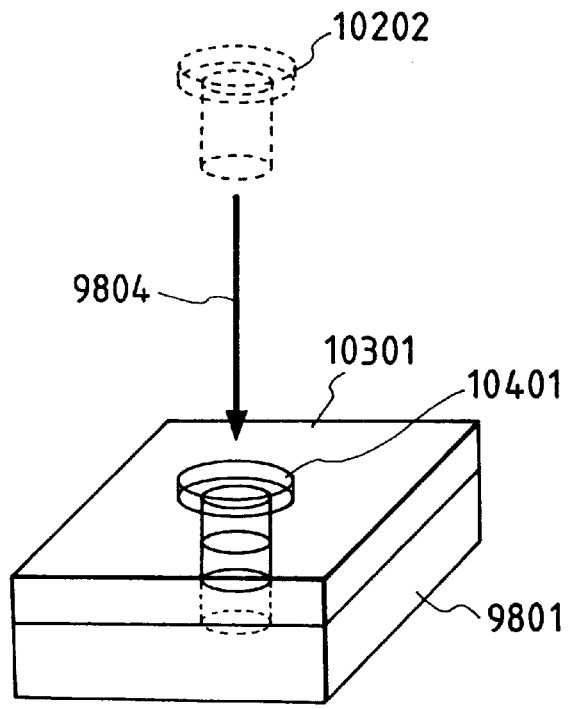
FIG. 104 is a view showing an animation display based on the operation data of assembling operation produced by an embodiment according to the present invention.
FIG. 106 is a diagram showing an embodiment of a table for working sound.

FIG. 102 to FIG. 104 are views showing the process displayed by an animation which is produced by using the operating data shown in FIG. 79 as input data and producing the animation of the process 6604 shown in FIG. 66. Therein, $D_{const}=1.0$, and $T_{int}=5.0$. Herein, the animation process from a detached state will be described, assuming that the animation of detaching operating data has been completed.

FIG. 102 shows a state where the parts 10202 and 10203 are detached, that is, a state just before starting assembling operation. The time step at this time is ST1 (1.0).

Firstly, an animation of the part to be attached 10201 is started at time step "1.0", the part to be attached 10201 moves in the direction of the attaching direction vector 9804 and proceeds to the position of the part 10301 at time step ET1 (6.0), and then the animation ends. This feature is shown in FIG. 103. The animation time of the part to be attached 10201 is 5.0 seconds.

Next, an animation of the part to be attached 10202 is started at time step ST2 (6.0), the part to be attached 10202 moves in the direction of the attaching direction vector 9804 and proceeds to the position of the part 10401 at time step ET2 (13.5), and then the animation ends. This feature is shown in FIG. 104. The animation time of the part to be attached 10202 is 7.5 seconds, and is longer than that of the part 10201 by 2.5 seconds.

A larger value is employed as the speed ratio described in the embodiment as the assembling becomes more difficult. Although the animation speed is expressed by the ratio to the time for a standard assembling operation, the actual assembling time may be employed by setting it in a table.

In this case, the starting time STn and the ending time ETn are obtained by the following equation. Therein, Bn expresses the method of jointing, and function RT expresses the assembling time corresponding to the method of jointing Bn.

$$ETn = STn + RT(Bn) \quad (14)$$

As described above, by changing the animation time depending on the degree of difficulty in assembling work of a part, the details of assembling work as well as the order of assembling can be easily confirmed.

Figure 105:
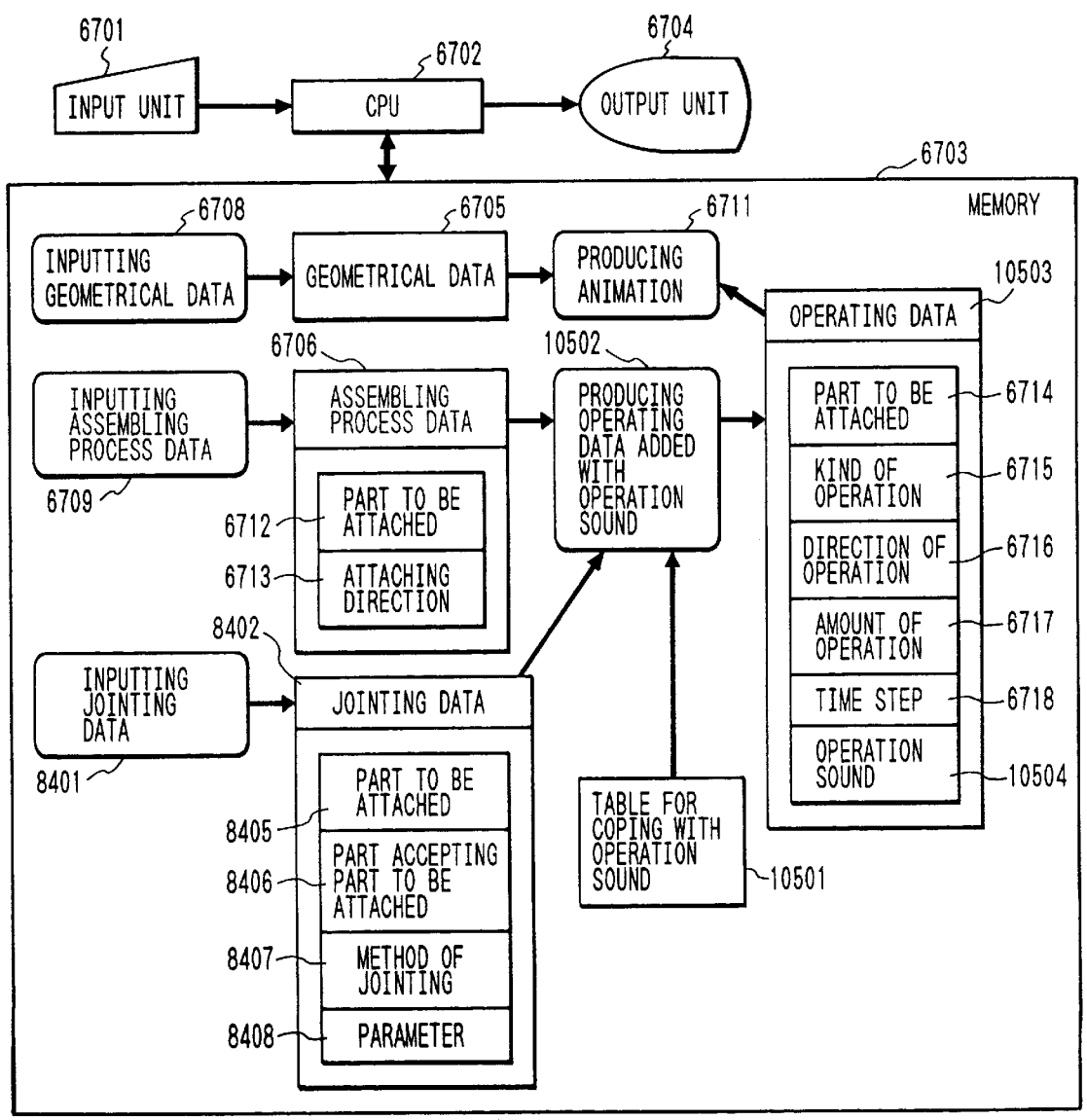
FIG. 105 is a structural diagram showing an apparatus realizing an embodiment according to the present invention.

A further embodiment of the present invention will be described below. FIG. 105 is a functional diagram showing the construction of an apparatus for producing animation of assembling where in the apparatus for producing animation of assembling in FIG. 94, the table 9401 for coping with animation speed ratio is changed to a table 10501 coping with operation sound, and the program 9402 for producing operating data with considering speed ratio is changed to a program 10502 for producing operating data added with operation sound, and the operating data 6707 is changed to operating data 10503 added with operation sound 10504.

The program 10502 for producing operating data added with operation sound reads out each of the part to be attached from the assembling procedure data 6706 and jointing data from the jointing data 8402, and produces the operation data with referring to the table 10501 coping with operation sound, and stores it to the operating data 6707. The table 10501 coping with operation sound is a table for making correspondence between the method of jointing in the jointing data and the sound generated at performing work with the method of jointing.

Figure 107:
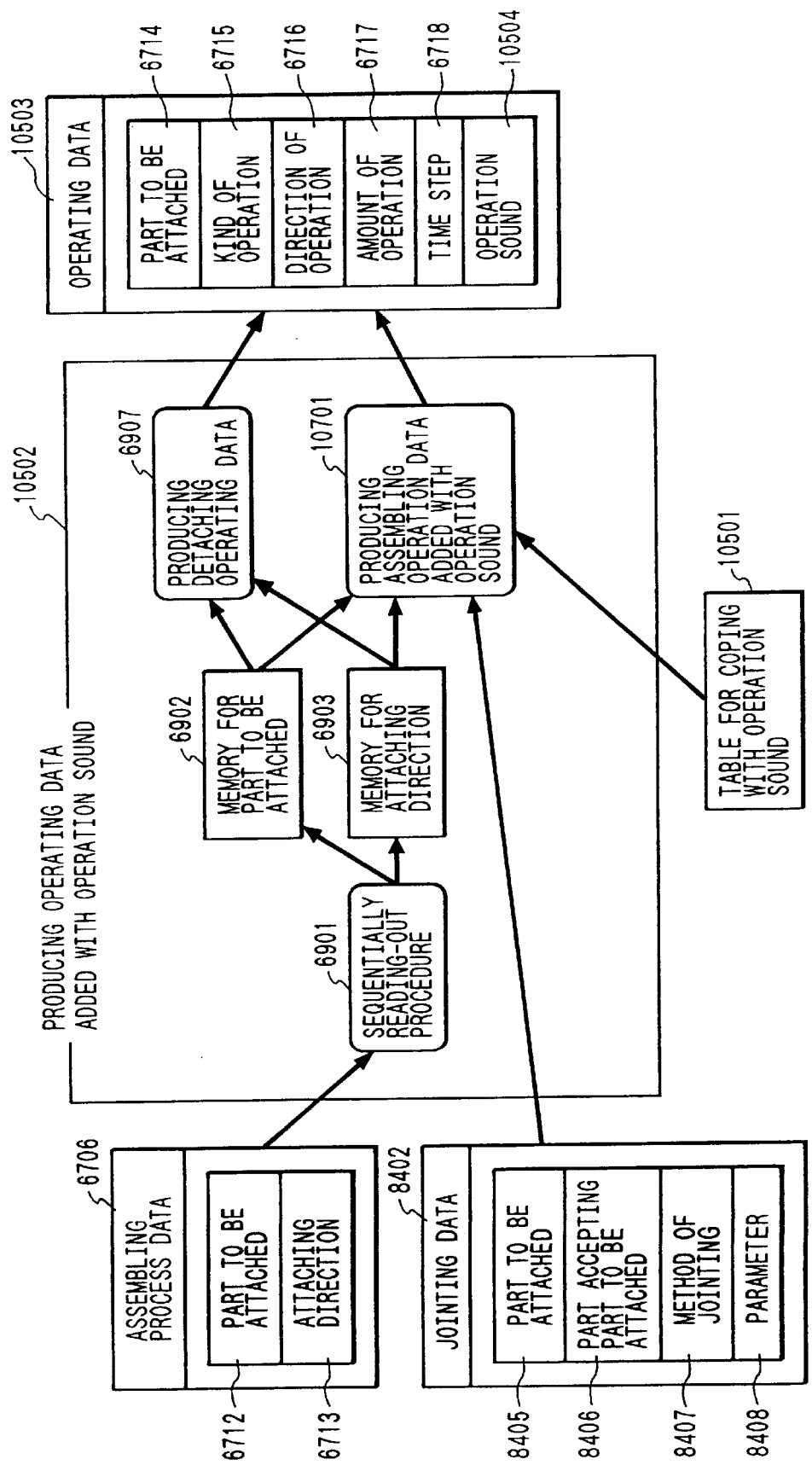
FIG. 107 is a functional structural diagram showing an apparatus executing operation data producing process.

FIG. 107 shows an example of the table 10501 coping with operation sound. The methods of jointing for assembling work such as snap, screw, welding, soldering and so on are set in the column of jointing method 10601, and the actual work sounds generated at performing assembling work corresponding to the method of jointing are set in the column of operation sound 10602 as, for example, digitized data.

FIG. 107 is a functional diagram showing the construction of an embodiment of the program 10502 for producing operating data added with operation sound. A program 6901 for sequentially reading-out procedure reads out assembling procedure step in the assembling procedure data 6906 one by one, and stores it into a memory 6902 for part to be attached and a memory 6903 for attaching direction.

A program 6907 for producing detaching operating data produces the detaching operating data in which the starting point is the position of an assembled state of the part to be attached and the ending point is the position proceeding in the direction opposite to the attaching direction read out from the memory 6903 for attaching direction. The operating data produced is stored as the operating data 10503.

A program 10701 for producing assembling operating data added with operation sound produces the assembling operating data added with operation sound in which the starting point is the ending point in the program 6907 for producing detaching operating data and the ending point is the position of an assembled state of the part to be attached. The operating data produced is stored as the operating data 10503.

Figure 108:
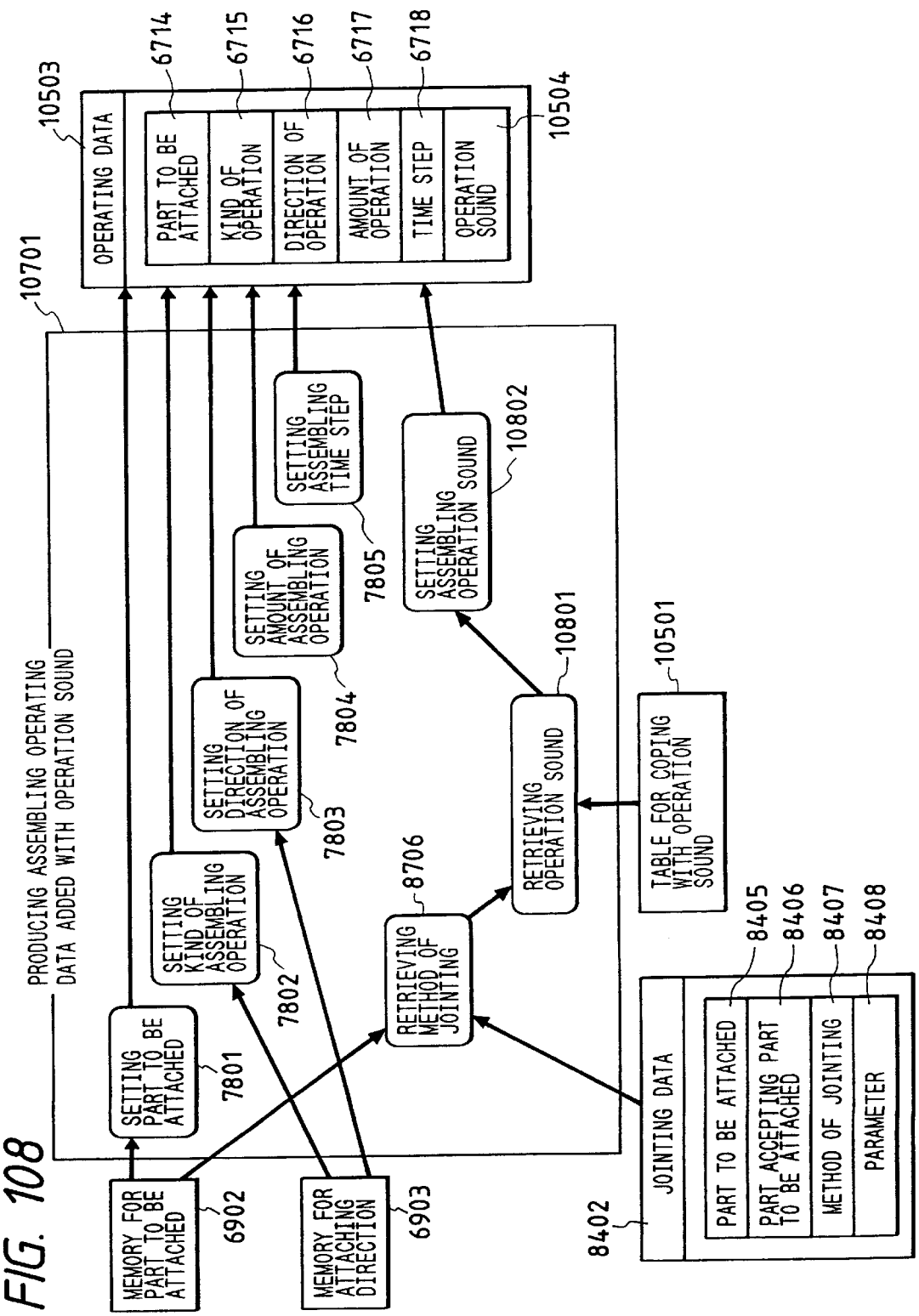
FIG. 108 is a functional structural diagram showing an apparatus executing assembling operation data producing process.

FIG. 108 is a functional diagram showing the construction of an embodiment of the program 10701 for producing assembling operating data added with operation sound. The process from the program 8701 for setting part to be attached to the program 7805 for setting assembling time step is the same as described in connection to FIG. 78.

A program 8706 for retrieving jointing method retrieves the part to be attached data read out from the memory 6902 for part to be attached in the jointing data 8402. A program 10801 for retrieving operation sound retrieves the work sound data of the method of jointing retrieved by the program 8706 for retrieving jointing method from the table 10501.

A program 10802 for setting sound receives operation sound data from the program 10801 for retrieving operation sound, and stores it to the operation sound 10504 in the operating data 10503.

Description will be made below on the principle where the program 10701 for producing assembling operating data added with operation sound, referring to FIG. 68, FIG. 69, FIG. 70. Herein, only the setting of operation sound for the parts 9802 and 9803 will be described.

The setting of the operation sound in the step of procedure 9902 is as follows. Firstly, the step of procedure 9902 of the part to be attached 9802 is retrieved by the program 8706 for retrieving jointing method with referring to the jointing data shown in FIG. 100, and the jointing method "snap" is obtained.

Next, the operation sound "none" corresponding to "snap" is obtained by the program 10801 for retrieving operation sound with referring to the table coping with operation sound shown in FIG. 106. Then, the operation sound data is stored in the operation sound 10504 in the operating data 10503 by the program 10802 for setting assembling operation sound. The result of the operating data is shown in the row 10901 in FIG. 109.

Setting of operation sound in next step of procedure 9903 is as follows. Firstly, the part to be attached 9803 in the step of procedure 9903 is retrieved with referring to the jointing data shown in FIG. 100, and the jointing method "screw" is obtained.

Next, the "screw" is retrieved by the program 10801 for retrieving operation sound, and the operation sound data is obtained. Then the operation sound data is stored in the operation sound 10504 in the operating data 10503. The result of operating data is shown in the row 10902 in FIG. 109.

Description will be made below using FIG. 102, FIG. 103 and FIG. 104 on the process of an animation display where the animation of the process 6604 shown in FIG. 66 is produced with the operating data shown in FIG. 109 as input data. Therein, the process of the animation will be described in starting from a disassembled state by assuming that the animation of detaching operating data has been completed.

FIG. 102 shows a state where the parts 10202 and 10203 are detached, that is, a state just before starting assembling operation. Firstly, a part 3901 moves in the direction of the attaching direction vector 3504 as shown in FIG. 103. At this time, since the sound data of the operating data is "none", no operation sound is produced. The part 3901 proceeds to the position of the part 10301, and then the animation ends.

Next, the part 10202 moves in the direction of the attaching direction vector 9804. At this time, since a digitized operation sound data is set in the operating data 10902, the data is transferred to a DA converter to re-produce the operation sound "frizzle". The part 10202 proceeds to the position of the part 10401 while the operation sound is being produced, and then the animation ends.

Although the operation sound is obtained depending on the kind of the jointing method for the part to be attached in this embodiment, tone of sound, kind of sound, source of sound and volume of sound of the operation sound may be changed depending on the kind of operation or the parameter of operation.

In the aforementioned embodiments, the amount of operation is fixed in a constant value. An embodiment where the amount of operation is calculated from the geometrical data will be described below.

Figure 110:
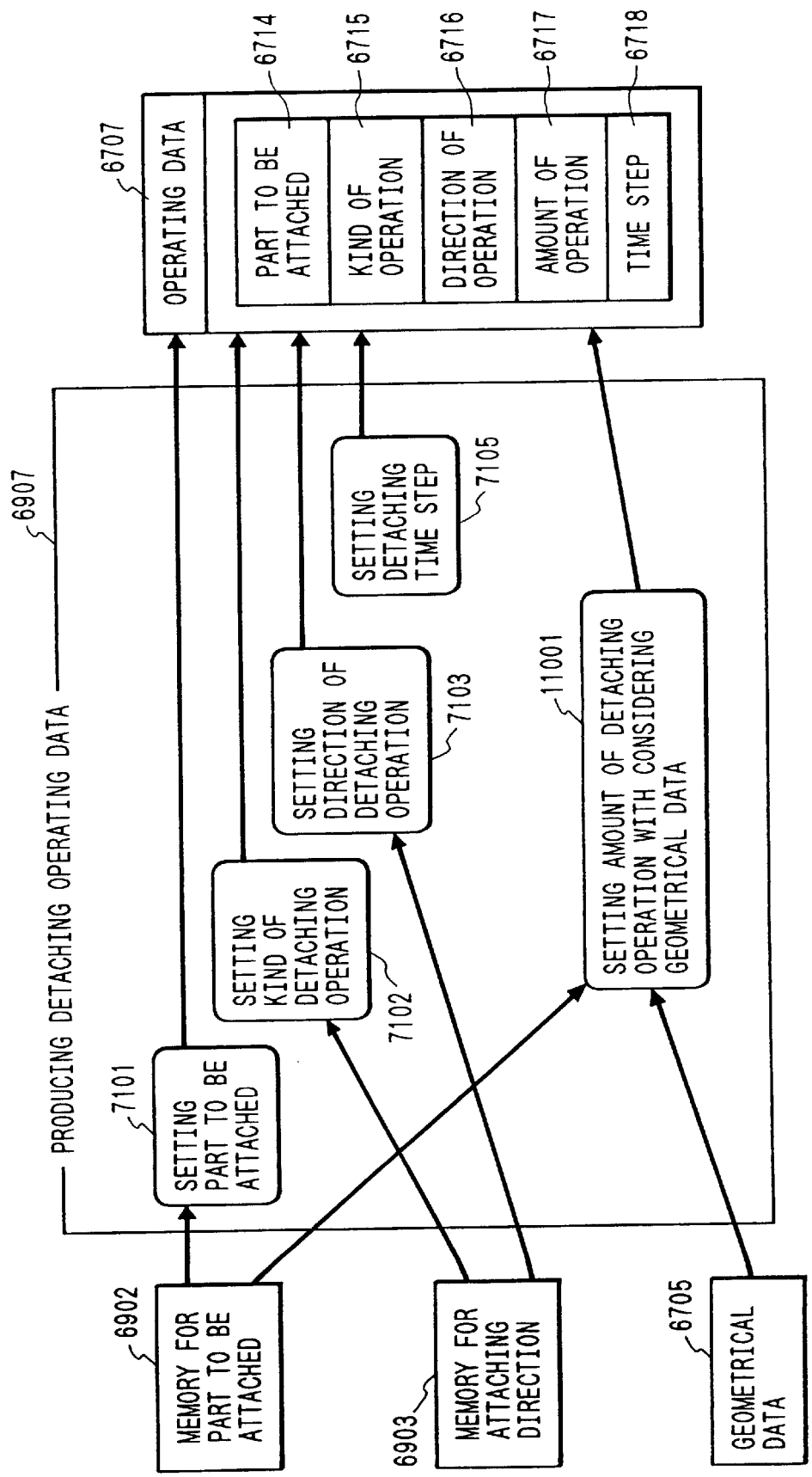
FIG. 110 is a functional structural diagram showing an apparatus executing detaching operation data producing process.

FIG. 110 is a functional diagram showing the construction of an apparatus for producing animation of assembling where in the apparatus for producing detaching operating data in FIG. 71, geometrical data 6705 is added and the program 7104 for setting amount of detaching operation is changed to a program 11001 for setting amount of detaching operation with considering geometrical data.

The program 11001 for setting amount of detaching operation with considering geometrical data reads out each of the part to be attached from the memory 6902 for part to be attached and calculates the amount of detaching operation using the geometrical data, and stores it to the operating data 6707.

Description will be made below using an example on the principle where the program 11001 for setting amount of detaching operation with considering geometrical data calculates the amount of detaching operation. In this embodiment, the maximum length of sides in a polygonal column as a bounding box containing all the parts of an assembly is used.

FIG. 111 is a geometry of an assembly for the purpose of explanation. A part 11101 is a part set at the beginning. A part 11102 is a part to be attached to the part 11101 in a direction 11104. A part 11103 is a part to be attached to the part 11101 in a direction 11105. Firstly, a bounding box containing the parts 11101, 11102, 11103 is obtained from the geometrical data 6705.

FIG. 112 shows the bounding box 11201 containing the three parts. The side lengths of the bounding box are a side length 11202 in the direction of X-axis, a side length 11203 in the direction of Y-axis, a side length 11204 in the direction of Z-axis.

Next, the longest side length 11203 among the three side lengths is obtained. Let the longest side length be $L_{max}$. An amount of detaching operation D is obtained by the following equation. Therein, n is a pre-determined constant value.

$$D = n \times L_{max} \tag{15}$$

Figure 113:
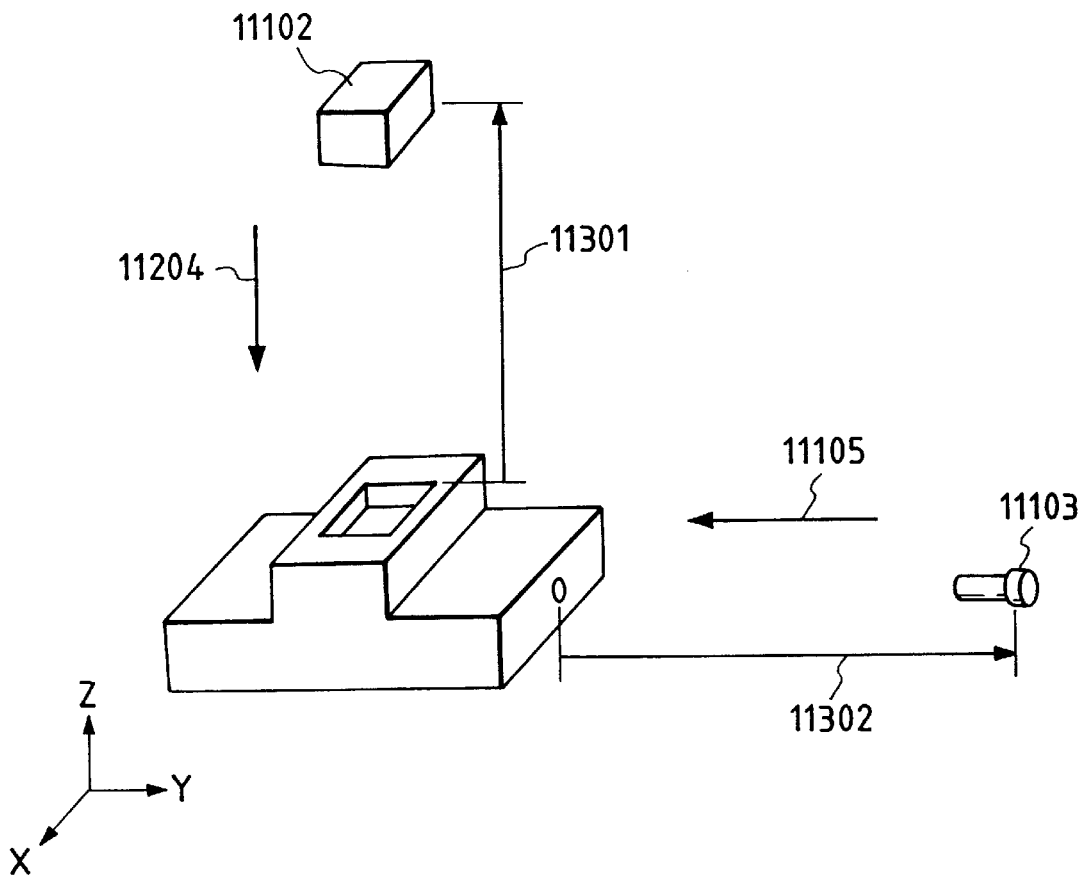
FIG. 113 is a view showing an animation display based on the operation data of detaching operation produced by an embodiment according to the present invention.

FIG. 113 shows a feature of the animation result in which the parts are detached by the amount of detaching operation obtained from the above method. The part to be attached 11102 is apart from the attached state in the direction opposite to the attaching direction 11104 by the distance 11301, and the part to be attached 11103 is apart from the attached state in the direction opposite to the attaching direction 11105 by the distance 11302. The distance 11301 and the distance 11302 are the amount of detaching operation D.

Figure 114:
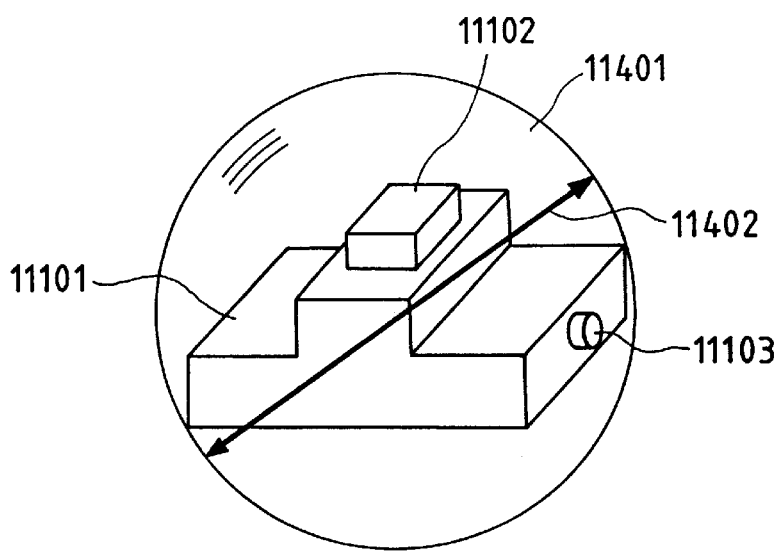
FIG. 114 is a view showing an embodiment of a bounding box containing the geometry of the whole parts of an assembly.

Although a polygonal column is used as a bounding box in the above embodiment, a sphere containing all the parts of an assembly may be used. FIG. 114 shows an example where the diameter of a sphere containing all the parts of an assembly as a bounding box is used.

Firstly, a bounding box 11401 containing the parts 11101, 11102, 11103 is obtained from the geometrical data 6705, and the diameter 11401 is let to be $L_{max}$. The process after this is the same as in the case of the bounding box of polygonal column.

Although the amount of detaching operation is calculated based on a bounding box containing all the parts of an assembly in this embodiment, the amount of detaching operation may be calculated based on a bounding box containing only a part of an assembly set in the beginning. By doing so, an amount of operation fit to the size of an assembly can be set and an animation easy to be understood can be obtained.

Figure 115:
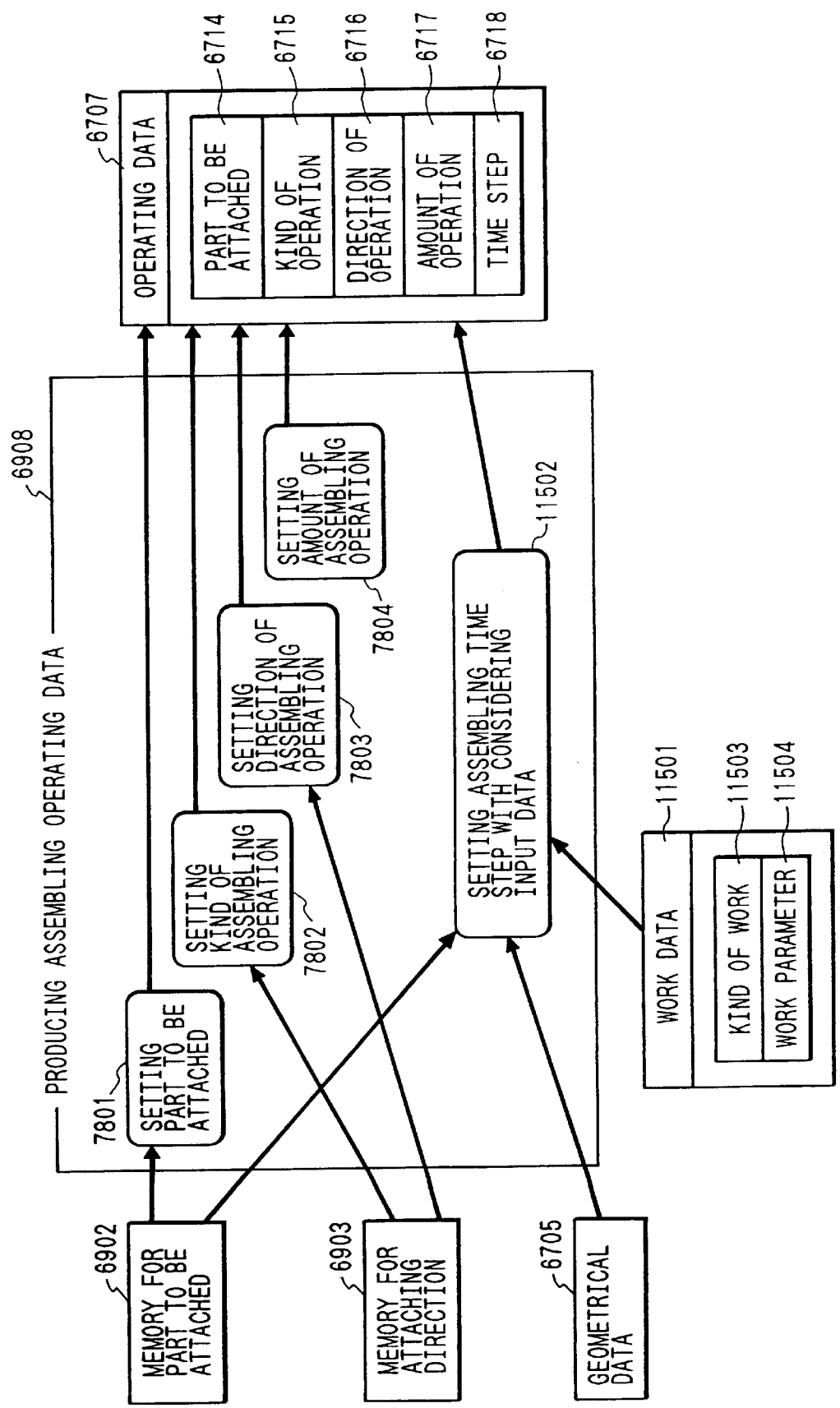
FIG. 115 is a functional structural diagram showing an apparatus executing operation data producing process.

Another embodiment of setting time step in the program 6908 producing assembling operation data will be described below. FIG. 115 is a functional diagram showing the construction of an apparatus for producing assembling operating data where in the construction of the apparatus for producing operating data shown in FIG. 78, geometrical data 6705 and work data 11501 are added, and the program 7805 for setting assembling time step is changed to a program 11502 for setting assembling time step with considering input data.

The work data 11501 is composed of kind of work 11503 expressing kinds of work and work parameter 11504 expressing detailed data of work.

The program 11502 for setting assembling time step with considering input data reads out part to be attaching from the memory 6902 for part to be attaching, reads out geometrical data of the part to be attaching from the geometrical data 6705, reads out an attaching direction from the memory 6903 for attaching direction and reads out work data from work data 11501, and calculates an assembling time step using these data, and then the result is stored in the time step 6708 in the operating data 6707.

Description will be made below using an example on the principle where the program 11502 for setting assembling time step with considering input data calculates assembling time step. Firstly, an example of calculating a time step using geometrical data will be described. In this embodiment, the volume of a part to be attached is used.

Figure 116:
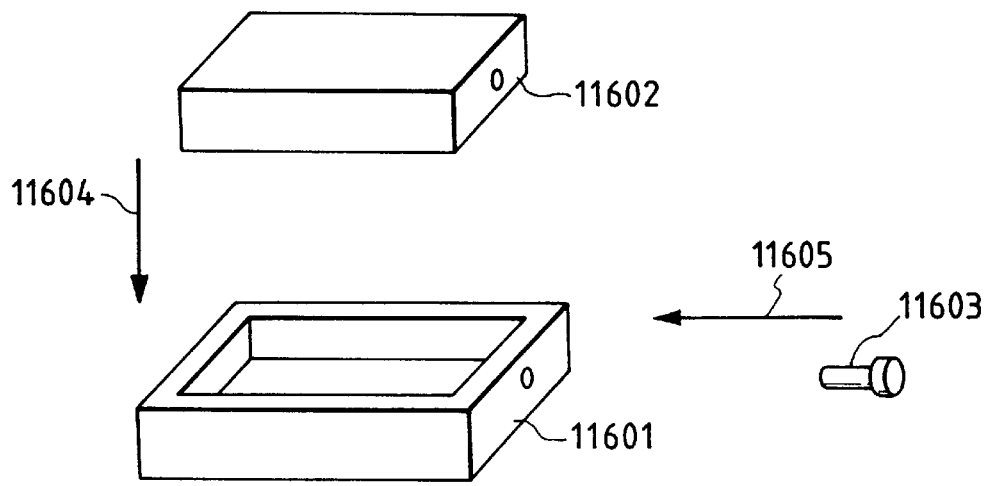
FIG. 116 is a view showing an example of an assembly detached by detaching operation.

FIG. 116 shows geometries of parts to be attached in a disassembled state for the purpose of explanation. A part 11601 is a part set at the beginning. A part 11602 is a part to be attached to the part 11601 in a direction 11604. Then a part 11603 is a part to be attached to the part 11601 in a direction 11605. Firstly, volumes of the part 11602 and 11603 are calculated from the geometrical data of the parts.

Next, a time step having an animation time proportional to the size of the obtained volume of the part. Let the obtained volume of the part 11602 be $Vol_1$, and the obtained volume of the part 11603 be $Vol_2$. Since the volume of the part 11602 is larger than the volume of the part 11603 as can be understood from the sizes of geometries in FIG. 116, $Vol_1 > Vol_2$. The starting time step (ST1) and the ending time step (ET1) of the part 11602 are obtained by the following equations.

$$ST1 = T_{const} \tag{16}$$

$$ET1 = ST1 + Vol_1/V_{const} \tag{17}$$

where $V_{const}$ is a preset volume per 1 second of animation time.

The starting time step (ST2) and the ending time step (ET2) of the part 11603 are obtained by the following equations.

$$ST2 = ET1 \tag{18}$$

$$ET2 = ST2 + Vol_2/V_{const} \tag{19}$$

In the assembling animation using the assembling time steps obtained as above, firstly the part 11602 moves slowly in the attaching direction 11604 to be attached to the part 11601, and then the part 11603 moves rapidly in the attaching direction 11605 to be attached to the part 11601.

Although the time step is determined by the animation time proportional to the size of the volume of a part to be attached in this embodiment, the time step may be obtained by calculating a function for calculating animation time using volume (Vol) as a parameter of the function for calculating animation time. The equations to calculate time step of the part 11602 are as follows.

Therein, F(Vol) is an arbitrary function of Vol as a parameter, and the content is, for example, $F(Vol) = 3.0 + (Vol + 10.0)/V_{const}$.

$$TS1 = T_{const} \tag{20}$$

$$ET1 = ST1 + F(Vol_1) \tag{21}$$

In another manner, the time step may be calculated using $Vol_1$ or $Vol_2$ obtained from the volume of a bounding box of a part to be attached.

Although the time step is determined from the volume of part to be attached in the above embodiments, the time step may be calculated from the maximum side length of a bounding box of a polygonal column or the diameter of a bounding box of a sphere for a part to be attached. By doing so, it is possible to obtain an animation in which a large part to be attached moves slowly and a small part to be attached moves rapidly.

An embodiment of calculating time step from attaching direction will be described below. In the embodiment, used is the crossing angle of an attaching direction of a part to be attached and the direction of -Z-axis of a coordinate system, that is, the direction of the gravity.

Figure 117:
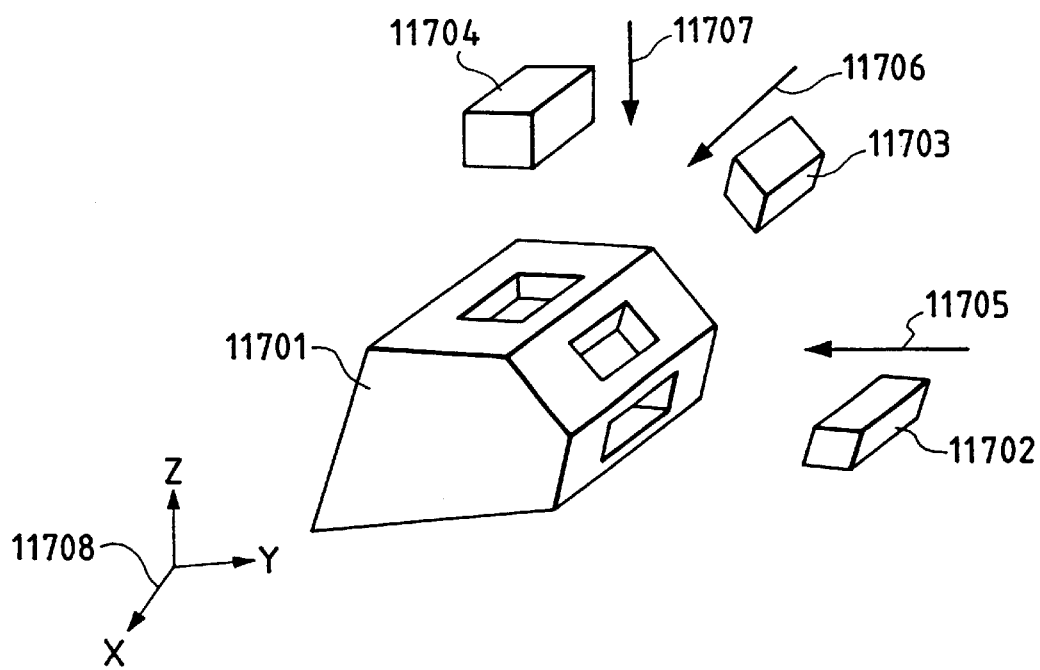
FIG. 117 is a view showing an example of an assembly detached by detaching operation.

FIG. 117 shows geometries of parts in a disassembled state for the purpose of explanation. A part 11701 is a part set at the beginning. Firstly, a part 11702 is attached to the part 11701 in an attaching direction 11705. Next, a part 11703 is attached to the part 11701 in an attaching direction 11706. Finally, a part 17704 is attached to the part 11701 in an attaching direction 11707.

In the first step, the crossing angles of attaching directions 11705, 11706, 11707 of the parts to be attached 11702, 11703, 11704 and the direction of -Z-axis of a coordinate system 11708 are obtained. Let the obtained angles be D1, D2, D3, respectively.

FIG. 118 shows the relationship between the direction of -Z-axis and the obtained angles. In the figure, the line segments shown by dotted lines indicate the directions having the angles to the -Z-axis 11801 with units of 45 degrees, and the numbers 11802 shown at the ends of the dotted lines indicate coefficients for obtaining animation time. The angles of the attaching directions 11705, 11706, 11707 become the arrows 11803, 11804, 11805.

The animation times for the parts are obtained by the following equations.

$$T1=T_{int}\times(0.2+0.2\times(D1/45.0)) \quad (22)$$

$$T2=T_{int}\times(0.2+0.2\times(D2/45.0)) \quad (23)$$

$$T3=T_{int}\times(0.2+0.2\times(D3/45.0)) \quad (24)$$

where T1, T2, T3 are the animation times for the parts 11702, 11703, 11704. $T_{int}$ is the standard animation time explained in FIG. 67.

Next, the starting time and the ending time are obtained from the animation time. As can be understood from FIG. 118, since decreasing order of the angles is D1>D2>D3, it is obtained that T1>T2>T3. Thereby, the animation times of the three parts become in increasing order of the parts to be attached 11704, 11703, 11702.

As described above, the assembling animation time becomes shorter as the attaching direction becomes closer to the direction of the gravity, and the assembling animation time becomes longer as the attaching direction becomes far apart from the direction of the gravity.

Next, an embodiment of calculating the time step from work data will be described. In this embodiment, used are the kind of work and the work parameter composing the operating data for a part to be attaching. FIG. 119 shows the operating data. The kind of work 11901 expresses kind of work such as arc welding, spot welding, soldering and so on. The work parameter 11902 is detailed data corresponding to the kind of work 11901, and, for example, expresses the length to be welded in a case of arc welding. This embodiment shows an example where the kind of work 5601 is arc welding.

FIG. 120 shows geometries of parts in a disassembled state for the purpose of explanation. A part 12001 is a part set at the beginning. A part 12002 is attached to the part 12001 in an attaching direction 12003, and an arc portion 12004 of the part 12001 and an arc portion 12005 of the part 12002 are welded together.

The assembling animation time (T1) at this time determined by calculating an animation time ratio using the kind of work and the work parameter and multiplying the standard animation time $T_{int}$ described in FIG. 67. This equation is shown below.

$$T1=T_{int}\times G(K_{ind}, P_{ara}) \quad (25)$$

where $G(K_{ind}, P_{ara})$ is a function calculating an animation time ratio using a kind of work $K_{ind}$ and a work parameter $P_{ara}$.

Figures 121A, 121B:
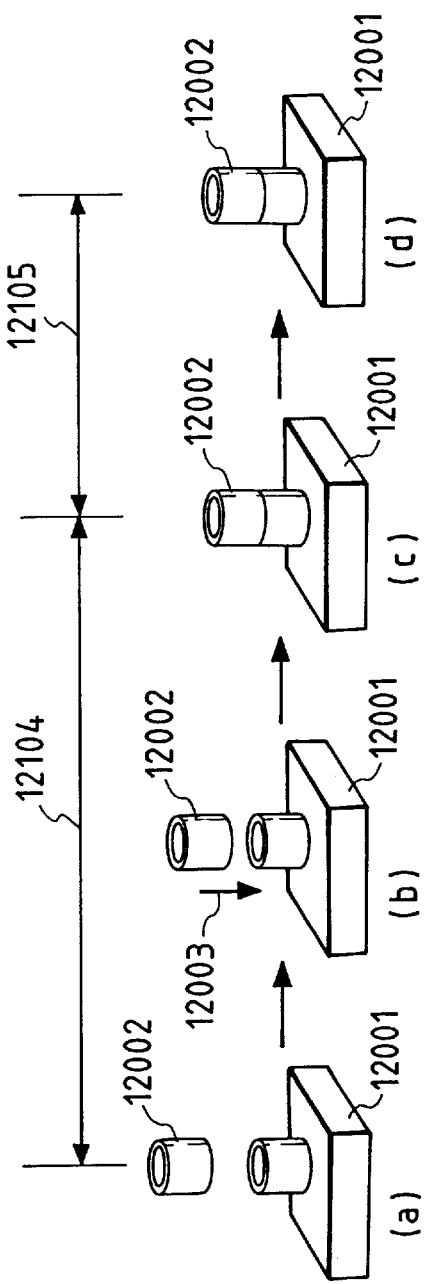

FIG. 121 (A) shows the content of the function G. In a case of arc welding, the equation 12102 is specified by an index $K_{ind}$, and the equation 12102 is calculated using an index $P_{ara}$ to determine the value 12103 of the function G. Although a case where the kind of work is arc welding has been described here, the procedure in a case of another kind of work is the same as in this case.

Further, by producing two kinds of assembling operating data expressing an operation in the time period during which the part 12002 moves from the detached position to the position of the part 12001 and an operation in the time period during which the welding is actually performed, the actual welding time is expressed by making the part 12002 motionless.

FIG. 121 (B) shows process of an animation where the standard animation time $T_{int}$ is set the time period in which the part 12002 reaches to the position of the part 12001 and the animation time T1 obtained by the function G is set the time period of actual welding.

In FIG. 121 (B), the course of operation (a) shows a state where the part 12002 is a detached state, (b) shows a state where the part 12002 is moving in the direction of the attaching direction 12003. (c) is a state where the part 12002 reaches the position of the part 12001. The animation time 12104 from (a) to (c) becomes $T_{int}$. Then welding work starts at (c) and completes at (d). During (c) to (d), the part 12002 is in a motionless state, and the time 12105 is T1.

By using the time step with considering geometrical data, attaching direction and work data, it is possible to obtain an animation by which the degree of difficulty and the detailed sharing of time of attaching work can be understood from the assembling animation.

An embodiment of operating data added with display attribution will be described below.

Figure 122:
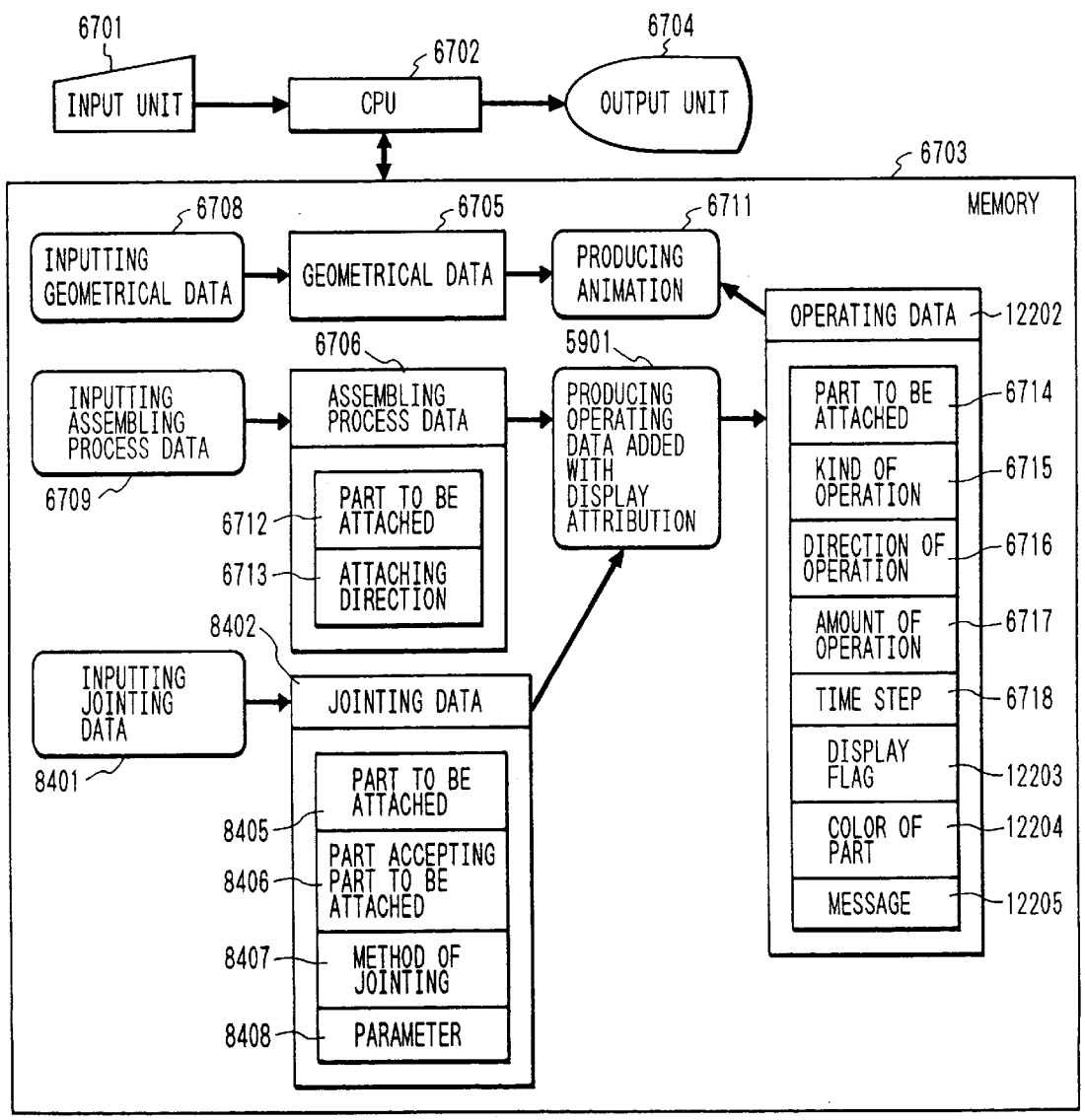

FIG. 122 is a functional diagram showing the construction of an apparatus for producing animation of assembling where in the apparatus for producing animation of assembling in FIG. 67, a program 8401 for inputting jointing data and jointing data 8402 described in FIG. 84 are added, and the program 6710 for producing operating data is changed to a program 12201 for producing operating data added with display attribution, and the operating data 6707 is changed to operating data 12202 added with display flag 12203, color of part 12204, massage 12205.

The program 12201 for producing operating data added with display attribution produces operating data added with display attribute with referring to the assembling data 6707 and jointing data read out from the jointing data 8402, and stores it in the operating data 12202.

Firstly, description will be made on the method in which the program 12201 for producing operating data added with display attribution sets a display flag 12203 in the operating data 12202.

Figure 123:
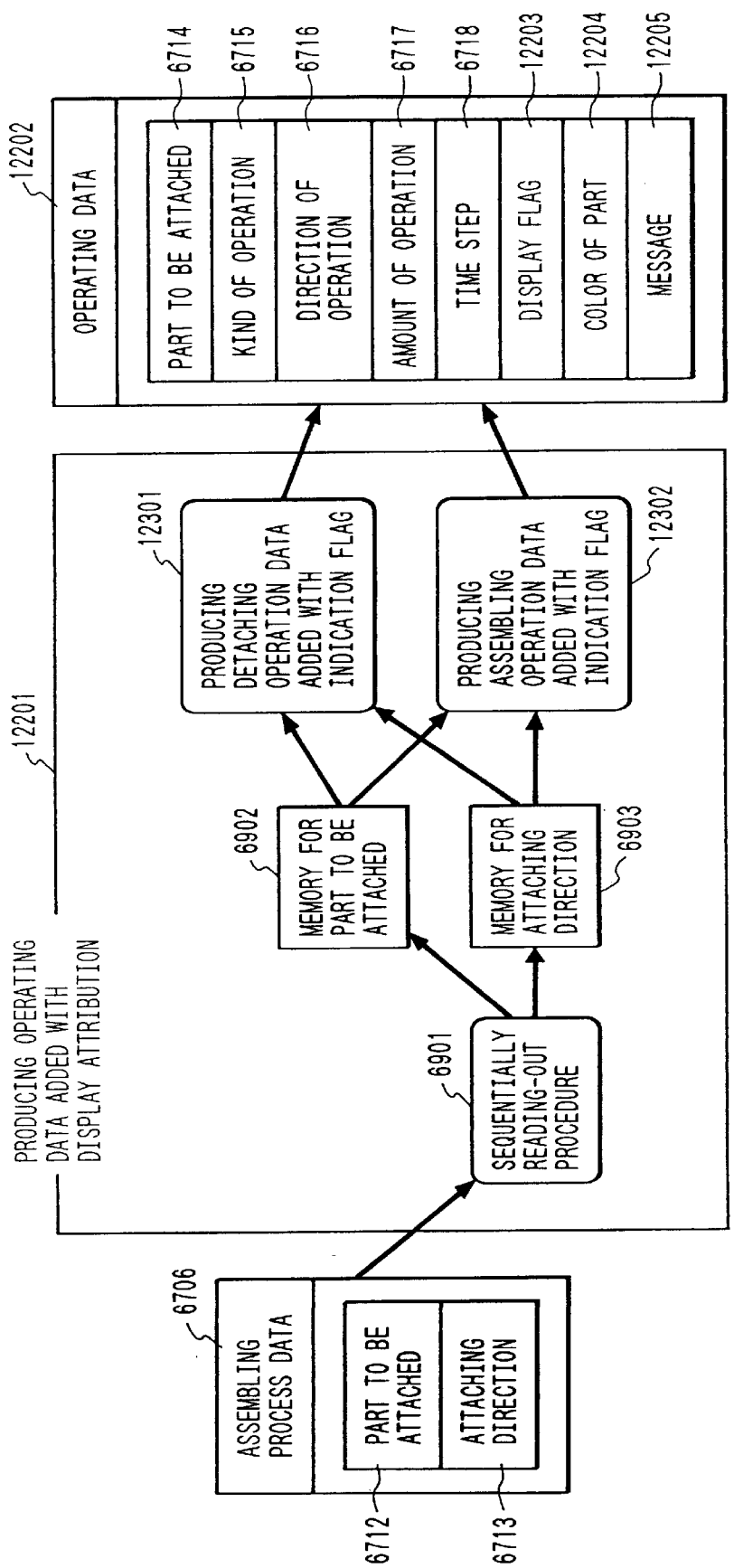

FIG. 123 is a structural diagram showing the function of an embodiment of the program 12201 for producing operating data added with display attribution. The program 6901 for sequentially reading out procedure reads out the step of assembling procedure in the assembling procedure data 6708 one-by-one, and stores it in the memory 6902 for part to be attached and the memory 6903 for attaching direction.

A program 12301 for producing detaching operation data added with display flag produces the detaching operating data in which the starting point is the position of an assembled state of the part to be attached and the ending point is the position proceeding in the direction opposite to the attaching direction read out from the memory 6903 for attaching direction. The operating data produced is stored as the operating data 12202.

A program 12302 for producing assembling operating data added with display flag produces the assembling operating data in which the starting point is the ending point in the program 12301 for producing detaching operating data added with display flag and the ending point is the position of an assembled state of the part to be attached. The operating data produced is stored as the operating data 12202.

The process will be described using an example, referring to FIG. 98 and FIG. 99. Since the step of procedure 9901 is to set a part in the beginning, operating data is not produced. In step of procedure 9902, the display flag 12203 of the detaching operation data is set to "not-display" in the program 12301 for producing detaching operating data added with display flag.

The display flag 12203 of the attaching operation data is set to "display" in the program 12302 for producing attaching operating data added with display flag. The result of the operating data is shown in the rows 12401 and 12403 in FIG. 124.

Figures 124, 125:
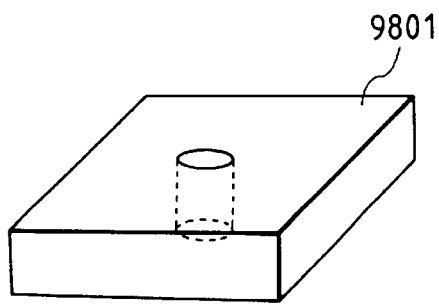
Figure 126:
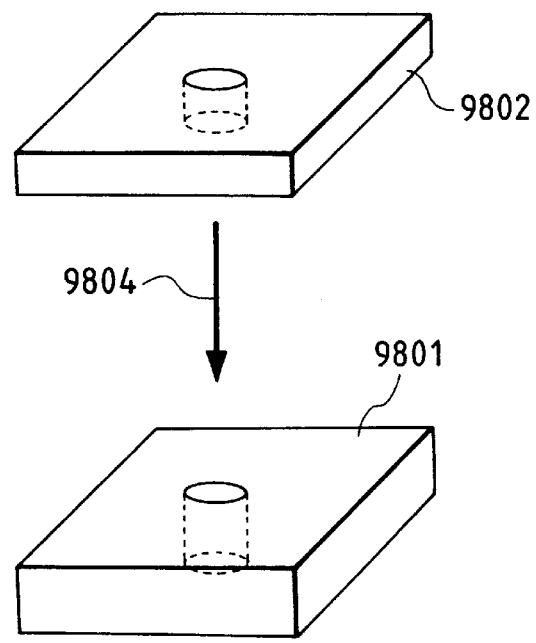
Figure 127:
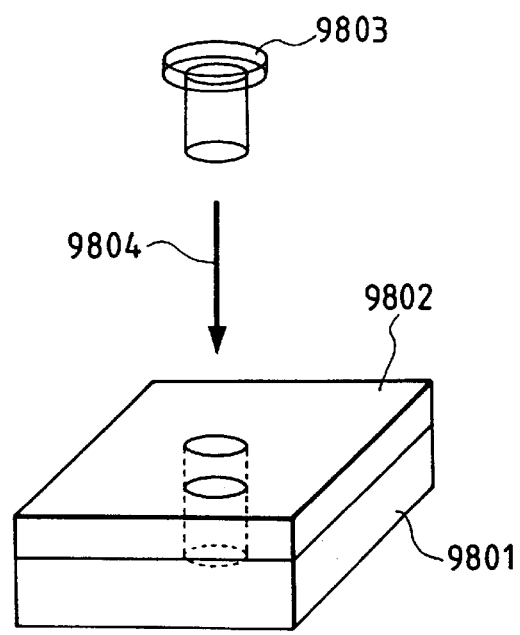

In step of procedure 9903, similarly, the operating data 12402 and 12404 is produced. As shown in FIG. 124, the display flag 12405 indicates whether or not a part to be attached is displayed in the animation of the operation. FIG. 125 to FIG. 127 show the course of animation display using the operating data as input data.

In the state where parts to be attached are separated by performing the operation data 12401 and 12502, only the part 9801 is displayed but the parts to be attached 9802 and 9803 are not displayed as shown in FIG. 125.

Next, as shown in FIG. 126, when the operating data 12403 is performed, the part to be attached 9802 is displayed and the animation is performed by moving of the part in the attaching direction 9804. Then as shown in FIG. 127, when the operating data 12304 is performed, the part to be attached 9803 is displayed and the animation is performed by moving the part in the attaching direction 9804.

Figure 128:
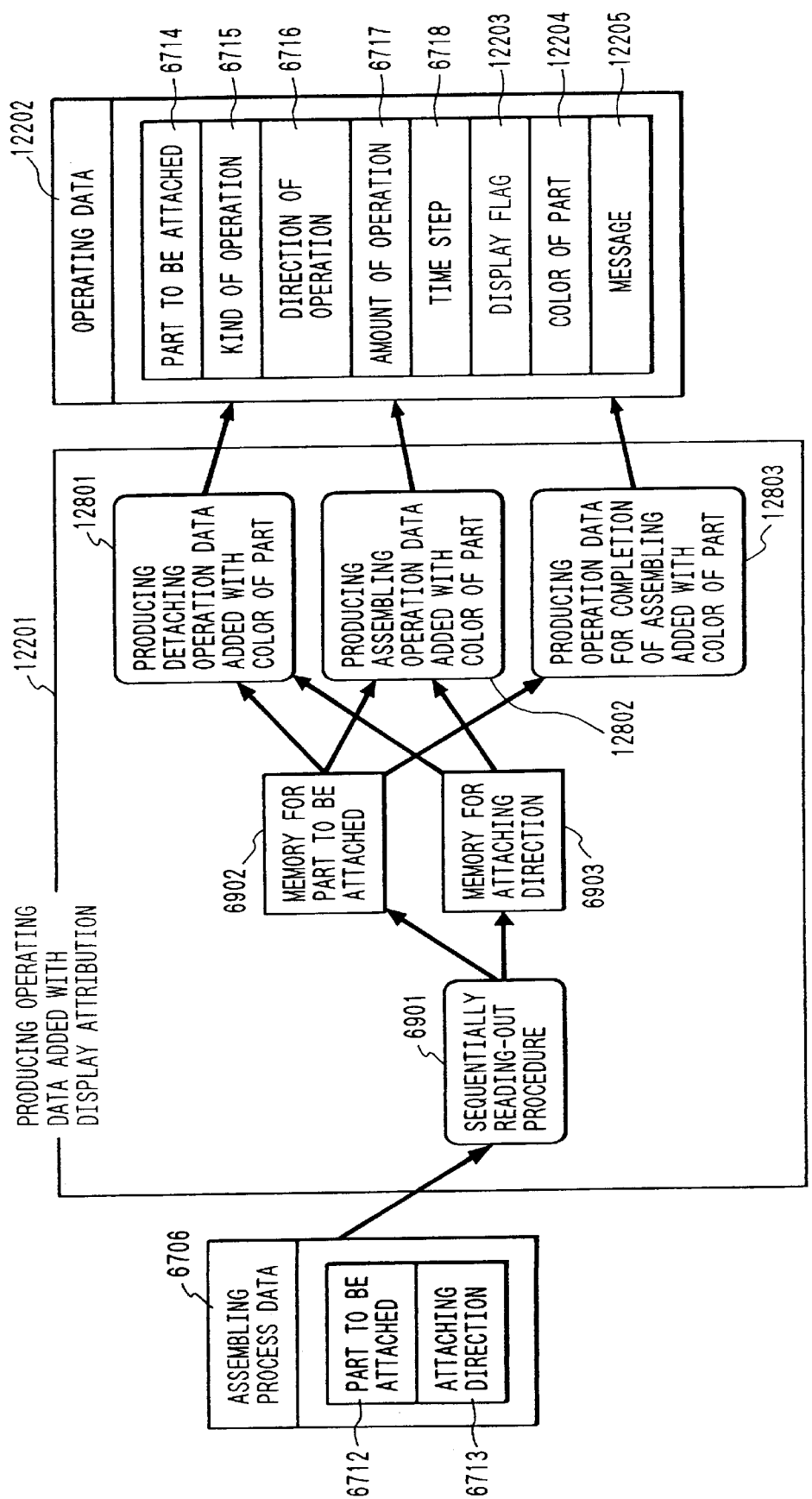

FIG. 128 is a functional diagram showing the structure of an embodiment of the program 12201 for producing operating data added with display attribution. Using this figure, description will be made on the method of setting the color of part 12204 in the operating data 12202 by the program 12201 for producing operating data added with display attribution.

The program 6901 for sequentially reading out procedure reads out the step of assembling procedure in the assembling procedure data 6708 one by one, and stores it in the memory 6902 for part to be attached and the memory 6903 for attaching direction.

A program 12801 for producing detaching operation data added with color of part produces the detaching operating data in which the starting point is the position of an assembled state of the part to be attached and the ending point is the position proceeding in the direction opposite to the attaching direction read out from the memory 6903 for attaching direction. The operating data produced is stored as the operating data 12202.

A program 12802 for producing assembling operating data added with color of part produces the assembling operating data in which the starting point is the ending point in the program 12801 for producing detaching operating data added with color of part and the ending point is the position of an assembled state of the part to be attached. The operating data produced is stored as the operating data 12202. The program 12802 for producing assembling operating data added with color of part produces the assembling operating data in the position of the assembled state, and the operating data produced is stored as the operating data 12202.

The process will be described using an example, referring to FIG. 98 and FIG. 99. Herein, only the steps of procedure 9901 and 9902 will be described. Since the step of procedure 9901 is to set a part in the beginning, operating data is not produced.

In step of procedure 9902, the color of part for detaching operation data is set. Let the color of part be "red". Next, the color of part for attaching operation data is set to a different color from the color of part for the detaching operation data. Let the color of part be "blue".

And, the color of part for assembling completion data is set to a different color from the colors of part for the detaching operation data and the attaching operation data.

Figures 129, 130:
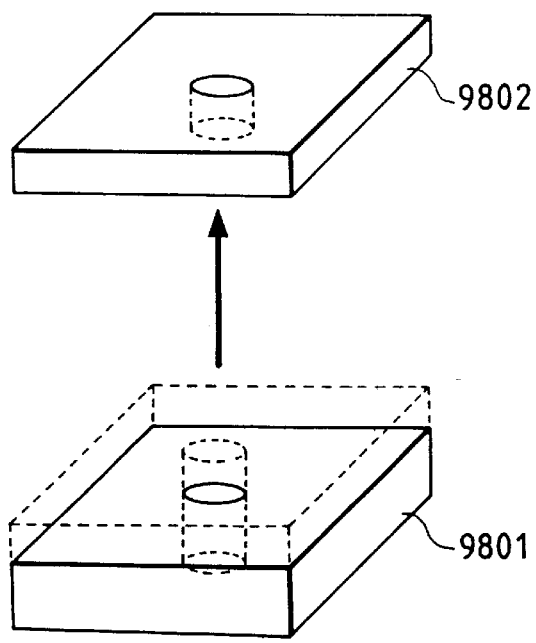

Let the color of part be "green". The result of the operating data is shown in the rows 12901, 12902 and 12903 in FIG. 129. As shown in FIG. 129, the color of part 12904 indicates the displayed color of part to be attached in the animation of the operation.

FIG. 130 and FIG. 131 show the course of animation display using the operating data as input data. In FIG. 130, the part to be attached is in a detached state by executing the operating data 12901, and the part to be attached 9802 is displayed with "red".

Next, in FIG. 131, the color of part of the part to be attached 9802 is changed to "blue" by executing the operating data 12902, and the animation is performed to move the part in the attaching direction 9804. After the part to be attached 9802 is attached, the part is displayed with "green" by executing the operating data 12903.

FIG. 132 is a functional diagram showing the structure of an embodiment of the program 12201 for producing operating data added with display attribution. Using this figure, description will be made on the method of producing the massage 12205 in the operating data 12202 by the program 12201 for producing operating data added with display attribution.

The program 6901 for sequentially reading out procedure reads out the step of assembling procedure in the assembling procedure data 6708 one by one, and stores it in the memory 6902 for part to be attached and the memory 6903 for attaching direction.

The program 6907 for producing detaching operation data produces the detaching operating data in which the starting point is the position of an assembled state of the part to be attached and the ending point is the position proceeding in the direction opposite to the attaching direction read out from the memory 6903 for attaching direction. The operating data produced is stored as the operating data 12202.

A program 13201 for producing assembling operating data added with massage produces the assembling operating data in which the starting point is the ending point in the program 6907 for producing detaching operating data and the ending point is the position of an assembled state of the part to be attached. The operating data produced is stored as the operating data 12202.

The process will be described using an example. FIG. 133 shows an assembled state of two parts 13301 and 13302. FIG. 134 is the assembling procedure data. It can be understood that the part to be set at the beginning is the part 13301 and the part to be animated is the part 13302.

FIG. 135 shows the input jointing data. Firstly, since the step of procedure 13401 is to put the part in the beginning, operating data is not produced. Herein, description will be made only on producing of assembling operation by the program 13201 for producing assembling operating data added with massage.

Next, the message of the assembling operating data is set by the step of procedure 13402. The details are as follows. Firstly, the part to be attached 13302 is read out from the memory 6902 for part to be attached, and the part to be attached 13302 is retrieved from the jointing data 8402, and then the method of jointing "welding" is obtained.

Using the method of jointing obtained, a message for expressing the content of work is produced. In the case of this example, since the method of jointing is "welding", the message is "under welding work" and the message is set to the massage 12205. The result of the operating data is shown in the row 13601 in FIG. 136.

FIG. 137 shows a course of animation display using the operating data as input data. The part to be attached 13302 moves toward the part 13301 in the animation direction 13702 and the message 13701 expressing the content of work is displayed at the same time. By producing operating data added with display attribution as described above, it is possible to identify a part being under attaching and understand the content of work for a part being under attaching.

The embodiment has shown the method in which the direction of operation, the amount of operation, the time step in the operating data are produced from the assembling procedure data, the geometrical data for part to be attached, the jointing data, the work data.

However, the present invention is not limited to the embodiments where the operating data is produced from one kind of data. It is needless to say that the operating data may be produced by combining plural kinds of data.

Further, the embodiment has shown the method in which the animation data produced is composed of the kind of operation, the direction of operation, the amount of operation, the time step.

However, the present invention is not limited to the method of such kind. The present invention can be applied to the key-frame method where the positional information of each part corresponding to time is used as operating data.

According to the present invention, there is an effect to decrease man-power in producing an animation of assembling since the animation of assembling can be automatically produced as far as there are at least geometrical data and assembling procedure data.

Further, according to the present invention, there is an effect to make confirmation of the content of assembling work easy since the animation of a part to be attached to the attaching direction and the animation of operation of the part to be attached itself are performed at a time by determining the operation of the part to be attached from operating data. Furthermore, according to the present invention, it is possible to animate with an amount of operation fit to the size of whole assembly by determining the amount of operation of the part to be attached from geometrical data.

Therefore, an animation of assembling a product from a huge product such as ship to a small and precise product such as watch and LSI easy to observe can be obtained without specifying the amount of operation.

According to the present invention, there is an effect to make confirmation of difficulty of assembling work easy since an animation can be performed with time corresponding to the content of work by calculating the time steps using the work data, the geometrical data, the attaching direction data and so on.

Further, according to the present invention, there is an effect to make confirmation of the content of assembling work easier than in an animation of assembling displaying only movement of parts since sound of actual work can be produced together with animation of parts to be attached by determining the sound of work from the jointing data.

Further, according to the present invention, there is an effect to make confirmation of the part under being attached since the display state of part to be attached and the color of part to be attached can be changed in the course of animating.

Furthermore, according to the present invention, there is an effect to understand the content of work under being attaching at a glance since the massage of work can be displayed together with animation.

What is claimed is:

1. An apparatus for producing an exploded view of an assembly having an input unit, a geometrical data memory which stores geometrical data of parts composing said assembly and a calculating unit which displays said assembly to a display unit based on said geometrical data, said apparatus further comprising:

an assembling process data memory which stores assembling data including attaching orders and attaching directions of said parts;

minimum scalar product value calculating means for calculating the scalar products of vertex coordinates of a part in said geometrical data memory and the attaching direction vector in said assembling process data memory and for obtaining the minimum value of the scalar products;

maximum scalar product value calculating means for calculating the scalar products of the vertex coordinates of said part and said attaching direction vector and for obtaining a maximum value of the scalar products; and means for obtaining the difference between said minimum value of scalar product and said maximum value of scalar product obtained and for determining distances between the parts of said assembly in a disassembled state on an exploded view based on the obtained difference, to thereby display an exploded view of said assembly on said display unit corresponding to said determined distances.

2. An apparatus for producing an exploded view of an assembly according to claim 1, wherein;

said means for determining distances between parts determines said distances between parts by adding or subtracting a given shift value to or from said obtained difference between the minimum value of scalar product and the maximum value of scalar product.

3. An apparatus for producing an exploded view of an assembly having an input unit, a geometrical data memory which stores geometrical data of parts composing said assembly and a calculating unit which displays said assembly to a display unit based on said geometrical data, said apparatus further comprising:

an assembling process data memory which stores assembling data including attaching orders and attaching directions of said parts;

means for producing a first polyhedron including the geometrical form of a part to be attached and a second polyhedron including the geometrical form of a part accepting part to be attached using geometrical data of parts stored in said geometrical data memory; and means for determining distances between the parts of said assembly in a disassembled state on an exploded view based on the produced geometrical data of the first and the second polyhedrons and attaching direction vector in said memory for assembling process data, to thereby display an exploded view on said display unit corresponding to said determined distances.

4. An apparatus for producing an exploded view of an assembly having an input unit, a geometrical data memory which stores geometrical data of parts composing said assembly and a calculating unit which displays said assembly to a display unit based on said geometrical data, said apparatus further comprising:

an assembling process data memory which stores assembling process data including attaching orders and attaching directions of said parts;

contact surface detecting means for obtaining a contact surface between a part to be attached and a part accepting part to be attached based on the geometrical data of part to be attached and the geometrical data of part accepting part to be attached in said geometrical data memory;

minimum scalar product value calculating means for calculating scalar products of vertex coordinates of the obtained contact surface and the attaching direction vector in said assembling process data memory and for obtaining the minimum value of the scalar products;

maximum scalar product value calculating means for calculating scalar products of vertex coordinates of said part to be attached and an attaching direction vector and for obtaining the maximum value of the scalar products; and means for obtaining a difference between said minimum value of scalar product and said maximum value of scalar product obtained and for determining distances between the parts of said assembly in a disassembled state on an exploded view based on the obtained difference, to thereby display an exploded view of said assembly on said display unit corresponding to said determined distances.

5. A method of producing an exploded view of an assembly using an apparatus having an input unit, a geometrical data memory which stores geometrical data of parts composing said assembly and a calculating unit which displays said assembly to a display unit based on said geometrical data, said method comprising the steps of:

reading out vertex coordinates of a part from said geometrical data memory;

reading out an attaching direction vector from an assembling process data memory which stores assembling process data including attaching orders and attaching directions of parts;

calculating scalar products of the vertex coordinates of the part and the assembling vector and obtaining a minimum value of the scalar products;

calculating scalar products of said read-out vertex coordinates of the part and said read-out attaching direction vector and obtaining the maximum value of the scalar products;

obtaining a difference between the minimum value of scalar product and the maximum value of scalar product and determining distances between the parts of said assembly in a disassembled state on an exploded view based on the obtained difference; and displaying an exploded view in said display unit corresponding to said determined distances.

6. An apparatus for producing animation of assembling, comprising:

a geometrical data memory which stores geometrical data of parts composing an assembly;

an attaching procedure data memory which stores attaching procedure data composed of attaching orders, parts to be attached data and attaching direction data;

a jointing data memory which stores jointing data including parts to be attached data and jointing method data;

a special jointing operation data table memory which stores a table for special jointing operation including jointing method data and operation data depending on for said jointing method data; and operating data producing means for producing operating data for an animation displayed from the geometrical data in said geometrical data memory, the attaching procedure data in said attaching procedure data memory, the jointing data in said jointing data memory, and the table for special jointing operation in said table for special jointing operation memory.

7. An apparatus for producing animation of assembling according to claim 6, wherein:

said operating data comprises key frame data which is positional data of each part corresponding to time.

8. An apparatus for producing animation of assembling, comprising:

a geometrical data memory which stores geometrical data of parts composing an assembly;

an attaching procedure data memory which stores attaching procedures including attaching orders, parts to be attached data and attaching direction data;

a jointing data memory which stores jointing data composed of parts to be attached data and jointing method data;

an animation speed ratio table memory which stores a table for animation speed ratio including jointing method data and operating speed ratio data special for said jointing method data; and operating data producing means for producing operating data for an animation displayed from the geometrical data in said geometrical data memory, the attaching procedure data in said attaching procedure data memory, the jointing data in said jointing data memory, and the table for animation speed ratio in said table for animation speed ratio memory.

9. An apparatus for producing animation of assembling, comprising:

a geometrical data memory which stores geometrical data of parts composing an assembly;

an attaching procedure data memory which stores attaching procedures including attaching orders, parts to be attached data and attaching direction data;

a jointing data memory which stores jointing data including parts to be attached data and jointing method data;

a jointing sound table memory which stores a table for jointing sound including jointing method data and sound data special for said jointing method data; and operating data producing means for producing operating data for animation displayed from the geometrical data in said geometrical data memory, the attaching procedure data in said attaching procedure data memory, the jointing data in said jointing data memory, and the table for jointing sound in said table for jointing sound memory.

10. An apparatus for producing animation of assembling according to any one of claim 6 to claim 9, wherein:

said operating data comprises kinds of movement, directions of movement, distance of movement and time steps.

11. An apparatus for producing animation of assembling according to any one of claim 6 to claim 9, wherein:

said operating data producing means comprises detaching operation producing means for producing attaching operation data by which parts to be attached are detached in the direction opposite to the attaching direction from an assembled state; and assembling operation producing means for producing attaching operation data by which parts to be attached are assembled to the attaching direction from detached state.

12. An apparatus for producing animation of assembling according to claim 11, wherein:

said detaching operating data producing means determines the distance of movement for the detaching operation data of a part to be attached using the size of the part.

13. An apparatus for producing animation of assembling according to claim 11, wherein:

said assembling operating data producing means determines the time steps for the assembling operation data of a part to be attached using the size of the part.

14. An apparatus for producing animation of assembling according to claim 11, wherein:

said assembling operating data producing means determines the time steps for the assembling operation data of a part to be attached using the attaching direction of the part to be attached.

15. An apparatus for producing animation of assembling according to claim 11, wherein:

said assembling operating data producing means determines the time steps for the assembling operation data of a part to be attached using the work data of the part to be attached.

16. A method for producing animation of assembling, said method comprising steps of:

reading out necessary geometrical data from geometrical data of parts composing an assembly;

reading out parts to be attached data and attaching direction data from attaching procedure data including attaching orders, parts to be attached data and attaching direction data;

obtaining a corresponding jointing method to the parts to be attached read out in said reading step from jointing data including parts to be attached data and jointing method data;

obtaining a corresponding special operation to the jointing method obtained in the above step from a table for special jointing operation composed of jointing method data and operation data special for said jointing method data; and producing operating data for part to be attached as an input parameter to an animation display function from the attaching direction and the special operation with referring to the geometrical data of the part to be attached.

17. A method for producing animation of assembling, said method comprising steps of:

reading out necessary geometrical data from geometrical data of parts composing an assembly;

reading out parts to be attached data and attaching direction data from attaching procedure data including attaching orders, parts to be attached data and attaching direction data;

obtaining a corresponding jointing method to the parts to be attached read out in the above step from jointing data composed of part to be attached data and jointing method data;

obtaining a corresponding animation speed ratio to the jointing method obtained in said obtaining step from a table for animation speed composed of jointing method data and operating speed ratio data special for said jointing method data; and producing operating data for parts to be attached as an input parameter to an animation display function from the attaching direction and the animation speed ratio with referring to the geometrical data of the parts to be attached.

18. A method for producing animation of assembling, said method comprising the steps of:

reading out necessary geometrical data from geometrical data of parts composing an assembly;

reading out parts to be attached data and attaching direction data from attaching procedure data including attaching orders, parts to be attached data and attaching direction data;

obtaining a corresponding jointing method data to the parts to be attached read out in said reading step from jointing data composed of parts to be attached data and jointing method data;

obtaining a corresponding sound data to the jointing method obtained in said obtaining step from a table for jointing sound composed of jointing methods and sound data special for said jointing method data; and producing operating data for part to be attached as an input parameter to an animation display function from the attaching direction and the sound data with referring to the geometrical data of the parts to be attached.

19. A method for producing animation of assembling according to any one of claim 16 to claim 18, wherein:

said operating data comprises kinds of movement, direction of movement, distance of movement and time steps.

20. A method for producing animation of assembling according to any one of claim 16 to claim 18, wherein:

said operating data comprises key frame data which is positional data of each part corresponding to time.

21. A method for producing animation of assembling according to any one of claim 16 to claim 18, the method further comprising the steps of:

producing operation data by which parts to be attached are detached in the direction opposite to the attaching direction from an assembled state; and producing operation data by which parts to be attached are assembled in the attaching direction from detached state.

22. A method for producing animation of assembling according to claim 21, wherein:

said step of detaching operating data producing determines the distance of movement for the detaching operation data of a part to be attached using the size of the part.

23. A method for producing animation of assembling according to claim 21, wherein:

said step of assembling operating data producing determines the time steps for the assembling operation data of a part to be attached using the size of the part.

24. A method for producing animation of assembling according to claim 21, wherein:

said step of assembling operating data producing determines the time steps for the assembling operation data of a part to be attached using the attaching direction of the part to be attached.

25. A method for producing animation of assembling according to claim 21, wherein:

said step of assembling operating data producing determines the time steps for the assembling operation data of a part to be attached using the work data of the part to be attached.

* * * * *